(12) United States Patent
Wakazono

(10) Patent No.: US 9,396,558 B2
(45) Date of Patent: Jul. 19, 2016

(54) IMAGE PROCESSING APPARATUS AND METHOD, AND PROGRAM

(75) Inventor: Masafumi Wakazono, Kanagawa (JP)

(73) Assignee: Sony Corporation, Tokyo (JP)

( * ) Notice: Subject to any disclaimer, the term of this patent is extended or adjusted under 35 U.S.C. 154(b) by 298 days.

(21) Appl. No.: 13/592,470

(22) Filed: Aug. 23, 2012

(65) Prior Publication Data

US 2013/0058580 A1    Mar. 7, 2013

(30) Foreign Application Priority Data

Sep. 2, 2011    (JP) .................................. 2011-191760

(51) Int. Cl.
*G06K 9/46* (2006.01)
*G06T 11/00* (2006.01)

(52) U.S. Cl.
CPC ...................................... *G06T 11/00* (2013.01)

(58) Field of Classification Search
None
See application file for complete search history.

(56) References Cited

U.S. PATENT DOCUMENTS

| | | | | |
|---|---|---|---|---|
| 4,979,380 A * | 12/1990 | Robbins | ............. | D06B 11/0059 118/323 |
| 5,033,700 A * | 7/1991 | Robbins | ............. | D06B 11/0059 248/49 |
| 5,035,018 A * | 7/1991 | Robbins | ............. | D06B 11/0059 8/150 |
| 5,621,868 A | 4/1997 | Mizutani et al. | | |
| 5,671,295 A * | 9/1997 | Miyake | .................... | G06T 11/20 382/242 |
| 5,778,105 A * | 7/1998 | Shively | .................. | G06T 7/0083 358/3.26 |
| 6,011,536 A * | 1/2000 | Hertzmann | ............. | B44F 11/02 345/156 |
| 6,081,621 A * | 6/2000 | Ackner | .................. | G06K 9/186 382/209 |

(Continued)

OTHER PUBLICATIONS

Lukac, R., Computational Photography: Methods and Applications, pp. 386-387, CRC Press, Boca Raton, FL.

(Continued)

*Primary Examiner* — Chan Park
*Assistant Examiner* — Iman K Kholdebarin
(74) *Attorney, Agent, or Firm* — Wolf, Greenfield & Sacks, P.C.

(57) ABSTRACT

An image processing apparatus includes a modification processing unit configured to modify an input image by distributing a value of each of pixels in the input image over a two-dimensional distribution area having a randomly different size and direction in accordance with modification characteristic information for distributing each pixel over the distribution area. The modification characteristic information is information for modifying the input image using a modification characteristic which is randomly different for each pixel position.

20 Claims, 33 Drawing Sheets

(56) References Cited

U.S. PATENT DOCUMENTS

| | | | | |
|---|---|---|---|---|
| 6,243,488 B1* | 6/2001 | Penna | | G06T 15/04 382/154 |
| 6,268,865 B1* | 7/2001 | Daniels | | G06T 11/001 345/582 |
| 6,661,463 B1* | 12/2003 | Geshwind | | H04N 5/843 348/384.1 |
| 7,652,698 B2* | 1/2010 | Morishita | | H04N 1/4056 358/1.9 |
| 8,259,180 B2* | 9/2012 | Ogasawara | | G06T 7/0004 348/188 |
| 8,766,999 B2* | 7/2014 | Lin | | G09G 5/10 345/589 |
| 8,908,075 B2* | 12/2014 | Silverbrook | | B41J 2/1433 348/222.1 |
| 2003/0118251 A1* | 6/2003 | Hamza | | G06T 3/0093 382/308 |
| 2003/0132895 A1* | 7/2003 | Berstis | | G02F 1/1362 345/55 |
| 2004/0247173 A1* | 12/2004 | Nielsen | | G06T 3/0062 382/154 |
| 2005/0105806 A1* | 5/2005 | Nagaoka | | G06F 17/30247 382/224 |
| 2005/0122549 A1* | 6/2005 | Goulanian | | G03H 1/30 359/3 |
| 2005/0275675 A1* | 12/2005 | Kakutani | | B41J 2/205 347/15 |
| 2006/0239581 A1* | 10/2006 | Neuman | | G06T 5/009 382/274 |
| 2007/0115270 A1* | 5/2007 | Rai | | G06T 3/00 345/204 |
| 2008/0079827 A1* | 4/2008 | Hoshino | | H04N 9/646 348/248 |
| 2009/0153811 A1* | 6/2009 | Braiman | | A63J 5/02 353/121 |
| 2009/0180131 A1* | 7/2009 | Mori | | H04N 1/4056 358/1.9 |
| 2010/0008596 A1* | 1/2010 | Kawabe | | G06T 3/4007 382/266 |
| 2012/0014594 A1* | 1/2012 | Damera-Venkata | | G06T 5/009 382/165 |
| 2012/0154601 A1* | 6/2012 | Ferguson | | H04N 19/154 348/180 |

OTHER PUBLICATIONS

Kyprianidis, J.E., et al., "Image and Video Abstraction by Coherence-Enhancing Filtering", Eurographics, 2011, 10 pages, vol. 30, No. 2, Blackwell Publishing, Oxford, UK.

Kang, H. et al., "Flow-Based Image Abstraction", IEEE Transactions on Visualization and Computer Graphics, Jan./Feb. 2009, pp. 62-76, vol. 15, No. 1, IEEE Computer Society.

Hertzmann, Painterly Rendering with Curved Brush Strokes of Multiple Sizes. New York University, SIGGRAPH Conference Proceedings. 1998;453-60.

* cited by examiner

| PAINTING-STYLE PROCESS | SEARCH RANGE (POINTILLIST DOT RADIUS) | FILTER CHARACTERISTIC (CUT-OFF FREQUENCY) |
|---|---|---|
| POINTILLIST STYLE | 2 PIXELS | 4 PIXELS |
| POINTILLIST STYLE | 3 PIXELS | 5 PIXELS |
| POINTILLIST STYLE | 4 PIXELS | 7 PIXELS |
| OIL PAINTING | 2 PIXELS | 5 PIXELS |

SMALL ← SEARCH RANGE → LARGE

FIG. 18

| USER INPUT | SEARCH RANGE (POINTILLIST DOT RADIUS) | AMOUNT OF JITTER (STRENGTH) | SHARPENING (HIGH-PASS GAIN) |
|---|---|---|---|
| STRONG EFFECT | 5 PIXELS | ± 32 | × 1.5 |
| INTERMEDIATE EFFECT | 3 PIXELS | ± 16 | × 1.4 |
| WEAK EFFECT | 2 PIXELS | 0 | × 1.0 |

FIG. 19

| USER INPUT | SEARCH RANGE (POINTILLIST DOT RADIUS) | AMOUNT OF JITTER (STRENGTH) | SHARPENING (HIGH-PASS GAIN) |
|---|---|---|---|
| PRECISE | 2 PIXELS | ± 32 | × 1.0 |
| ROUGH | 5 PIXELS | ± 16 | × 1.2 |
| CLEAR | 3 PIXELS | ± 32 | × 1.5 |

FIG. 38

| USER INPUT | SEARCH RANGE (POINTILLIST DOT RADIUS) | SEARCH RANGE (STROKE LENGTH) | AMOUNT OF JITTER (STRENGTH) | SHARPENING (HIGH-PASS GAIN) |
|---|---|---|---|---|
| POINTILLISTIC | 3 PIXELS | 3 PIXELS | ±32 | ×1.2 |
| IMPRESSIONISTIC | 3 PIXELS | 15 PIXELS | ±16 | ×1.4 |
| IMPRESSIONISTIC (ENHANCED) | 5 PIXELS | 21 PIXELS | ±32 | ×1.4 |

IMAGE PROCESSING APPARATUS AND METHOD, AND PROGRAM

CROSS REFERENCE TO RELATED APPLICATIONS

The present application claims priority under 35 U.S.C. §119 to Japanese Patent Application No. JP 2011-191760, filed in the Japan Patent Office on Sep. 2, 2011, the entire contents of which are incorporated herein by reference.

BACKGROUND

The present disclosure relates to image processing apparatuses and methods, and programs, and more specifically to an image processing apparatus and method, and a program that can quickly apply an effect of artistic style such as painting to an image.

Techniques are available for converting an input image to obtain an output image having a painting style. Such techniques are called non photo-realistic rendering (NPR) techniques. One of the NPR techniques is a technique for repeatedly adding a pattern resembling brush strokes to an image to obtain an image similar to that rendered in the style of an oil painting.

For example, Japanese Unexamined Patent Application Publication No. 8-44867 (corresponding U.S. Pat. No. 5,621,868) (hereinafter referred to the "patent literature") proposes an algorithm in which a process for replacing each pixel in a certain elliptical region with the value of the pixel at the center thereof is performed on an input image to generate a pattern resembling a brush stroke and to obtain an output image similar to an image rendered in the style of an oil painting.

In addition, A. Hertzmann has proposed, in "Painterly Rendering with Curved Brush Strokes of Multiple Sizes," Proc. Sgigraph 98, ACM Press, 1998, pp. 453-460 (hereinafter referred to as the "non-patent literature"), an algorithm in which an image buffer is repeatedly rendered over with brush stroke patterns to obtain output images and the squared error between the input image and each of the output images is reduced to obtain a resulting image similar to an image rendered in an oil painting style. In this technique, rendering with different shapes of brush stroke patterns makes it possible to provide various painting styles of output images. For example, rendering with a circular brush stroke pattern allows an output image similar to an image rendered in a pointillist style, and using curved brush strokes provides an output image similar to an image rendered in an impressionist style.

SUMMARY

However, the techniques proposed in the patent literature given above and by A. Hertzmann in the non-patent literature given above involve repeated rendering of brush strokes to obtain desired output images. For example, the output value of a certain pixel is determined after the value has been updated many times.

For this reason, the techniques proposed in the patent literature given above and by A. Hertzmann in the non-patent literature given above take a long processing time to obtain desired output images.

It is therefore desirable to quickly apply an effect of artistic style such as painting to an image.

An image processing apparatus according to an embodiment of the present disclosure includes a modification processing unit configured to modify an input image by distributing a value of each of pixels in the input image over a two-dimensional distribution area having a randomly different size and direction in accordance with modification characteristic information for distributing each pixel over the distribution area, the modification characteristic information being information for modifying the input image using a modification characteristic which is randomly different for each pixel position.

The image processing apparatus may further include a modification characteristic generation unit configured to generate the modification characteristic information.

The modification characteristic generation unit may include a pointillistic modification characteristic generation unit configured to generate pointillistic modification characteristic information concerning a pointillist style using a random pattern image and a predetermined search range, and a stroke modification characteristic generation unit configured to generate stroke modification characteristic information concerning a stroke using a search range determined from stroke direction information concerning a direction of the stroke.

The pointillistic modification characteristic generation unit may include a pointillistic coordinate detection unit configured to detect coordinates of a pixel having a minimum value or a maximum value in the predetermined search range for a pixel in the random pattern image, and a pointillistic modification characteristic calculation unit configured to calculate a positional relationship between the pixel in the random pattern image and the pixel whose coordinates are detected by the pointillistic coordinate detection unit to generate the pointillistic modification characteristic information. The stroke modification characteristic generation unit may include a search range determination unit configured to determine the search range from the stroke direction information, a stroke coordinate detection unit configured to detect coordinates of a pixel having a minimum value or a maximum value in the search range for a pixel in a pointillistic pattern image including the pixel whose coordinates are detected by the pointillistic coordinate detection unit, and a stroke modification characteristic calculation unit configured to calculate a positional relationship between the pixel in the pointillistic pattern image and the pixel whose coordinates are detected by the stroke coordinate detection unit to generate the stroke modification characteristic information.

The image processing apparatus may further include a modification characteristic combining unit configured to combine the pointillistic modification characteristic information and the stroke modification characteristic information to obtain composite modification characteristic information. The modification processing unit may modify the input image by distributing the value of each of the pixels in the input image over the distribution area in accordance with the composite modification characteristic information obtained by the modification characteristic combining unit.

The modification processing unit may include a pointillistic modification processing unit configured to modify the input image to obtain a modified image by distributing the value of each of the pixels in the input image over the distribution area in accordance with the pointillistic modification characteristic information generated by the pointillistic modification characteristic generation unit, and a stroke modification processing unit configured to modify the modified image obtained by the pointillistic modification processing unit, by distributing a value of each of pixels in the modified image obtained by the pointillistic modification processing unit over the distribution area in accordance with the stroke modification characteristic information generated by the stroke modification characteristic generation unit.

The image processing apparatus may further include a pointillistic modification characteristic adjustment unit configured to adjust a characteristic represented by the pointillistic modification characteristic information, and a stroke modification characteristic adjustment unit configured to adjust a characteristic represented by the stroke modification characteristic information.

The image processing apparatus may further include a selection unit configured to select a plurality of combinations of a degree to which the characteristic represented by the pointillistic modification characteristic information is adjusted and a degree to which the characteristic represented by the stroke modification characteristic information is adjusted. The pointillistic modification characteristic adjustment unit and the stroke modification characteristic adjustment unit may adjust the characteristic represented by the pointillistic modification characteristic information and the characteristic represented by the stroke modification characteristic information, respectively, in accordance with the plurality of combinations selected by a user using the selection unit.

The modification characteristic generation unit may include a first stroke modification characteristic generation unit configured to generate first stroke modification characteristic information using a random pattern image and a first search range determined from first stroke direction information concerning a first stroke direction, and a second stroke modification characteristic generation unit configured to generate second stroke modification characteristic information using a second search range determined from second stroke direction information concerning a second stroke direction, the second stroke direction information being information obtained by rotating the first stroke direction information.

The first stroke modification characteristic generation unit may include a first search range determination unit configured to determine the first search range from the first stroke direction information, a first coordinate detection unit configured to detect coordinates of a pixel having a minimum value or a maximum value in the first search range for a pixel in the random pattern image, and a first stroke modification characteristic calculation unit configured to calculate a positional relationship between the pixel in the random pattern image and the pixel whose coordinates are detected by the first coordinate detection unit to generate the first stroke modification characteristic information. The second stroke modification characteristic generation unit may include a second search range determination unit configured to determine the second search range from the second stroke direction information, a second coordinate detection unit configured to detect coordinates of a pixel having a minimum value or a maximum value in the second search range for a pixel in a stroke pattern image including the pixel whose coordinates are detected by the first coordinate detection unit, and a second stroke modification characteristic calculation unit configured to calculate a positional relationship between the pixel in the stroke pattern image and the pixel whose coordinates are detected by the second coordinate detection unit to generate the second stroke modification characteristic information.

The image processing apparatus may further include a modification characteristic combining unit configured to combine the first stroke modification characteristic information and the second stroke modification characteristic information to obtain composite modification characteristic information. The modification processing unit may modify the input image by distributing the value of each of the pixels in the input image over the distribution area in accordance with the composite modification characteristic information obtained by the modification characteristic combining unit.

The modification processing unit may include a first modification processing unit configured to modify the input image to obtain a modified image by distributing the value of each of the pixels in the input image over the distribution area in accordance with the first stroke modification characteristic information generated by the first stroke modification characteristic generation unit, and a second modification processing unit configured to modify the modified image obtained by the first modification processing unit, by distributing a value of each of pixels in the modified image obtained by the first modification processing unit over the distribution area in accordance with the second stroke modification characteristic information generated by the second stroke modification characteristic generation unit.

The modification characteristic generation unit may generate pointillistic modification characteristic information concerning a pointillist style using a random pattern image and a predetermined search range.

The modification characteristic generation unit may include a pointillistic coordinate detection unit configured to detect coordinates of a pixel having a minimum value or a maximum value in the predetermined search range for a pixel in the random pattern image, and a pointillistic modification characteristic calculation unit configured to calculate a positional relationship between the pixel in the random pattern image and the pixel whose coordinates are detected by the pointillistic coordinate detection unit to generate the pointillistic modification characteristic information.

The image processing apparatus may further include a jitter adding unit configured to add jitter to the input image before the input image is input to the modification processing unit, and a sharpening processing unit configured to perform a high-frequency emphasis process on the image modified by the modification processing unit.

The image processing apparatus may further include a modification characteristic adjustment unit configured to adjust a characteristic represented by the modification characteristic information, and a strength adjustment unit configured to adjust a strength of the jitter and the high-frequency emphasis process.

The image processing apparatus may further include a selection unit configured to select a plurality of combinations of a degree to which the characteristic represented by the modification characteristic information is adjusted and a degree to which the jitter and the high-frequency emphasis process are adjusted. The modification characteristic adjustment unit and the strength adjustment unit may adjust the characteristic represented by the modification characteristic information and the strength of the jitter and the high-frequency emphasis process, respectively, in accordance with the plurality of combinations selected by a user using the selection unit.

The image processing apparatus may further include a memory configured to hold the modification characteristic information generated by the modification characteristic generation unit.

The image processing apparatus may further include a memory configured to hold the modification characteristic information.

The modification characteristic information may be generated through detection of coordinates of a pixel having a minimum value or a maximum value in a predetermined search range for a pixel in a random pattern image and through calculation of a positional relationship between the pixel whose coordinates are detected and the pixel in the random pattern image.

An image processing method according to another embodiment of the present disclosure includes modifying an input image by distributing a value of each of pixels in the input image over a two-dimensional distribution area having a randomly different size and direction in accordance with modification characteristic information for distributing each pixel over the distribution area, the modification characteristic information being information for modifying the input image using a modification characteristic which is randomly different for each pixel position.

A program according to still another embodiment of the present disclosure is a program for causing a computer to execute an image processing method for executing an image processing method, including modifying an input image by distributing a value of each of pixels in the input image over a two-dimensional distribution area having a randomly different size and direction in accordance with modification characteristic information for distributing each pixel over the distribution area, the modification characteristic information being information for modifying the input image using a modification characteristic which is randomly different for each pixel position.

In an embodiment of the present disclosure, an input image is modified by distributing a value of each of pixels in the input image over a two-dimensional distribution area having a randomly different size and direction in accordance with modification characteristic information for distributing each pixel over the distribution area. The modification characteristic information is information for modifying the input image using a modification characteristic which is randomly different for each pixel position.

According to an embodiment of the present disclosure, an effect of artistic style such as painting can be quickly applied to an image.

BRIEF DESCRIPTION OF THE DRAWINGS

FIGS. 15A-C are diagrams illustrating filter characteristics corresponding to search range sizes;

FIG. 18 is a diagram illustrating the relationships between adjustment buttons and parameters;

FIG. 19 is a diagram illustrating the relationships between adjustment buttons and parameters;

FIG. 38 is a diagram illustrating the relationships between adjustment buttons and parameters.

DETAILED DESCRIPTION OF EMBODIMENTS

Embodiments of the present disclosure will be described hereinafter. The description will be given in the following order:

1. First embodiment (pointillist-style process)
2. Second embodiment (oil painting process (pointillist-style process+stroke process))
3. Third embodiment (computer)

First Embodiment

Example configuration of digital video camera

Figure 1:
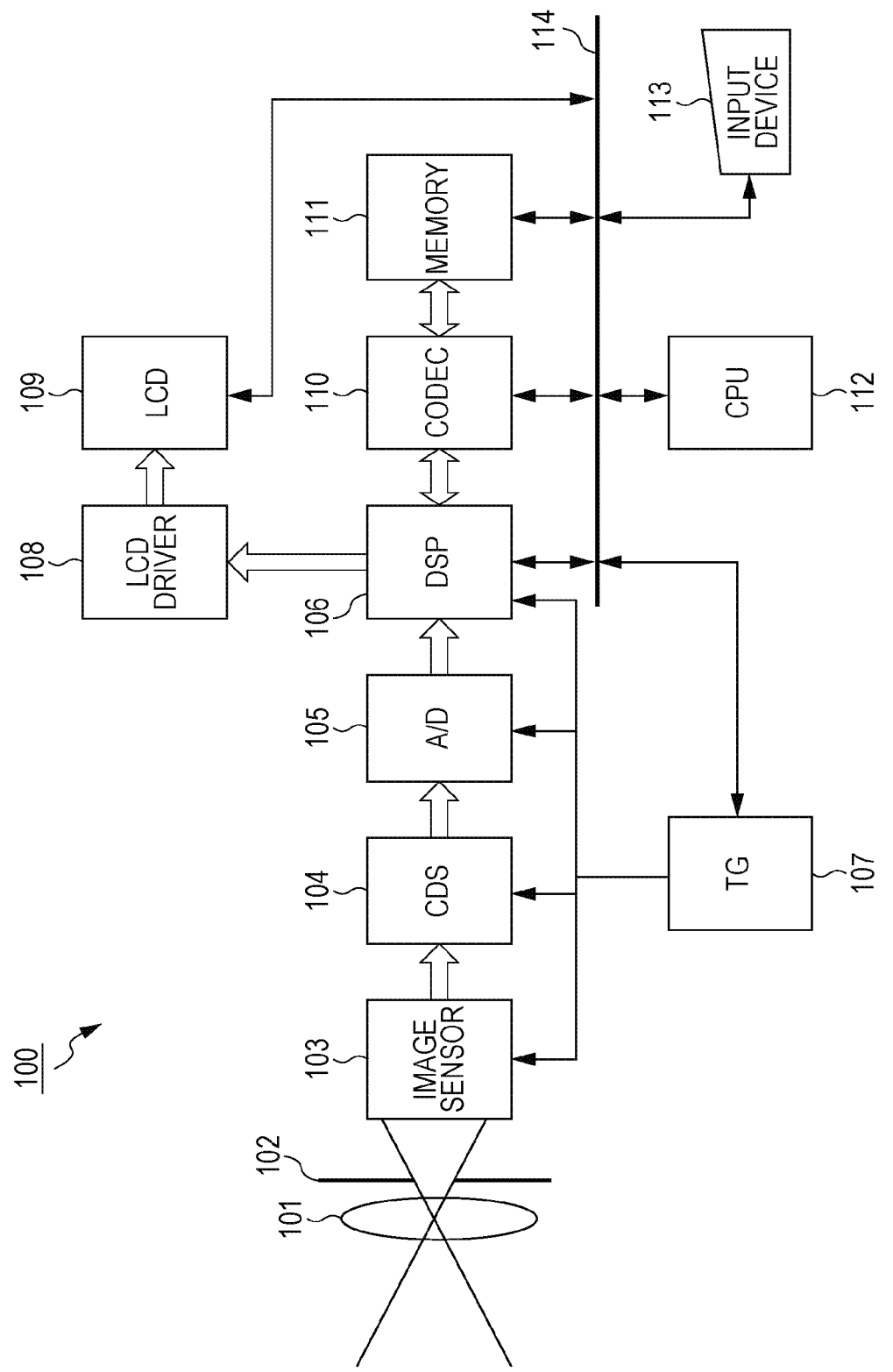
FIG. 1 is block diagram illustrating an example configuration of a digital video camera serving as an image processing apparatus according to an embodiment of the present technology.

FIG. 1 is a block diagram illustrating a digital video camera 100, which may be an image processing apparatus according to an embodiment of the present disclosure.

The digital video camera 100 illustrated in FIG. 1 is configured to capture an image of an object and to display the image of the object or record image data. The digital video camera 100 illustrated in FIG. 1 is further configured to convert an input image to obtain an output image having a painting style.

The digital video camera 100 includes a lens 101, an aperture 102, an image sensor 103, and a correlated double sampling (CDS) circuit 104. The digital video camera 100 further includes an analog/digital (A/D) converter 105, a digital signal processor (DSP) block 106, and a timing generator (TG) 107. The digital video camera 100 further includes a liquid crystal display (LCD) driver 108, an LCD 109, and a coder/decoder (CODEC) 110. The digital video camera 100 further includes a memory 111, a central processing unit (CPU) 112, an input device 113, and a bus 114.

The DSP block 106 is a block including a processor for signal processing (for example, a DSP) and a memory such as a random access memory (RAM) that holds image data. The DSP block 106 performs image processing, described below, by executing a predetermined program using the processor. The DSP block 106 is hereinafter referred to simply as the "DSP 106".

Incident light from the object, which has passed through an optical system including the lens 101, the aperture 102, and any other suitable element, first reaches the image sensor 103. The image sensor 103 includes a desired imaging device such as a charge coupled device (CCD) image sensor or a complementary metal oxide semiconductor (CMOS) image sensor. The image sensor 103 photoelectrically converts the incident light into electrical signals.

The image sensor 103 may be any device capable of photoelectric conversion.

An electrical signal output from the image sensor 103 is subjected to noise removal (or reduction) by the CDS circuit 104, and is converted into a digital signal by the A/D converter 105. The A/D converter 105 may be any device but is preferably a device capable of conversion into digital data having a larger number of gradation levels. For example, the A/D converter 105 may convert an input electrical signal into image data having a number of gradation levels (the number of gradation levels which can be represented by data having, for example, about 14 to 16 bits) larger than the number of gradation levels of normal digital video cameras (the number of gradation levels which can be represented by data having, for example, about 10 to 12 bits).

The digital image data converted by the A/D converter 105 is temporarily stored in the memory of the DSP 106. The timing generator 107 controls a signal processing system including the CDS circuit 104, the A/D converter 105, and the DSP 106 so that image data can be captured at a constant frame rate. That is, an image data stream is supplied to the DSP 106 at a constant frame rate.

After performing a painting-style conversion process, described below, on the image data, the DSP 106 supplies the image data subjected to image processing to the LCD driver 108 or the CODEC 110, if necessary.

The LCD driver 108 converts the image data supplied from the DSP 106 into an analog image signal. The LCD driver 108 supplies the analog image signal to the LCD 109, which may be a viewfinder of the digital video camera 100, to display an image based on the image signal.

The CODEC 110 encodes the image data supplied from the DSP 106 using a predetermined method, and records the encoded image data onto the memory 111 which may be a desired recording medium such as a semiconductor recording medium, a magnetic recording medium, a magneto-optical recording medium, or an optical recording medium.

The CPU 112 controls the overall processing of the digital video camera 100 in accordance with, for example, an instruction input by a user operating the input device 113. The input device 113 includes operation buttons such as a shutter button. The DSP 106, the timing generator 107, the CODEC 110, the memory 111, the LCD 109, the CPU 112, and the input device 113 are connected to one another via the bus 114.

Example Configuration of DSP

Figure 2:
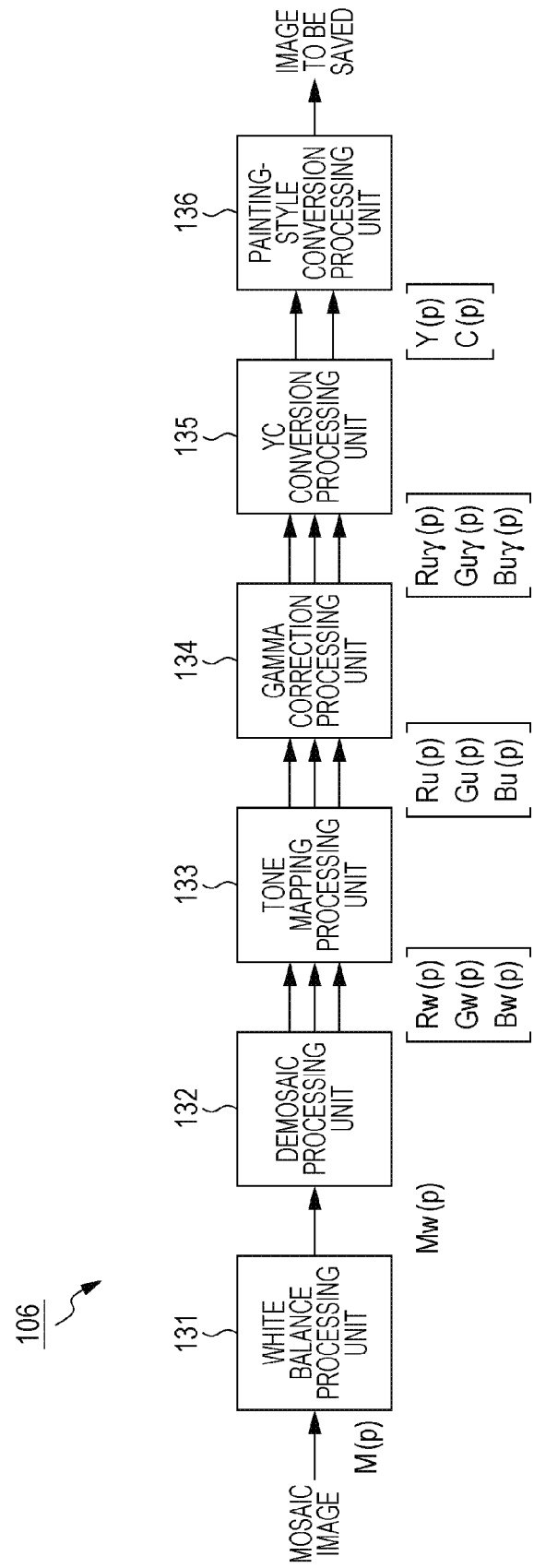
FIG. 2 is a block diagram illustrating an example configuration of a digital signal processor (DSP)

FIG. 2 is a block diagram illustrating an example configuration of functions implemented by an internal processor (or arithmetic unit) of the DSP 106 executing a predetermined program. The internal processor of the DSP 106 executes the predetermined program to implement functions including those of individual units of the DSP 106 illustrated in FIG. 2. The DSP 106 includes a white balance processing unit 131, a demosaic processing unit 132, a tone mapping processing unit 133, a gamma correction processing unit 134, a YC conversion processing unit 135, and a painting-style conversion processing unit 136.

The white balance processing unit 131 acquires a mosaic image based on image data of a moving image or any other desired image, which has been subjected to A/D conversion by the A/D converter 105. The mosaic image is an image in which pixels each storing data corresponding to a color component of any of red (R), green (G), and blue (B) are arranged in accordance with a color pattern called the Bayer pattern, and is also referred to as raw data.

The white balance processing unit 131 multiplies the pixel values of the individual pixels in the acquired mosaic image by an appropriate coefficient to adjust the white balance of the mosaic image so that the actual color of an achromatic region in the image of the object appears as an achromatic color. The white balance processing unit 131 supplies the mosaic image whose white balance has been adjusted to the demosaic processing unit 132. Hereinafter, the mosaic image whose white balance has been adjusted is represented by Mw.

The demosaic processing unit 132 performs demosaic processing on the mosaic image Mw supplied from the white balance processing unit 131 so that each pixel has all the R, G, and B components. Thus, three pieces of image data of R, G, and B images corresponding to three, R, G, and B color components are generated. The demosaic processing unit 132 supplies the generated three pieces of image data of the R, G, and B images to the tone mapping processing unit 133.

Three pieces of image data of R, G, and B images are hereinafter also referred to collectively as "RGB images". Hereinafter, furthermore, the pixel value of the pixel at a position p on the mosaic image is represented by M(p). Hereinafter, in addition, the pixel values of the pixel at the position p in the image data subjected to demosaic processing are represented by [Rw(p), Gw(p), Bw(p)], where Rw(p) denotes the pixel value of the R component, Gw(p) denotes the pixel value of the G component, and Bw(p) denotes the pixel value of the B component.

The tone mapping processing unit 133 performs tone mapping processing on the RGB images, and supplies the RGB images subjected to tone mapping processing to the gamma correction processing unit 134. Hereinafter, the pixel values of the pixel at the position p in the image data subjected to tone mapping processing are represented by [Ru(p), Gu(p), Bu(p)], where Ru(p) denotes the pixel value of the R component, Gu(p) denotes the pixel value of the G component, and Bu(p) denotes the pixel value of the B component.

The gamma correction processing unit 134 performs gamma correction on the RGB image subjected to tone mapping. The gamma correction processing unit 134 supplies the RGB images subjected to gamma correction to the YC conversion processing unit 135. Hereinafter, the pixel values of the pixel at the position p in the image data subjected to gamma correction are represented by [Ru$\gamma$(p), Gu$\gamma$(p), Bu$\gamma$(p)], where Ru$\gamma$(p) denotes the pixel value of the R component, Gu$\gamma$(p) denotes the pixel value of the G component, and Bu$\gamma$(p) denotes the pixel value of the B component.

The YC conversion processing unit 135 performs YC matrix processing and chroma-component band limiting on the RGB images subjected to gamma correction to generate a Y image including a luminance component (Y component) and a C image including a chrominance component (Cb or Cr component). The YC conversion processing unit 135 supplies the generated Y image and C image to the painting-style conversion processing unit 136. Hereinafter, the pixel values of the pixel at the position p in the image data output from the YC conversion processing unit 135 are represented by [Y(p), C(p)], where Y(p) denotes the value of the luminance component in the Y image, and C(p) denotes the value of the chrominance component in the C image. Hereinafter, furthermore, the Cb component in the C image is represented by Cb(p) and the Cr component in the C image is represented by Cr(p).

The painting-style conversion processing unit 136 performs a painting-style conversion process on the input image supplied from the YC conversion processing unit 135, that is, the Y image and C image, to obtain an image modified to have a painting style, and supplies the obtained image to the LCD driver 108 or the CODEC 110, if necessary, as an image to be saved. The input image is not limited to the Y image and the C image. The painting-style conversion processing unit 136 is configured to calculate, for example, a modification characteristic for generating a pointillist-style spatial pattern or a spatial pattern of impressionistic brush strokes, and to convert the input image into an image having a painting style in accordance with the modification characteristic.

The modification characteristic indicates information for modifying an input image using a modification characteristic which is randomly different for each pixel position, and is a characteristic for distributing each pixel over a two-dimensional distribution area whose size and direction is randomly different. The modification characteristic for generating a pointillist-style spatial pattern is a two-dimensional modification characteristic for an area formed of a basic pattern of a simple shape (for example, circle, polygon), and is generated using a random pattern image and a predetermined search range. In accordance with the two-dimensional modification characteristic, the input image is modified into a pointillistic image.

The modification characteristic for generating a spatial pattern of an impressionistic brush stroke is a one-dimensional modification characteristic, and is generated using a search range determined from information on the stroke direction. In accordance with the one-dimensional modification characteristic, the pointillistic image modified in accordance with the two-dimensional modification characteristic is further modified into an image with a long brush stroke.

Example Configuration of Painting-Style Conversion Processing Unit

Figure 3:
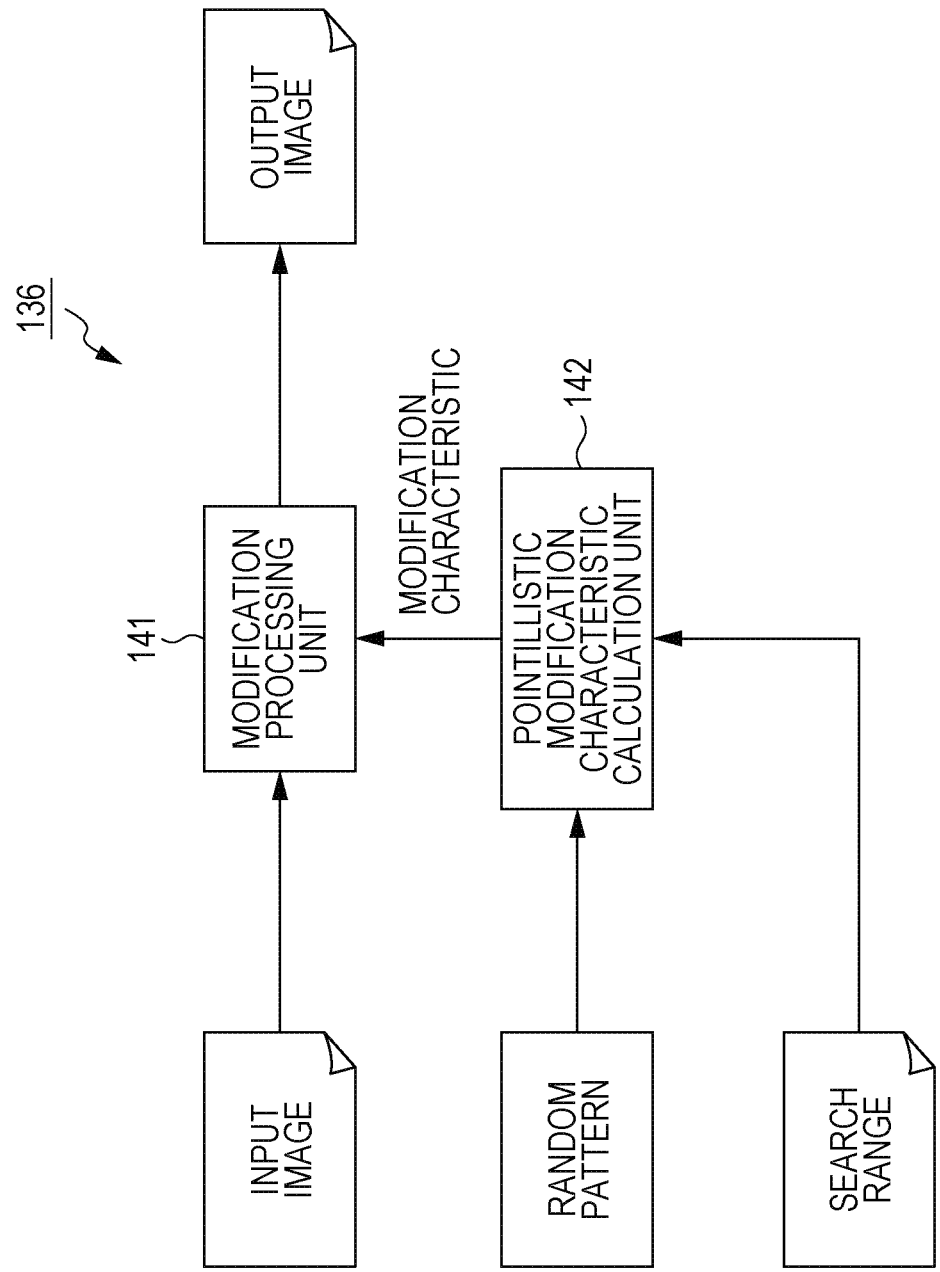
FIG. 3 is a block diagram illustrating an example configuration of a painting-style conversion processing unit.

FIG. 3 is a block diagram illustrating an example configuration of the painting-style conversion processing unit 136. The painting-style conversion processing unit 136 illustrated in FIG. 3 is configured to calculate a modification characteristic for generating a pointillist-style spatial pattern (hereinafter also referred to as a "pointillistic pattern", as appropriate), and modifies the input image using the calculated modification characteristic.

The painting-style conversion processing unit 136 includes a modification processing unit 141 and a pointillistic modification characteristic calculation unit 142.

The modification processing unit 141 is supplied with an input image from the YC conversion processing unit 135 and a modification characteristic map from the pointillistic modification characteristic calculation unit 142. The modification processing unit 141 modifies the input image supplied from the YC conversion processing unit 135 in accordance with the modification characteristic represented by the modification characteristic map supplied from the pointillistic modification characteristic calculation unit 142, and supplies the modified image to the downstream as an output image.

The pointillistic modification characteristic calculation unit 142 is supplied with, for example, a random pattern and a search range from the CPU 112 or the input device 113 illustrated in FIG. 1 or any other suitable device. The pointillistic modification characteristic calculation unit 142 calculates a modification characteristic for generating a pointillist-style spatial pattern using the supplied random pattern and search range. That is, the pointillistic modification characteristic calculation unit 142 calculates a modification characteristic (relative position, positional relationship) into a pixel for which the random pattern exhibits a minimum value in an area defined by the search range.

The pointillistic modification characteristic calculation unit 142 supplies the calculated modification characteristic to the modification processing unit 141 as a modification characteristic map.

Figure 4:
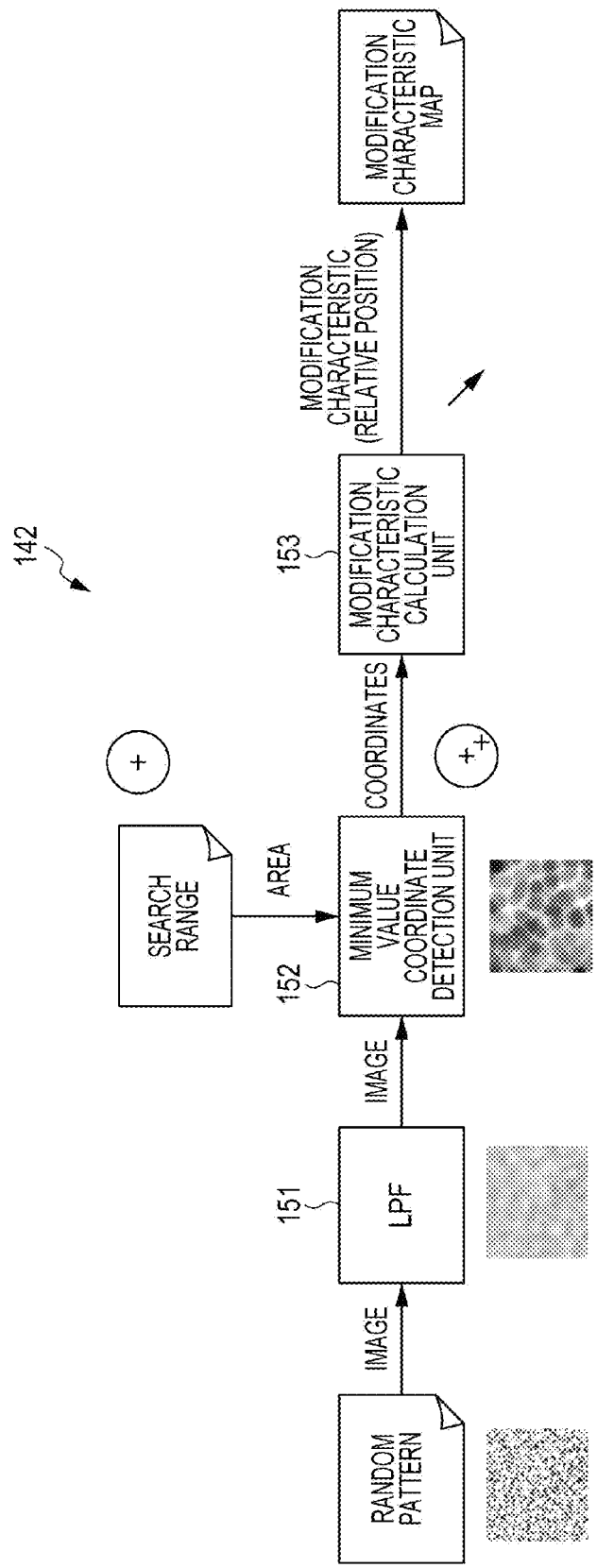
FIG. 4 is a block diagram illustrating an example configuration of a pointillistic modification characteristic calculation unit.

Example Configuration of Pointillistic Modification Characteristic Calculation Unit FIG. 4 is a block diagram illustrating an example configuration of the pointillistic modification characteristic calculation unit 142. In the example illustrated in FIG. 4, the pointillistic modification characteristic calculation unit 142 includes a low-pass filter (LPF) 151, a minimum value coordinate detection unit 152, and a modification characteristic calculation unit 153.

An image representing a random pattern is supplied to the LPF 151. The random pattern may have any size. For example, if the random pattern has a smaller size than the input image, a plurality of patterns may be arranged in a systematic manner like tiles.

The LPF 151 cuts off the high-frequency component of the random-pattern image, and supplies the random-pattern image whose high-frequency component has been cut off to the minimum value coordinate detection unit 152.

An area representing the search range is supplied to the minimum value coordinate detection unit 152. A circle with a plus (+) mark at the center thereof, which is illustrated in FIG. 4 on the right side of the "search range" input to the minimum value coordinate detection unit 152, represents a search range centered on a given pixel (indicated by the plus (+) mark). The search range corresponds to the range of dots (circular area) rendered with a pointillist technique. For example, a plurality of search ranges having different sizes may be provided and switched for use depending on each area of the input image.

The minimum value coordinate detection unit 152 detects the coordinates (position) of the pixel having the minimum value in the area defined by the search range for the selected pixel. The minimum value in the area defined by the search range is hereinafter also referred to as a "local minimum value". The minimum value coordinate detection unit 152 supplies the coordinates of the selected pixel and the detected coordinates to the modification characteristic calculation unit 153. As described above, a circle with a plus (+) mark at the center thereof, which is illustrated in FIG. 4 below the "coordinates" output from the minimum value coordinate detection unit 21, represents a search range, and the plus (+) mark other than the plus (+) mark at the center of the search range represents the coordinates of the pixel having the minimum value in the search range.

The modification characteristic calculation unit 153 calculates the difference between the coordinates of the selected pixel and the detected coordinates in order to generate a pointillist-style spatial pattern, and supplies the relative position representing the calculated difference to the modification processing unit 141 as a modification characteristic map. In FIG. 4, an arrow shown below the "relative position" output from the modification characteristic calculation unit 153 represents the relative position. This output (relative position) is defined for each pixel in the input image.

Figure 5:
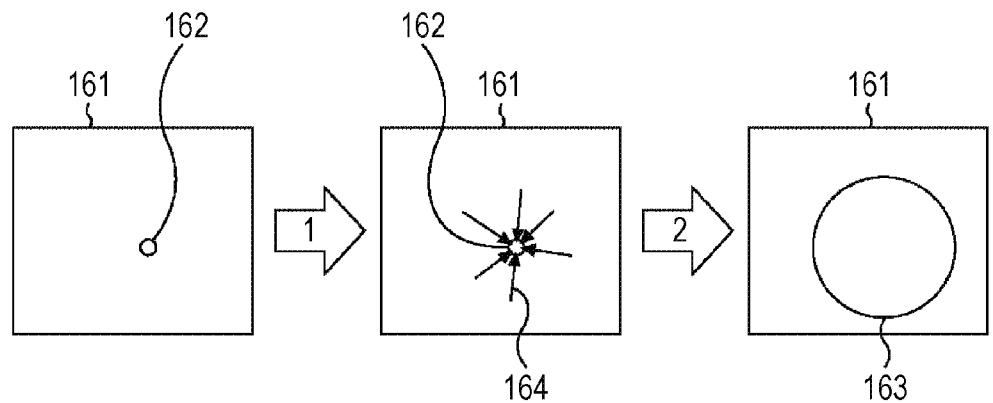
FIG. 5 is a diagram illustrating a modification characteristic calculation and modification process.

A specific description will be given with reference to FIG. 5. In the example illustrated in FIG. 5, input images 161 to be input to the modification processing unit 141 are illustrated. The left input image 161 in FIG. 5 has a pixel 162 having a local minimum value. Since the modification characteristic represents the position of an input pixel selected in the modification process, arrows indicating modification characteristics 164 in the example illustrated in FIG. 5 are oriented in the direction opposite to the pixel value distribution direction in the modification process.

As indicated by an arrow 1, modification is applied to neighboring pixels (pixels in a search range area 163) of the pixel 162 on the input image 161 in accordance with the modification characteristics 164, and the value of the pixel 162 is output. As a result, as illustrated in the right input image 161 in FIG. 5, which is indicated by an arrow 2, the value of the pixel 162 is spread (or distributed) over the search range area 163 in the input image 161.

That is, the modification characteristic calculation unit 153 calculates the modification characteristics 164 with which the value of the pixel 162 having a local minimum value on the input image 161 to be input to the modification processing unit 141 is spread (or distributed) over the search range area 163.

Then, the modification processing unit 141 modifies the input image to distribute the value of the pixel 162 having a local minimum value over the search range area 163 in accordance with the calculated modification characteristics 164.

The modification characteristics 164, that is, the modification characteristics of the individual pixels, are given ordinal rank. If the search range area 163 is not affected by other local minimum values, as indicated by the search range area 163, a pointillist style (or a circular shape) is used. If the search range area 163 has a portion that overlaps any other smaller local minimum value area, a deformed shape, rather than a circular shape, part of which is lacking due to the modification characteristic of a pixel having another local minimum value, is used. This may imply that a modification characteristic created from a smaller local minimum value represents a brush stroke lying on top of an upper layer (top surface side). A brush stroke on a lower layer is hidden by a brush stroke on an upper layer.

While the basic shape is basically circular as indicated by the area 163, in actuality, the modification processing unit 141 modifies the input image so as to distribute the value of a pixel located in a lower layer over such a deformed shape as described above. Applying modification to all the pixels allows an observer to perceive the deformed shape as a circular aggregate (or as being pointillistic) because a circular area as a modification characteristic result of pixels located on the top layer is located on the side nearer the observer. This holds true for a brush stroke image (image with a long brush stroke), which will be described below with reference to FIG. 21 and the subsequent drawings, although the description is omitted.

While pointillist-style rendering has been described in the context of a circular area, any shape of rendering which can be eventually perceived as being pointillistic, other than a circle or an ellipse, such as a polygon or a rectangle-like shape, may also be used.

In the example illustrated in FIG. 4 described above, the pointillistic modification characteristic calculation unit 142 includes the LPF 151. However, the LPF 151 may be removed because a modification characteristic map is output but an image is not output from the pointillistic modification characteristic calculation unit 142.

Example Configuration of Modification Processing Unit

Figure 6:
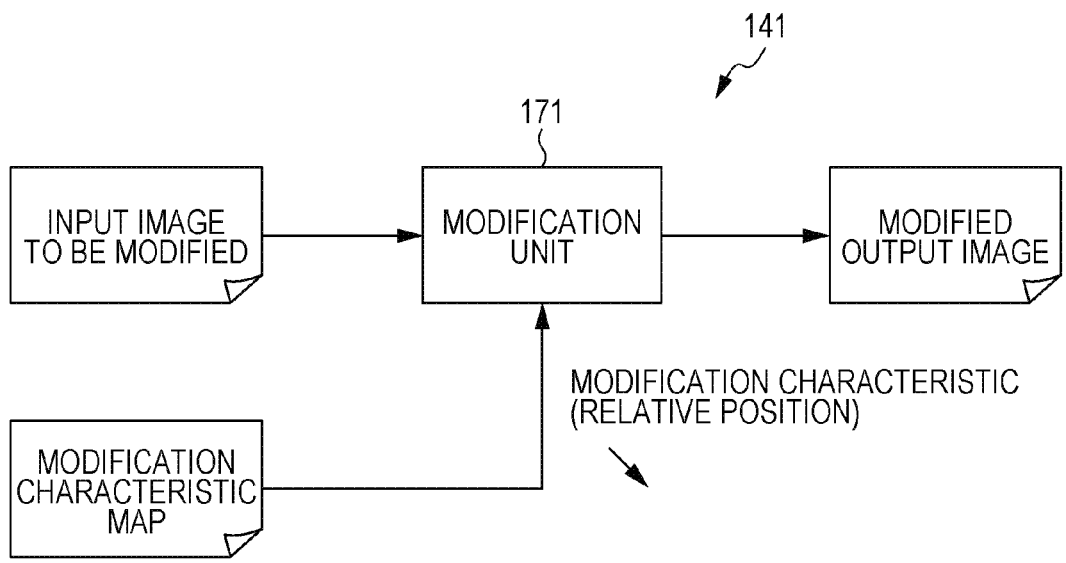
FIG. 6 is a block diagram illustrating an example configuration of a modification processing unit.

FIG. 6 is a block diagram illustrating an example configuration of the modification processing unit 141. In the example illustrated in FIG. 6, the modification processing unit 141 includes a modification unit 171. The modification unit 171 is the minimum unit of an image processing apparatus according to an embodiment of the present disclosure.

The modification unit 171 is supplied with an input image to be modified, from the YC conversion processing unit 135. The modification unit 171 is also supplied with a modification characteristic map from the pointillistic modification characteristic calculation unit 142.

The modification unit 171 modifies the input image in accordance with the modification characteristic (relative position) represented by the modification characteristic map, and outputs the modified output image to the downstream. In response to the input of modification characteristics for producing effects of a pointillist style, the modification unit 171 performs a pointillist-style process.

Flow of Image Processing

Figure 7:
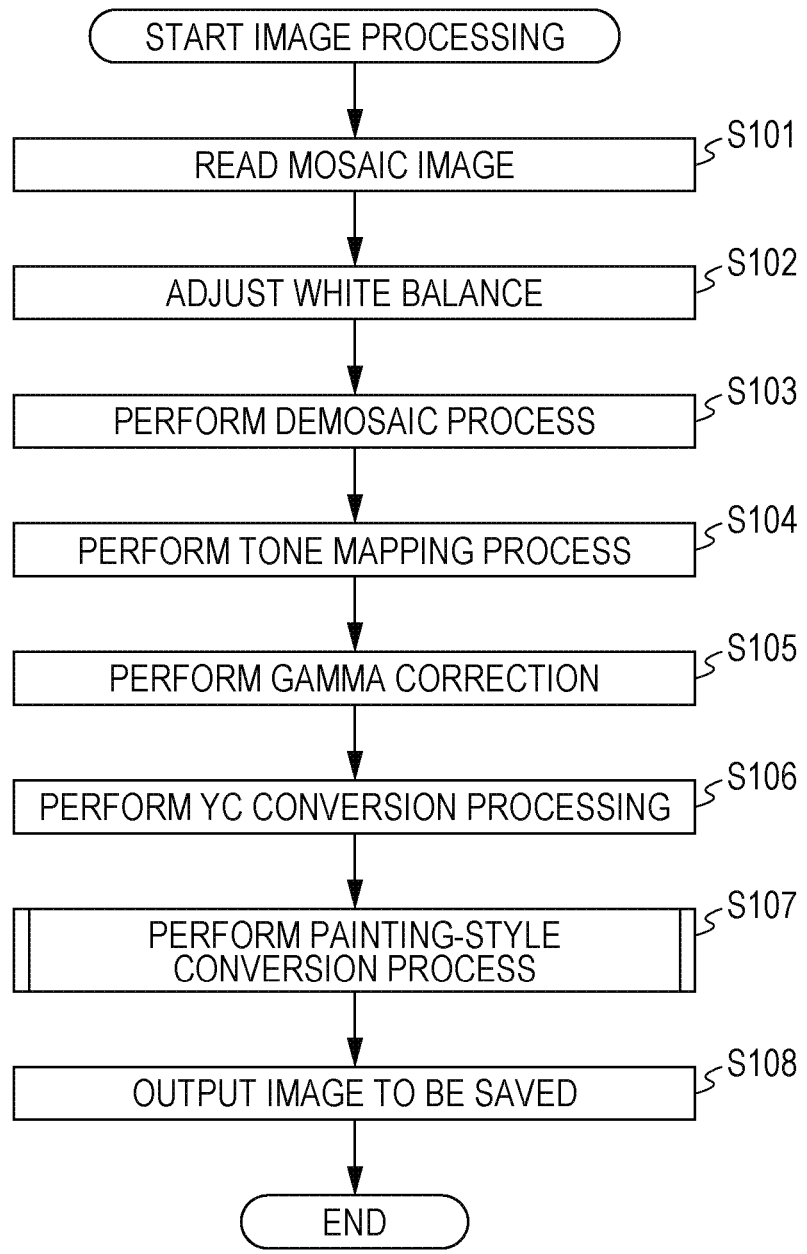
FIG. 7 is a flowchart illustrating an example of image processing.

Next, image processing executed by the DSP 106 of the digital video camera 100 will be described with reference to a flowchart illustrated in FIG. 7. The image processing is started, for example, when image capture using the digital video camera 100 illustrated in FIG. 1 is started and the supply of image data (mosaic image) from the A/D converter 105 to the DSP 106 is started. The image data supplied to the DSP 106 is stored in the internal memory (not illustrated) of the DSP 106.

In step S101, the white balance processing unit 131 reads a mosaic image. Specifically, the white balance processing unit 131 reads the mosaic image of a beginning frame stored in the internal memory (not illustrated) of the DSP 106.

In step S102, the white balance processing unit 131 adjusts the white balance of the acquired mosaic image, and supplies the resulting mosaic image to the demosaic processing unit 132.

In step S103, the demosaic processing unit 132 performs a demosaic process. That is, the demosaic processing unit 132 performs a demosaic process on the mosaic image supplied from the white balance processing unit 131 to generate RGB images, and supplies the RGB images to the tone mapping processing unit 133.

In step S104, the tone mapping processing unit 133 performs a tone mapping process to correct the signal levels of the RGB images supplied from the demosaic processing unit 132. Then, the tone mapping processing unit 133 supplies the RGB images whose signal levels have been corrected to the gamma correction processing unit 134.

In step S105, the gamma correction processing unit 134 performs gamma correction on the RGB images supplied from the tone mapping processing unit 133, and supplies the resulting RGB images to the YC conversion processing unit 135.

In step S106, the YC conversion processing unit 135 performs YC conversion processing. For example, the YC conversion processing unit 135 performs YC matrix processing and chroma-component band limiting on the RGB images supplied from the gamma correction processing unit 134 to generate the Y image and the C image from the RGB images. The YC conversion processing unit 135 supplies the Y image and the C image to the painting-style conversion processing unit 136.

In step S107, the painting-style conversion processing unit 136 performs a painting-style conversion process. The details of the painting-style conversion process will be described below with reference to FIG. 8.

In step S108, the painting-style conversion processing unit 136 outputs an image converted to have a painting style to the LCD driver 108 or the CODEC 110 as an image to be saved.

In accordance with the output of the image, for example, the LCD driver 108 converts the image data supplied from the DSP 106 into an analog image signal, and supplies the analog image signal to the LCD 109 to display an image based on the image signal.

Alternatively, in accordance with the output of the image, for example, the CODEC 110 encodes the image data supplied from the DSP 106 using a predetermined method, and records the encoded image data onto the memory 111.

Accordingly, the digital video camera 100 performs image processing.

Flow of Painting-Style Conversion Process

Figure 8:
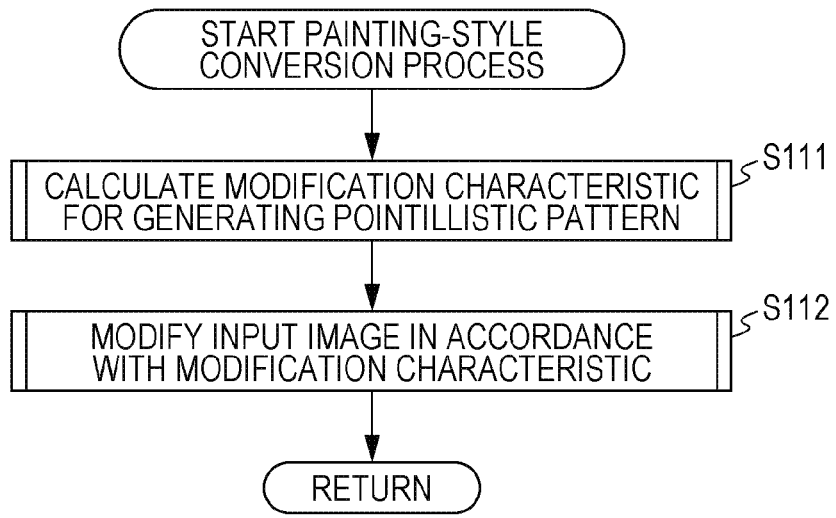
FIG. 8 is a flowchart illustrating an example of a painting-style conversion process.

Next, the painting-style conversion process in step S107 in FIG. 7 will be described with reference to a flowchart illustrated in FIG. 8.

A random pattern and a search range are supplied to the pointillistic modification characteristic calculation unit 142 from, for example, the CPU 112 or the input device 113 illustrated in FIG. 1 or any other suitable device.

In step S111, the pointillistic modification characteristic calculation unit 142 calculates a modification characteristic for generating a pointillistic pattern that is a pointillist-style spatial pattern, using the supplied random pattern and search range. The modification characteristic calculation process will be described below with reference to FIG. 9. The pointillistic modification characteristic calculation unit 142 supplies the calculated modification characteristic to the modification processing unit 141 as a modification characteristic map.

Further, the modification processing unit 141 is supplied with an input image from the YC conversion processing unit 135.

In step S112, the modification processing unit 141 modifies the input image supplied from the YC conversion processing unit 135 in accordance with the modification characteristic represented by the modification characteristic map supplied from the pointillistic modification characteristic calculation unit 142. The modification process will be described below with reference to FIG. 11. The modification processing unit 141 supplies the modified image to the downstream as an output image.

Flow of Modification Characteristic Calculation Process

Figure 9:
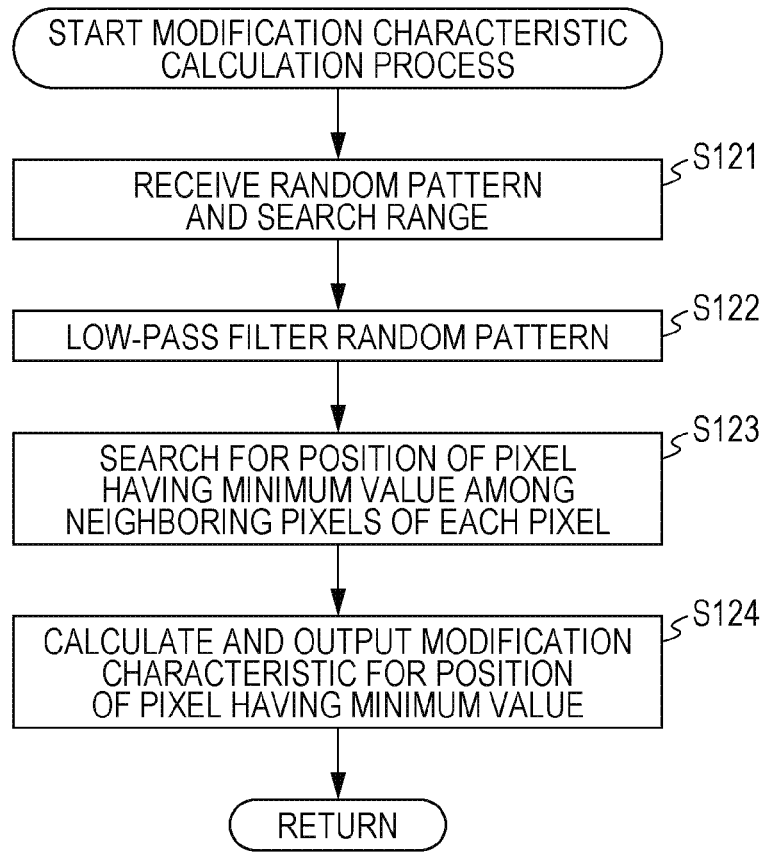
FIG. 9 is a flowchart illustrating an example of a modification characteristic calculation process.

Next, the modification characteristic calculation process in step S111 in FIG. 8 will be described with reference to a flowchart illustrated in FIG. 9.

In step S121, the LPF 151 receives the random pattern, and the minimum value coordinate detection unit 152 receives the search range.

In step S122, the LPF 151 low-pass filters the image of the random pattern, and supplies the low-pass filtered image to the minimum value coordinate detection unit 152.

In step S123, the minimum value coordinate detection unit 152 searches for the position (coordinates) of the pixel having the minimum value among the neighboring pixels (in the area defined by the search range) of each pixel, and supplies the obtained coordinates to the modification characteristic calculation unit 153.

In step S124, the modification characteristic calculation unit 153 calculates a modification characteristic (relative position) for the found position of the pixel having the minimum value from the pixels to be searched, and outputs the calculated modification characteristic to the modification unit 171 as a modification characteristic map.

Figure 10:
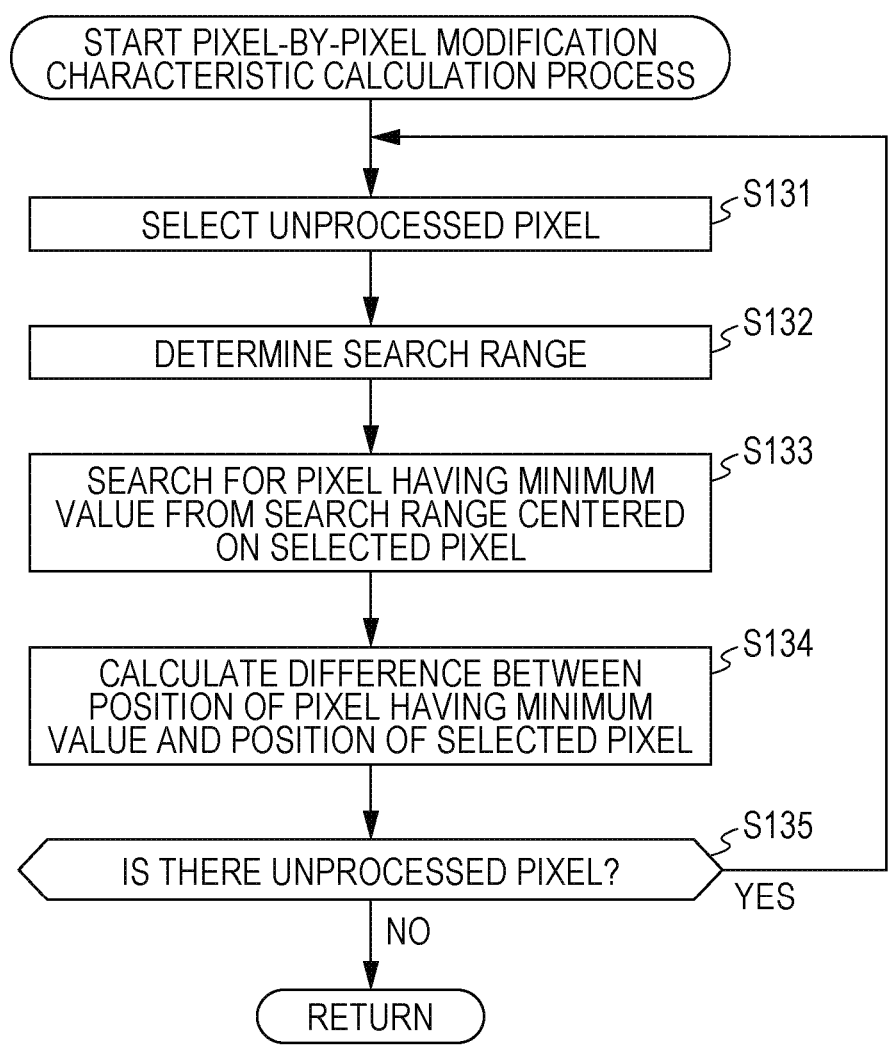
FIG. 10 is a flowchart illustrating an example of a pixel-by-pixel modification characteristic calculation process.

The processing of steps S123 and S124 described above is performed on a pixel-by-pixel basis, and a detailed description thereof will be made with reference to FIG. 10. FIG. 10 is a flowchart illustrating a pixel-by-pixel modification characteristic calculation process.

In step S131, the minimum value coordinate detection unit 152 selects an unprocessed pixel in the image supplied from the LPF 151. In step S132, the minimum value coordinate detection unit 152 determines a search range centered on the selected pixel on the basis of the supplied search range.

In step S133, the minimum value coordinate detection unit 152 searches for the pixel having the minimum value from an area defined by the search range centered on the selected pixel. The minimum value coordinate detection unit 152 supplies the coordinates of the selected pixel and the coordinates of the detected pixel having the minimum value to the modification characteristic calculation unit 153.

In step S134, the modification characteristic calculation unit 153 calculates the difference between the position of the pixel having the minimum value and the position of the selected pixel using the coordinate information supplied from the minimum value coordinate detection unit 152, and stores a relative position indicating the calculated difference in a modification characteristic map.

In step S135, the minimum value coordinate detection unit 152 determines whether or not there is an unprocessed pixel. If it is determined that there is an unprocessed pixel, the process returns to step S131 and the subsequent processing is repeated.

If it is determined in step S135 that there is no unprocessed pixel, the pixel-by-pixel modification characteristic calculation process ends.

Flow of Modification Process

Figure 11:
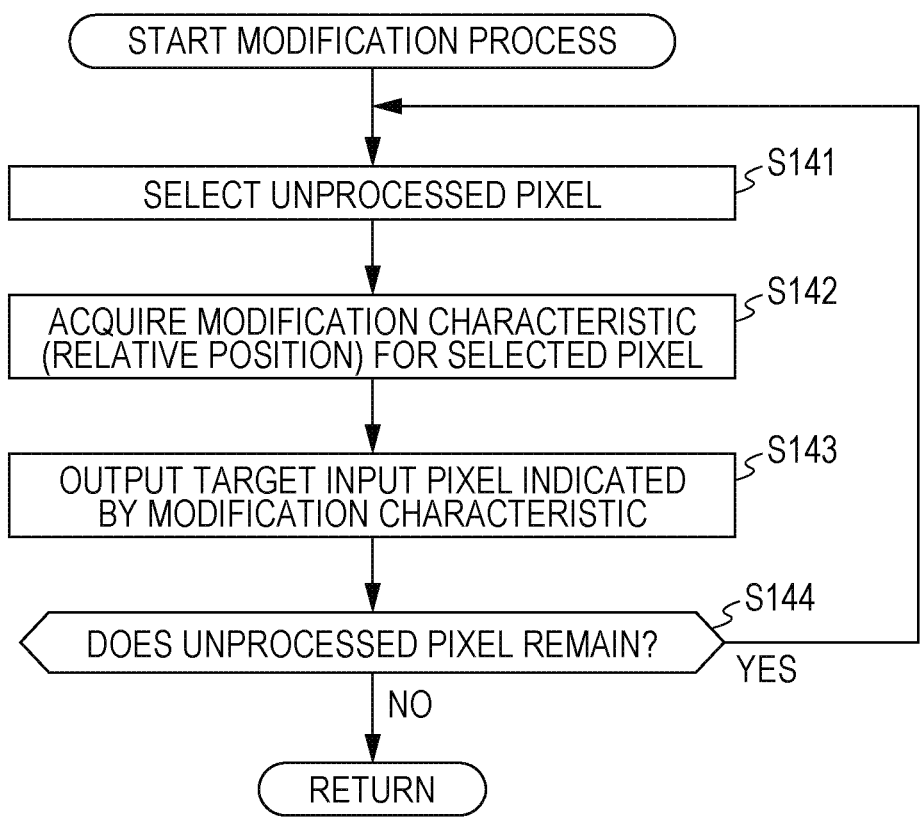
FIG. 11 is a flowchart illustrating an example of a modification process.

Next, the modification process in step S112 in FIG. 8 will be described with reference to a flowchart illustrated in FIG. 11.

The modification unit 171 is supplied with an input image to be modified from the YC conversion processing unit 135. The modification unit 171 is also supplied with a modification characteristic map from the pointillistic modification characteristic calculation unit 142.

In step S141, the modification unit 171 selects an unprocessed pixel in the input image. In step S142, the modification unit 171 acquires the modification characteristic (relative position) (for example, the modification characteristics 164 illustrated in FIG. 5) for the selected pixel from the modification characteristic (relative position) indicated by the modification characteristic map.

In step S143, the modification unit 171 outputs, instead of the selected pixel, the target input pixel (for example, the pixel 162 illustrated in FIG. 5 having the minimum value) indicated by the acquired modification characteristic. That is, the pixel value of the pixel having the minimum value is output instead of the pixel value of the selected pixel.

In step S144, the modification unit 171 determines whether or not there is an unprocessed pixel. If it is determined that there is an unprocessed pixel, the process returns to step S141 and the subsequent processing is repeated.

If it is determined in step S144 that there is no unprocessed pixel, the modification process ends.

Accordingly, a modification characteristic for generating a pointillist-style spatial pattern is calculated, and the input image is modified using the calculated modification characteristic. That is, a pixel value is distributed in accordance with the calculated modification characteristic. Thus, a pointillist-style image can be easily and quickly obtained.

Another Example Configuration of Painting-Style Conversion Processing Unit

Figure 12:
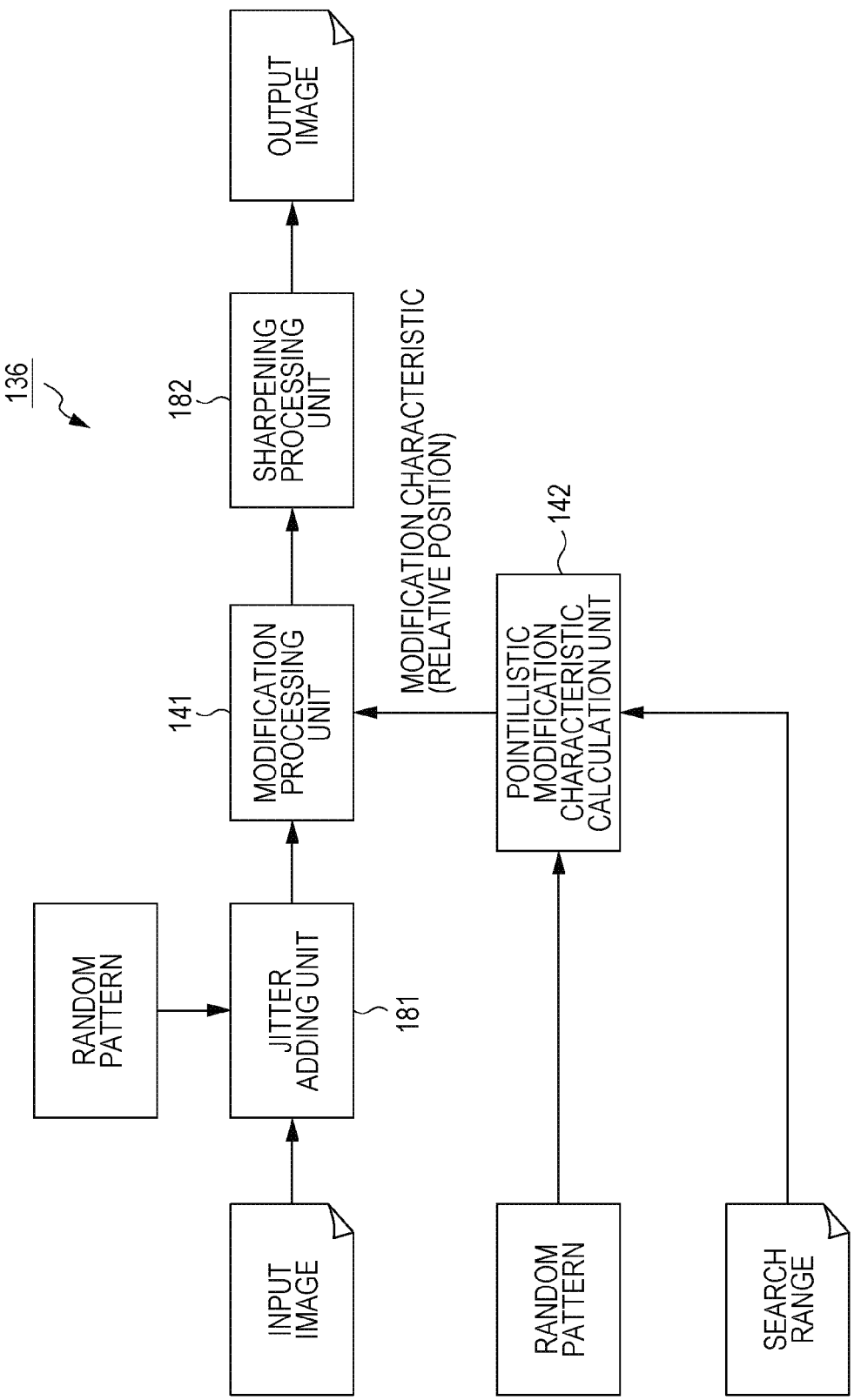
FIG. 12 is a block diagram illustrating another example configuration of the painting-style conversion processing unit.

FIG. 12 is a block diagram illustrating an example configuration of the painting-style conversion processing unit 136. The painting-style conversion processing unit 136 illustrated in FIG. 12 is an example of an extended version of the painting-style conversion processing unit 136 illustrated in FIG. 3, and has a configuration capable of adjusting the strength of an output brush stroke (or touch).

Similarly to the painting-style conversion processing unit 136 illustrated in FIG. 3, the painting-style conversion processing unit 136 illustrated in FIG. 12 includes a modification processing unit 141 and a pointillistic modification characteristic calculation unit 142.

The painting-style conversion processing unit 136 illustrated in FIG. 12 further includes a jitter adding unit 181 and a sharpening processing unit 182.

In the painting-style conversion processing unit 136, the jitter adding unit 181 is located upstream of the modification processing unit 141, and the sharpening processing unit 182 is located downstream of the modification processing unit 141.

The input image supplied from the YC conversion processing unit 135 is fed to the jitter adding unit 181. A random pattern is also supplied to the jitter adding unit 181 from, for example, the CPU 112 illustrated in FIG. 1 or any other suitable device. The jitter adding unit 181 applies jitter to the input image using the random pattern, and supplies the image with jitter applied thereto to the modification processing unit 141.

The modification processing unit 141 modifies the image with jitter applied thereto, which is supplied from the jitter adding unit 181, in accordance with the modification characteristic map supplied from the pointillistic modification characteristic calculation unit 142, and supplies the modified image to the sharpening processing unit 182.

The sharpening processing unit 182 sharpens the modified image, and supplies the sharpened image to the downstream as an output image.

With the above configuration, the strength of jitter can be adjusted and the variation in the colors of pointillist dots can be increased, resulting in the contrast between dots being increased and strong brush strokes being obtained. That is, the strength of a brush stroke can be adjusted using two characteristics: the contrast between dots and the clarity of boundaries.

Example Configuration of Sharpening Processing Unit

Figure 13:
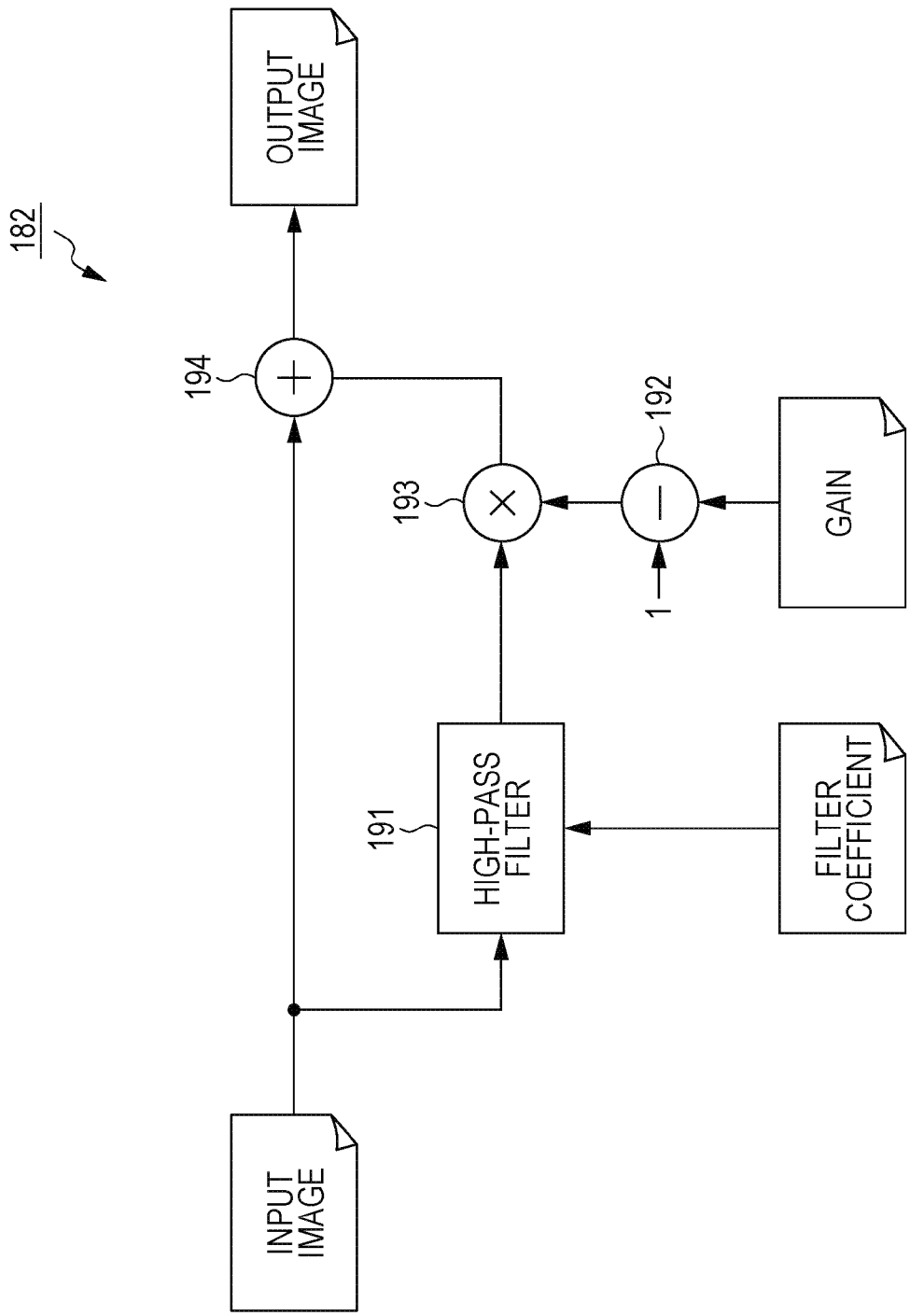
FIG. 13 is a block diagram illustrating an example configuration of a sharpening processing unit.

FIG. 13 is a block diagram illustrating an example configuration of the sharpening processing unit 182.

The sharpening processing unit 182 illustrated in FIG. 13 includes a high-pass filter 191, a subtractor 192, a multiplier 193, and an adder 194.

The signal of the image supplied from the modification processing unit 141 is input to the high-pass filter 191 and the adder 194. The high-pass filter 191 is supplied with a filter coefficient and the like from the CPU 112 or the input device 113 illustrated in FIG. 1 or any other suitable device. The high-pass filter 191 sets a filter characteristic in accordance with the filter coefficient and the like. The high-pass filter 191 high-pass filters the signal of the input image using the set filter characteristic, and outputs the filtered high-frequency component signal to the multiplier 193.

The subtractor 192 is supplied with 1 and a gain from the CPU 112 or the input device 113 illustrated in FIG. 1 or any other suitable device. The subtractor 192 subtracts 1 from the gain, and outputs the resulting value to the multiplier 193.

The multiplier 193 multiplies the high-frequency component signal supplied from the high-pass filter 191 by the value obtained by subtracting 1 from the gain to emphasize the high-frequency component by the gain, and outputs the high-frequency component signal emphasized by the gain to the adder 194.

The adder 194 combines the signal of the input image and the emphasized high-frequency component signal to obtain a composite image, and outputs the composite image to the modification processing unit 141.

Here, in the sharpening process for emphasizing a brush stroke, the filter characteristic (i.e., frequency range) of the high-pass filter 191 is set in accordance with the characteristics (e.g., strength, etc.) of the brush stroke.

Figures 14, 15:
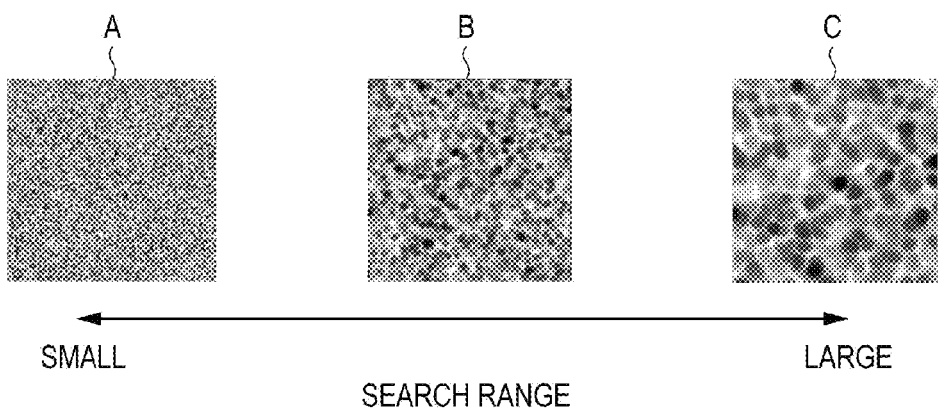
FIG. 14 is a diagram illustrating an example for setting a filter characteristic.

For example, the filter characteristic for the frequency band suitable for "emphasis of the brush stroke" is set as illustrated in FIG. 14. In the example illustrated in FIG. 14, the strength of the brush stroke is expressed via the type of painting-style process and the pointillist dot radius. That is, the pointillist dot radius and the filter characteristic correlate with each other.

In the example illustrated in FIG. 14, if the painting-style process is a pointillist-style process and the search range (pointillist dot radius) is 2 pixel long, the filter characteristic (cut-off frequency) is set to 4 pixels. If the painting-style process is a pointillist-style process and the search range (pointillist dot radius) is 3 pixel long, the filter characteristic (cut-off frequency) is set to 5 pixels.

Furthermore, if the painting-style process is a pointillist-style process and the search range (pointillist dot radius) is 4 pixel long, the filter characteristic (cut-off frequency) is set to 7 pixels. In addition, if the painting-style process is an oil painting process and the search range (pointillist dot radius) is 2 pixel long, the filter characteristic (cut-off frequency) is set to 5 pixels.

The oil painting process is a process including the pointillist-style process and the stroke process, which will be described below with reference to FIG. 21 and the following drawings.

In order to adjust the strength of a brush stroke, a memory that holds intermediate results is provided. Holding intermediate results in the memory enables high-speed reprocessing. For example, if only the sharpening processing unit 182 is to be controlled, the output of the modification processing unit 141 may be held in the memory and may be recycled. In addition, for example, if the strength of jitter to be applied by the jitter adding unit 181 is to be adjusted, the output from the pointillistic modification characteristic calculation unit 142 may be held in the memory and may be recycled. Consequently, part of the arithmetic operation for adjusting the strength of the brush stroke may be removed, resulting in the speed of the operation being increased.

The appearance of a brush stroke in the output image can also be changed by, for example, changing the size of the search range in addition to the strength of the brush stroke. For example, as illustrated in FIG. 15, as the size of the search range increases, the pixel size of the filter characteristic also increases, and an image with a rough brush stroke may be obtained.

In the example illustrated in FIG. 15, images A, B, and C which are modified so that the search range is sequentially increased (widened) gradually from the left to the right are illustrated. That is, of the three images, the image A with the smallest search range is an image with the most precise brush strokes, and the image C with the largest search range is an image with the roughest brush strokes. The brush strokes of the image B with the search range larger than that of the image A and smaller than that of the image C are rougher than those of the image A and are more precise than those of the image C.

An adjustment unit for adjusting the search range to be input to the pointillistic modification characteristic calculation unit 142 in the manner described above may be included in the pointillistic modification characteristic calculation unit 142 or the painting-style conversion processing unit 136.

Flow of Painting-Style Conversion Process

Figure 16:
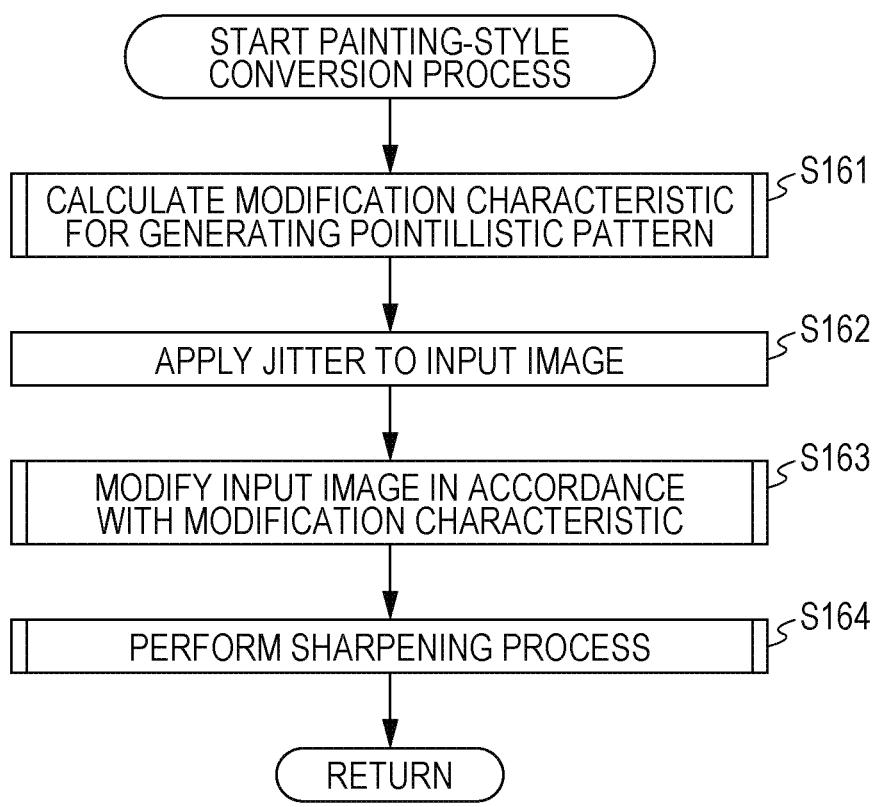
FIG. 16 is a flowchart illustrating an example of the painting-style conversion process.

Next, the painting-style conversion process executed by the painting-style conversion processing unit 136 illustrated in FIG. 12 will be described with reference to a flowchart illustrated in FIG. 16. The painting-style conversion process is an example of the painting-style conversion process in step S107 in FIG. 7, and is another example of the painting-style conversion process in FIG. 8.

The pointillistic modification characteristic calculation unit 142 is supplied with a random pattern and a search range from, for example, the CPU 112 or the input device 113 illustrated in FIG. 1 or any other suitable device.

In step S161, the pointillistic modification characteristic calculation unit 142 calculates a modification characteristic for generating a pointillistic pattern that is a pointillist-style spatial pattern, using the supplied random pattern and search range. The modification characteristic calculation process is basically similar to the modification characteristic calculation process described above with reference to FIG. 9, and a description thereof is thus omitted because it is redundant.

The pointillistic modification characteristic calculation unit 142 supplies the calculated modification characteristic to the modification processing unit 141 as a modification characteristic map.

In step S162, the jitter adding unit 181 adds (or applies) jitter to the input image supplied from the YC conversion processing unit 135 using the random pattern supplied from the CPU 112 or any other suitable device. The jitter adding unit 181 supplies an image with jitter applied thereto to the modification processing unit 141.

In step S163, the modification processing unit 141 modifies the input image supplied from the jitter adding unit 181 in accordance with the modification characteristic map supplied from the pointillistic modification characteristic calculation unit 142. This modification process is basically similar to the modification process described above with reference to FIG. 11, and a description thereof is thus omitted because it is redundant. The modification processing unit 141 supplies the modified image to the sharpening processing unit 182.

In step S164, the sharpening processing unit 182 sharpens the modified image. The sharpening process will be described below with reference to FIG. 17. The image sharpened in the processing of step S164 is supplied to the downstream as an output image.

Flow of Sharpening Process

Figure 17:
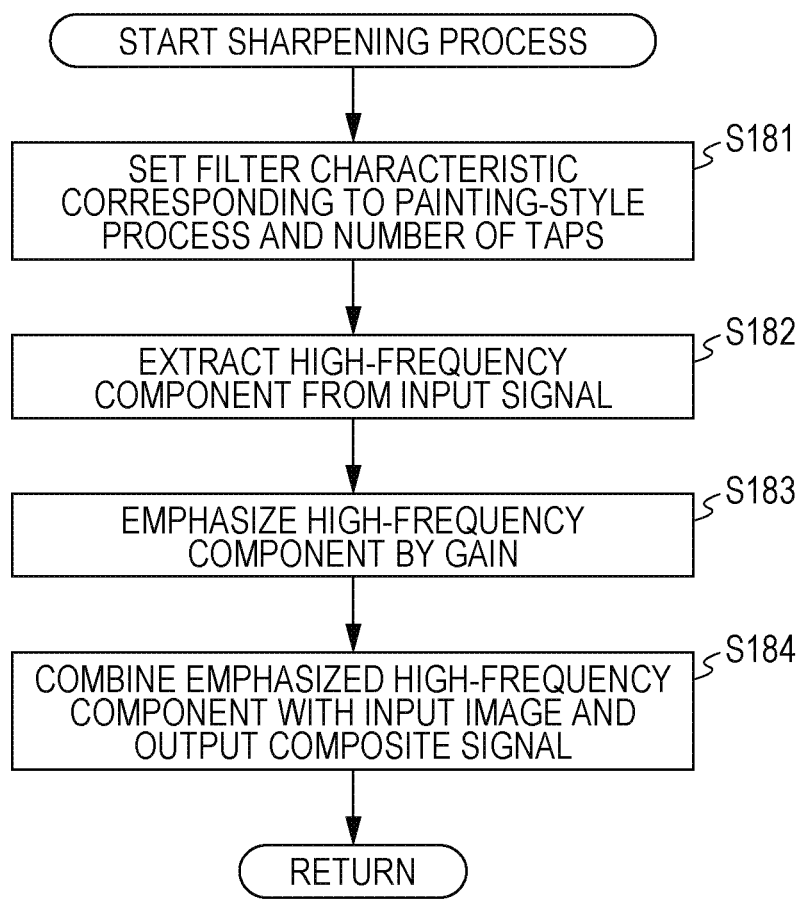
FIG. 17 is a flowchart illustrating an example of a sharpening process.

Next, the sharpening process in step S164 in FIG. 16 will be described with reference to a flowchart illustrated in FIG. 17.

In step S181, the high-pass filter 191 sets a filter characteristic in accordance with the type of the painting-style process given in the example illustrated in FIG. 14 described above or in accordance with the number of taps.

In step S182, the high-pass filter 191 extracts the high-frequency component from the signal of the input image using the set filter characteristic, and outputs the extracted high-frequency component signal to the multiplier 193.

In step S183, the multiplier 193 multiplies the high-frequency component signal supplied from the high-pass filter 191 by the value obtained from the subtractor 192 by subtracting 1 from the gain to emphasize the high-frequency component by the gain. The multiplier 193 outputs the high-frequency component signal emphasized by the gain to the adder 194.

In step S184, the adder 194 combines the signal of the input image and the emphasized high-frequency component signal to obtain a composite image, and outputs the composite image to the modification processing unit 141.

Accordingly, the strength of a brush stroke in an image obtained after the pointillist-style process has been completed can also be adjusted. That is, the strength of a brush stroke can be adjusted using two characteristics: the contrast between dots and the clarity of boundaries. In other words, the painting-style conversion processing unit 136 may include an adjustment unit capable of adjusting the strength of a brush stroke using the above two characteristics.

Adjusting the appearance of a brush stroke is not intuitive to users who are not familiar with image processing. To allow even users who are not familiar with image processing to easily adjust the appearance of a brush stroke, user-selectable adjustment buttons as illustrated in FIG. 18 or 19 with which users can more intuitively adjust the appearance of a brush stroke are presented. In accordance with selection of an adjustment button by a user, for example, a value obtained from the input device 113 or the like is converted into internal parameters of jitter, sharpening, and search range. The conversion is performed by, for example, the adjustment unit described above or the like, using a linear function or a table operation.

FIG. 18 is a diagram illustrating the relationships between adjustment buttons which are selectable by a user and parameters of search ranges (pointillist dot radii), amounts of jitter (strength), and sharpening (high-pass gain).

In the example illustrated in FIG. 18, when a user selects a "strong effect" button, the selected user input is converted into parameters of: a search range of 5 pixels, a jitter of ±32, and a sharpening of ×1.5. That is, an input of the "strong effect" button is converted into parameters to obtain a strong brush stroke.

When a user selects an "intermediate effect" button, the selected user input is converted into parameters of: a search range of 3 pixels, a jitter of ±16, and a sharpening of ×1.4. That is, an input of the "intermediate effect" button is converted into parameters to obtain an intermediate brush stroke.

When a user selects a "weak effect" button, the selected user input is converted into parameters of: a search range of 2 pixels, a jitter of 0, and a sharpening of ×1.0. That is, an input of the "weak effect" button is converted into parameters to obtain a weak brush stroke.

FIG. 19 is a diagram illustrating another example of the relationships between adjustment buttons which are selectable by a user and parameters of search ranges (pointillist dot radii), amounts of jitter (strength), and sharpening (high-pass gain).

In the example illustrated in FIG. 19, when a user selects a "precise" button, the selected user input is converted into parameters of: a search range of 2 pixels, a jitter of ±32, and a sharpening of ×1.0. That is, an input of the "precise" button is converted into parameters to obtain a precise brush stroke.

When a user selects a "rough" button, the selected user input is converted into parameters of: a search range of 5 pixels, a jitter of ±16, and a sharpening of ×1.2. That is, an input of the "rough" button is converted into parameters to obtain a rough brush stroke.

When a user selects a "clear" button, the selected user input is converted into parameters of: a search range of 3 pixels, a jitter of ±32, and a sharpening of ×1.5. That is, an input of the "clear" button is converted into parameters to obtain a clear brush stroke.

The use (display control) of the above adjustment buttons allows a user to intuitively adjust the appearance of a brush stroke.

In the painting-style conversion processing unit 136 illustrated in FIG. 3 or 12 described above, the modification processing unit 141 and the pointillistic modification characteristic calculation unit 142 are illustrated as separate blocks. However, the modification processing unit 141 and the pointillistic modification characteristic calculation unit 142 may be implemented as a single block. While each of the modification processing unit 141 and the pointillistic modification characteristic calculation unit 142 includes a memory (not illustrated) for storing a modification characteristic map, it is no longer necessary to save a modification characteristic map in a memory, resulting in saving of a processing memory.

While a process in which the generation of a modification characteristic map and the application of the corresponding modification characteristic are combined has been described, a modification characteristic map may be created in advance, stored in a memory, and used. That is, the generation of a modification characteristic map and the application of the modification characteristic map may be separated. The memory may be an internal or external memory.

Another Example Configuration of Painting-Style Conversion Processing Unit

Figure 20:
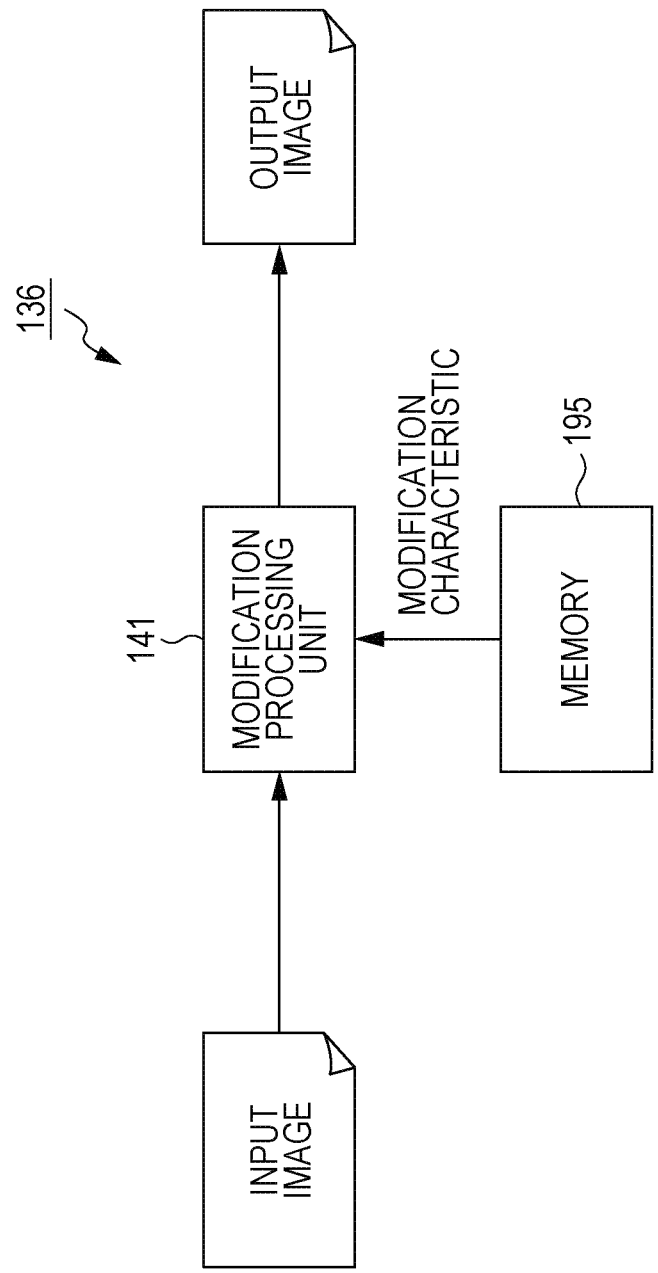
FIG. 20 is a block diagram illustrating another example configuration of the painting-style conversion processing unit.

FIG. 20 is a block diagram illustrating an example configuration of the painting-style conversion processing unit 136. The painting-style conversion processing unit 136 illustrated in FIG. 20 is common to the painting-style conversion processing unit 136 illustrated in FIG. 3 in that the painting-style conversion processing unit 136 includes a modification processing unit 141.

The painting-style conversion processing unit 136 illustrated in FIG. 20 is different from the painting-style conversion processing unit 136 illustrated in FIG. 3 in that the painting-style conversion processing unit 136 illustrated in FIG. 20 includes a memory 195 in place of the pointillistic modification characteristic calculation unit 142.

The memory 195 stores a modification characteristic map that is calculated in advance by the pointillistic modification characteristic calculation unit 142 or any other suitable device having the configuration illustrated in FIG. 4 and that is included in another image processing apparatus or the like, prior to this processing or prior to the shipment of the apparatus. That is, the modification characteristic map is generated by detecting the coordinates of a pixel having a minimum value or a maximum value in a predetermined search range for a pixel in a random pattern image and by calculating the positional relationship between the pixel in the random pattern image and the pixel whose coordinates have been detected.

The modification processing unit 141 is supplied with an input image from the YC conversion processing unit 135 and with a modification characteristic map from the memory 195. The modification processing unit 141 modifies the input image supplied from the YC conversion processing unit 135 in accordance with the modification characteristic represented by the modification characteristic map supplied from the memory 195, and supplies the modified image to the downstream as an output image.

The painting-style conversion processing unit 136 having the configuration illustrated in FIG. 20 can reduce the calculation load for generating a modification characteristic map and can reduce the processing time.

While a pointillist-style process for modifying an image into a pointillistic image has been described, the pointillist-style process described above may not be sufficient to give a brush stroke feel to a pointillistic representation on an output image, and may make the output image look less like a painting. In addition, the output image may further look less expressive because, for example, it is difficult to express impressionistic brush strokes. The term "stroke" refers to the movement of a writing instrument on a writing surface which represents the movement of an artist's hand, such as an impressionist's hand, as described above, or gives a dynamic feeling of motion (or rhythm) of brushwork.

In contrast to the above pointillist-style process, a technique in which the pointillist-style process and a process of giving a brush stroke expression ("brush stroke process") are used in combination to obtain an output image having a more painting-like impression will be described. The process using the pointillist-style process and the brush stroke process in combination is hereinafter also referred to as an "oil painting process". Hereinafter, merely "stroke" also means a brush stroke.

Second Embodiment

Another Example Configuration of Painting-Style Conversion Processing Unit

Figure 21:
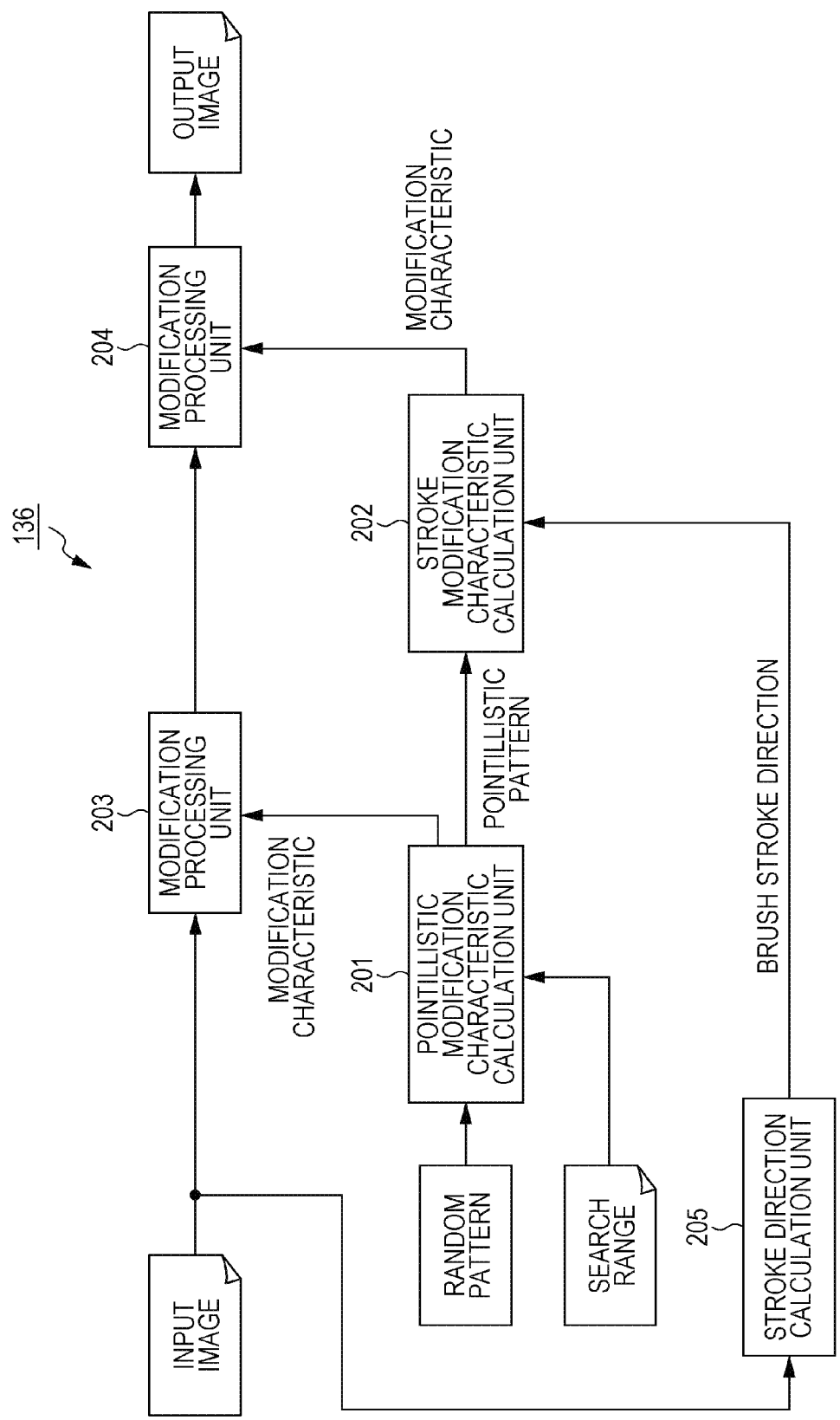
FIG. 21 is a block diagram illustrating another example configuration of the painting-style conversion processing unit.

FIG. 21 is a block diagram illustrating an example configuration of the painting-style conversion processing unit 136. The painting-style conversion processing unit 136 illustrated in FIG. 21 is configured to calculate a modification characteristic for generating a pointillist-style spatial pattern, to calculate a modification characteristic for generating a spatial pattern resembling a stroke of brush (spatial pattern of stroke), and to modify an input image using the calculated modification characteristics.

The painting-style conversion processing unit 136 includes a pointillistic modification characteristic calculation unit 201, a stroke modification characteristic calculation unit 202, a modification processing unit 203, a modification processing unit 204, and a stroke direction calculation unit 205.

Similarly to the pointillistic modification characteristic calculation unit 142 illustrated in FIG. 3, the pointillistic modification characteristic calculation unit 201 calculates a modification characteristic for generating a pointillist-style spatial pattern, using the random pattern and search range supplied from the CPU 112 illustrated in FIG. 1 or any other suitable device. That is, the pointillistic modification characteristic calculation unit 201 calculates a modification characteristic (relative position) for a pixel for which the random pattern exhibits a minimum value in the search range. The pointillistic modification characteristic calculation unit 201 supplies the calculated modification characteristic to the modification processing unit 203 as a modification characteristic map.

The pointillistic modification characteristic calculation unit 201 is different from the pointillistic modification characteristic calculation unit 142 illustrated in FIG. 3 in that the pointillistic modification characteristic calculation unit 201 outputs a pointillistic pattern including an image of a local minimum value to the stroke modification characteristic calculation unit 202.

The stroke modification characteristic calculation unit 202 is supplied with the image of the pointillistic pattern from the pointillistic modification characteristic calculation unit 201 and a signal indicating the direction of a brush stroke (also referred to as flow vector information) from the stroke direction calculation unit 205.

The stroke modification characteristic calculation unit 202 calculates a search range using the flow vector, and detects a position at which the supplied image of the pointillistic pattern has a minimum value in the calculated search range. After a search for the minimum value has been completed, the stroke modification characteristic calculation unit 202 calculates a modification characteristic (relative position) for the position of the pixel having the minimum value, and supplies the calculated modification characteristic to the modification processing unit 204 as a modification characteristic map.

Similarly to the modification processing unit 141 illustrated in FIG. 3, the modification processing unit 203 has the configuration illustrated in FIG. 6. The modification processing unit 203 modifies the input image supplied from the YC conversion processing unit 135 in accordance with the modification characteristic map supplied from the pointillistic modification characteristic calculation unit 201, and supplies the modified image (pointillistic image) to the modification processing unit 204.

Similarly to the modification processing unit 141 illustrated in FIG. 3, the modification processing unit 204 has the configuration illustrated in FIG. 6. The modification processing unit 204 modifies the input image supplied from the modification processing unit 203 in accordance with the modification characteristic map supplied from the stroke modification characteristic calculation unit 202, and supplies the modified image to the downstream as an output image.

The stroke direction calculation unit 205 calculates information concerning a stroke direction which is less susceptible to noise, using the input image supplied from the YC conversion processing unit 135. The stroke direction calculation unit 205 supplies the calculated information concerning the stroke direction to the stroke modification characteristic calculation unit 202. The stroke direction calculation unit 205 may employ a technique such as the technique described by H. Kang in "Flow-based Image Abstraction", 2009, or the technique disclosed by J. E. Kyprianidis in "Image and Video Abstraction by Coherence-Enhancing Filtering", 2011.

With the use of flow vectors calculated in the above manner, the stroke modification characteristic calculation unit 202 can obtain a directionally stable brush stroke, compared to the simple use of the luminance gradient of an image.

Figure 22:
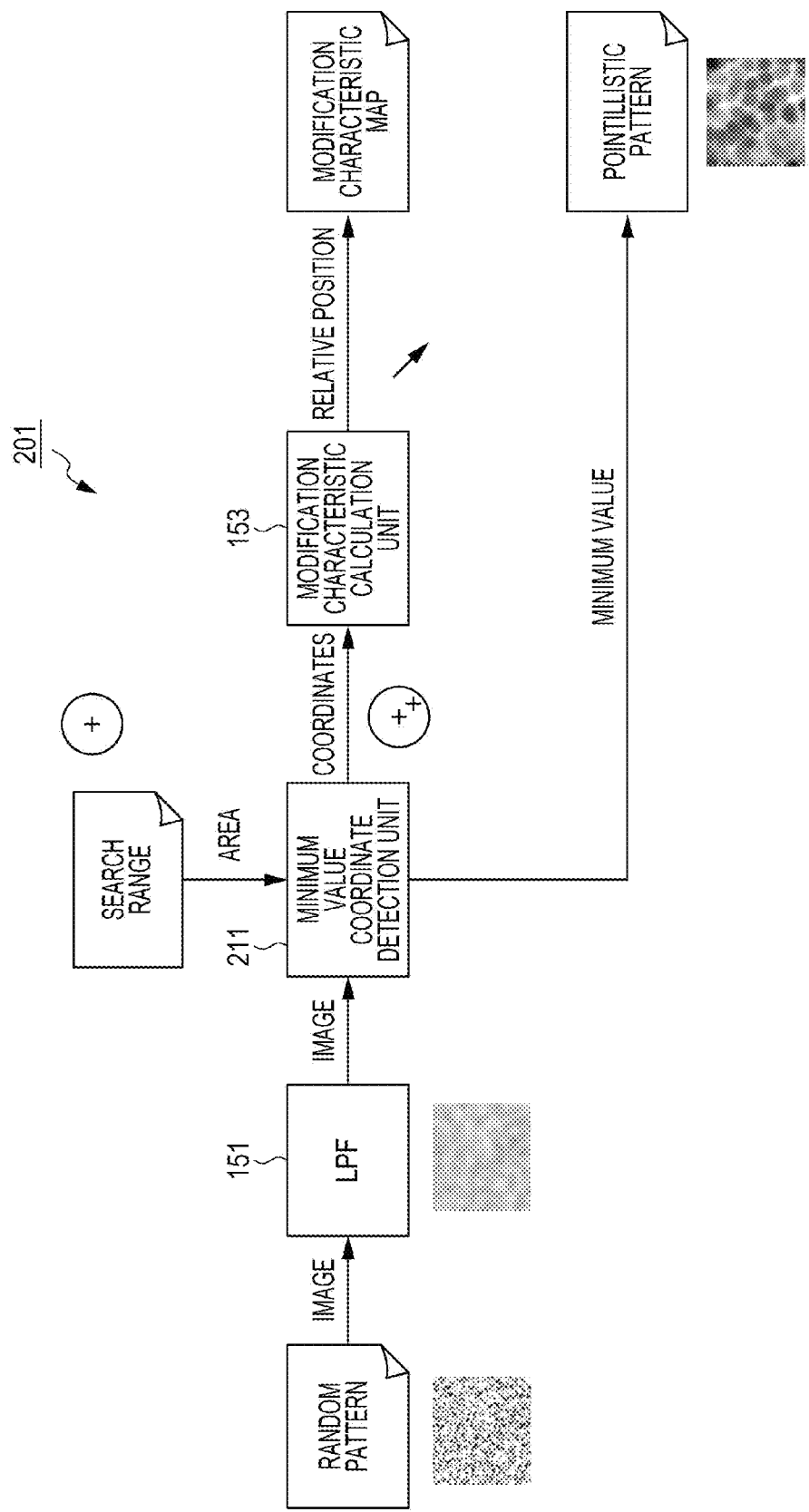
FIG. 22 is a block diagram illustrating an example configuration of a pointillistic modification characteristic calculation unit.

Example Configuration of Pointillistic Modification Characteristic Calculation Unit FIG. 22 is a block diagram illustrating an example configuration of the pointillistic modification characteristic calculation unit 201. The pointillistic modification characteristic calculation unit 201 illustrated in FIG. 22 includes an LPF 151, a modification characteristic calculation unit 153, and a minimum value coordinate detection unit 211.

The pointillistic modification characteristic calculation unit 201 illustrated in FIG. 22 is common to the pointillistic modification characteristic calculation unit 142 illustrated in FIG. 4 in that the pointillistic modification characteristic calculation unit 201 includes an LPF 151 and a modification characteristic calculation unit 153. The common feature will not be described because it is redundant.

The pointillistic modification characteristic calculation unit 201 illustrated in FIG. 22 is different from the pointillistic modification characteristic calculation unit 142 illustrated in FIG. 4 in that the pointillistic modification characteristic calculation unit 201 further includes a minimum value coordinate detection unit 211 in place of the minimum value coordinate detection unit 152.

Similarly to the minimum value coordinate detection unit 152 illustrated in FIG. 4, the minimum value coordinate detection unit 211 detects the coordinates (position) of a pixel having a minimum value in an area indicated by the search range for the selected pixel. The minimum value coordinate detection unit 211 supplies the coordinates of the selected pixel and the detected coordinates to the modification characteristic calculation unit 153.

Unlike the minimum value coordinate detection unit 152 illustrated in FIG. 4, the minimum value coordinate detection unit 211 outputs a pointillistic pattern, which is an image of a local minimum value, whose local minimum value is spread over the area of the search range to the stroke modification characteristic calculation unit 202.

Example Configuration of Stroke Modification Characteristic Calculation Unit

Figure 23:
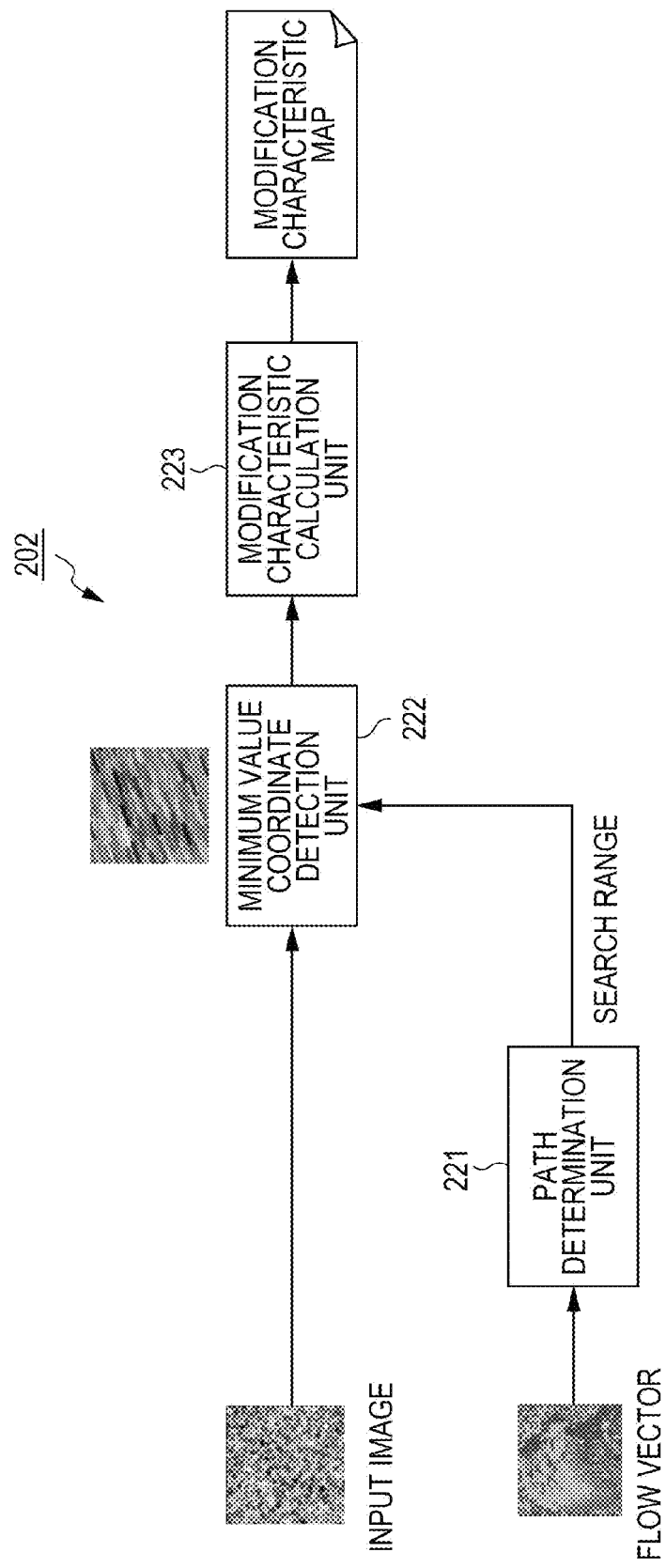
FIG. 23 is a block diagram illustrating an example configuration of a stroke modification characteristic calculation unit.

FIG. 23 is a block diagram illustrating an example configuration of the stroke modification characteristic calculation unit 202. In the example illustrated in FIG. 23, the stroke modification characteristic calculation unit 202 includes a path determination unit 221, a minimum value coordinate detection unit 222, and a modification characteristic calculation unit 223.

The path determination unit 221 is supplied with flow vector information from the stroke direction calculation unit 205 as information concerning the direction of a brush stroke. The flow vector information is defined for each pixel, and a set of pieces of flow vector information on an image is hereinafter also referred to as a "flow vector image", as appropriate. The path determination unit 221 calculates a search range from the flow vector information supplied from the stroke direction calculation unit 205, and supplies the calculated search range to the minimum value coordinate detection unit 222.

The minimum value coordinate detection unit 222 is further supplied with a pointillistic pattern from the pointillistic modification characteristic calculation unit 201 as an input image. The minimum value coordinate detection unit 222 detects the coordinates (position) of a pixel for which the pointillistic pattern image exhibits a minimum value along a path in the search range. The minimum value coordinate detection unit 222 supplies the coordinates of the selected pixel and the detected coordinates to the modification characteristic calculation unit 223.

The modification characteristic calculation unit 223 calculates the difference between the coordinates of the selected pixel and the detected coordinates in order to generate a spatial pattern of a stroke (hereinafter also referred to simply as a "stroke pattern"), and supplies the relative position indicating the calculated difference to the modification processing unit 204 as a modification characteristic map.

A specific description will be given with reference to FIG. 24. In the example illustrated in FIG. 24, an input image 231 including an area 232 having a local minimum value to be input to the minimum value coordinate detection unit 222 illustrated in FIG. 23 and flow vector information 233 to be input to the path determination unit 221 illustrated in FIG. 22 are illustrated in the left part of the FIG. 24.

As indicated by an arrow 1, the input image 231 includes a search path 235 (arrow) passing through a selected pixel (path origin) 234, which has been determined by the path determination unit 221. The minimum value coordinate detection unit 222 detects a pixel on the search path 235 in the area 232 having a local minimum value of the input image, and supplies the coordinates of the selected pixel 234 and the coordinates of the area 232 having the local minimum value on the search path (hereinafter referred to as the "coordinates of the local minimum value") to the modification characteristic calculation unit 223.

As indicated by an arrow 2, the modification characteristic calculation unit 223 calculates the difference 236 between the coordinates of the selected pixel 234 and the coordinates of the local minimum value, and supplies the relative position indicating the calculated difference 236 to the modification processing unit 204 as a modification characteristic map.

The modification processing unit 204 receives an image 237 in which the pixel having the local minimum value is modified to form the area 232 having the local minimum value using the pointillistic pattern. The modification processing unit 204 modifies the image 237 in accordance with the modification characteristic map that is the relative position indicating the difference 236. Accordingly, as indicated by an arrow 3, the area 232 having the local minimum value in the image 237 is expanded to an area 238 which lies along the search path.

That is, in view of modification to be applied throughout the process, as described above with reference to FIG. 5, first, the modification processing unit 203 applies modification to neighboring pixels of the pixel 162 having the local minimum value in the input image 161 in accordance with the modification characteristics 164, and the value of the pixel 162 is spread over the area 163 of the search range (i.e., the pixel value is distributed).

Figure 24:
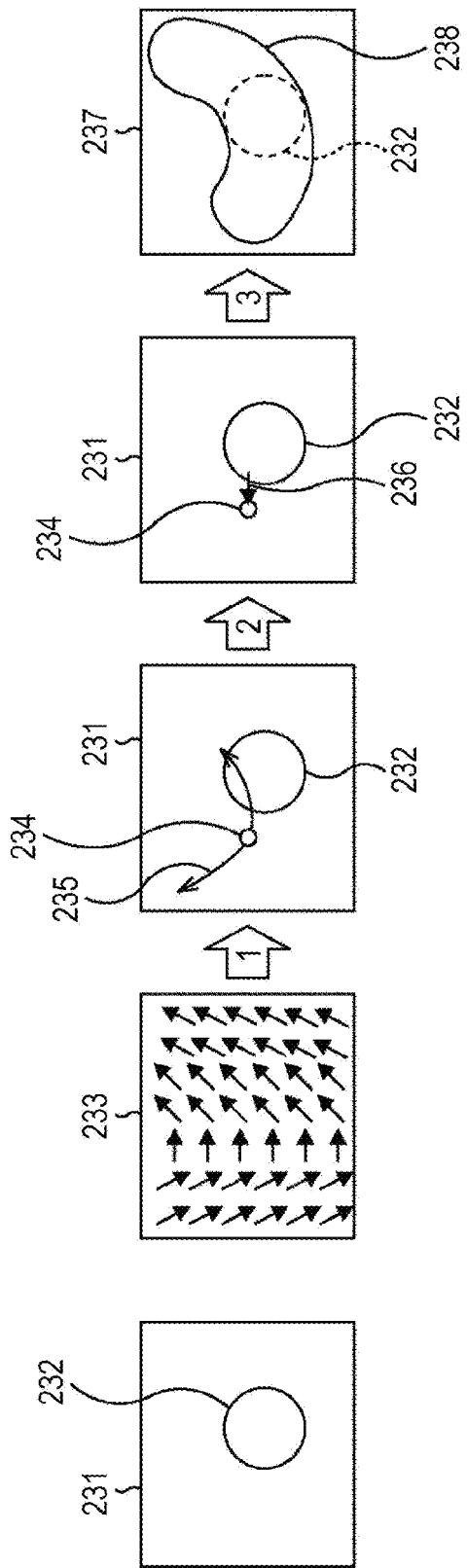
FIG. 24 is a diagram illustrating a modification characteristic calculation and modification process.

Then, as illustrated in FIG. 24, the modification processing unit 204 modifies the pixels (pixels in the area 238 which lies along the search path) around the area 232 having the local minimum value, which has been expanded by the modification processing unit 203, in the input image in accordance with the modification characteristic map that is the relative position indicating the difference 236, and outputs the pixels in the area 232. As a result, as indicated in the image 237, the value of the area 232 is spread over the area 238 which lies along the search path. That is, the modification processing unit 204 modifies the input image so that the area 232 having the local minimum value, which has been expanded by the modification processing unit 203, is expanded to the area 238 which lies along the search path in accordance with the calculated modification characteristic 236.

With the above configuration, the value of a pixel at a random position in an input image can be spread to surroundings, and a brush stroke pattern having a length and a width can be generated.

Flow of Painting-Style Conversion Process

Figure 25:
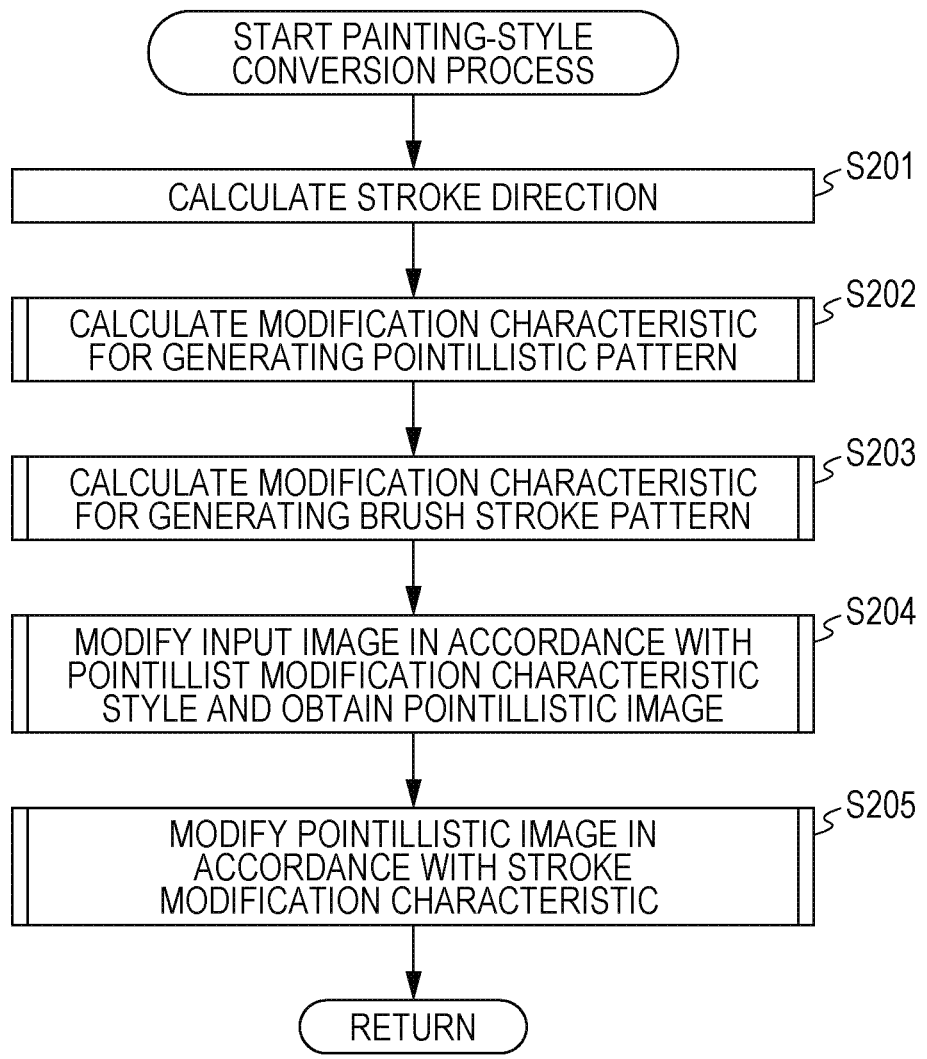
FIG. 25 is a flowchart illustrating an example of the painting-style conversion process.

Next, the painting-style conversion process performed by the painting-style conversion processing unit 136 illustrated in FIG. 21 will be described with reference to a flowchart illustrated in FIG. 25. The painting-style conversion process in FIG. 25 is an example of the painting-style conversion process in step S107 in FIG. 7, and is another example of the painting-style conversion processes in FIGS. 8 and 16.

In step S201, the stroke direction calculation unit 205 calculates information concerning a stroke direction which is less susceptible to noise, using the input image supplied from the YC conversion processing unit 135. The stroke direction calculation unit 205 supplies the information concerning the stroke direction to the stroke modification characteristic calculation unit 202.

The pointillistic modification characteristic calculation unit 201 is supplied with a random pattern and a search range from, for example, the CPU 112 or the input device 113 illustrated in FIG. 1 or any other suitable device. In step S202, the pointillistic modification characteristic calculation unit 201 calculates a modification characteristic for generating a pointillistic pattern. The modification characteristic calculation process is basically substantially similar to the modification characteristic calculation process described above with reference to FIG. 9, and a detailed description thereof is thus omitted.

However, unlike the pointillistic modification characteristic calculation unit 142 illustrated in FIG. 3, the pointillistic modification characteristic calculation unit 201 not only supplies the calculated modification characteristic to the modification processing unit 141 as a modification characteristic map but also outputs a pointillistic pattern including an image of a local minimum value to the stroke modification characteristic calculation unit 202.

The stroke modification characteristic calculation unit 202 is supplied with the image of the pointillistic pattern from the pointillistic modification characteristic calculation unit 201 and a signal indicating the direction of a brush stroke (also referred to as a flow vector) from the stroke direction calculation unit 205.

In step S203, the stroke modification characteristic calculation unit 202 calculates a modification characteristic for generating a brush stroke pattern. This stroke pattern modification characteristic calculation process will be described below with reference to FIG. 27.

The stroke modification characteristic calculation unit 202 calculates a modification characteristic (relative position) for the position of the pixel having the minimum value, and supplies the calculated modification characteristic to the modification processing unit 204 as a modification characteristic map.

In step S204, the modification processing unit 203 modifies the input image supplied from the YC conversion processing unit 135 in accordance with the pointillistic modification characteristic indicated by the modification characteristic map supplied from the pointillistic modification characteristic calculation unit 201, and obtains a pointillistic image (modified image). The modification processing unit 203 supplies the obtained pointillistic image to the modification processing unit 204.

In step S205, the modification processing unit 204 modifies the input image (pointillistic image) supplied from the modification processing unit 203 in accordance with the modification characteristic map for the stroke, which has been supplied from the stroke modification characteristic calculation unit 202. Then, the modification processing unit 204 supplies the modified image to the downstream as an output image.

Here, the modification process in steps S204 and S205 will be specifically described with reference to FIG. 26.

Figure 26:
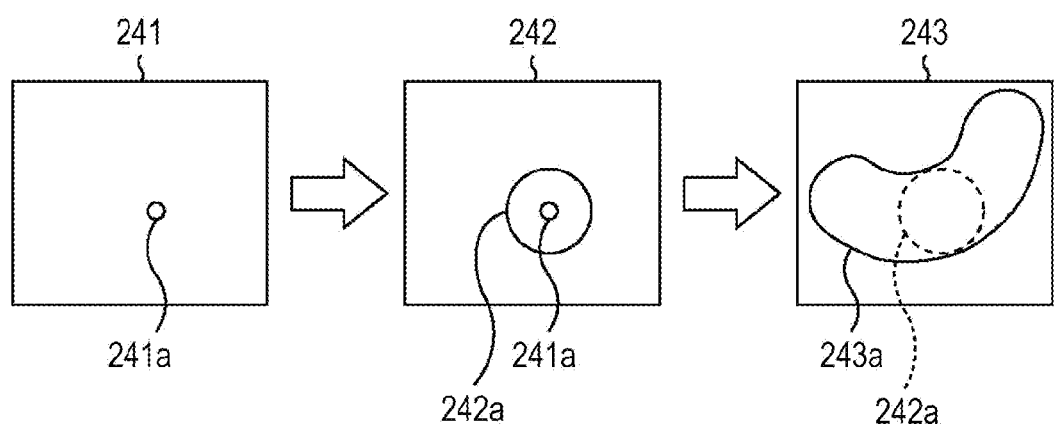
FIG. 26 is a diagram illustrating a modification process.

In the example illustrated in FIG. 26, an input image 241 to be input to the modification processing unit 203, a pointillistic image 242 that has been modified by the modification processing unit 203 and that is to be input to the modification processing unit 204, and an image 243 that has been modified by the modification processing unit 204 are illustrated.

As illustrated in FIG. 26, a pixel 241a having a local minimum value in the input image 241 to be input to the modification processing unit 203 is spatially spread, as indicated by an area 242a, through modification performed by the modification processing unit 203 (distribution of the pixel value).

Then, as indicated by an area 243a, the area 242a is expanded as if it were scrubbed in the direction of the supplied flow vector through modification performed by the modification processing unit 204 (distribution of the pixel value).

Thus, pixels are modified in a plane (i.e., two-dimensionally), resulting in a rough stroke pattern (an image with a long brush stroke) being formed.

In steps S204 and S205, the painting-style modification processes are performed in the above manner.

The details of the modification processes in steps S204 and S205 are basically similar to those of the modification process described above with reference to FIG. 11, and a detailed description thereof is thus omitted due to redundancy.

Figure 27:
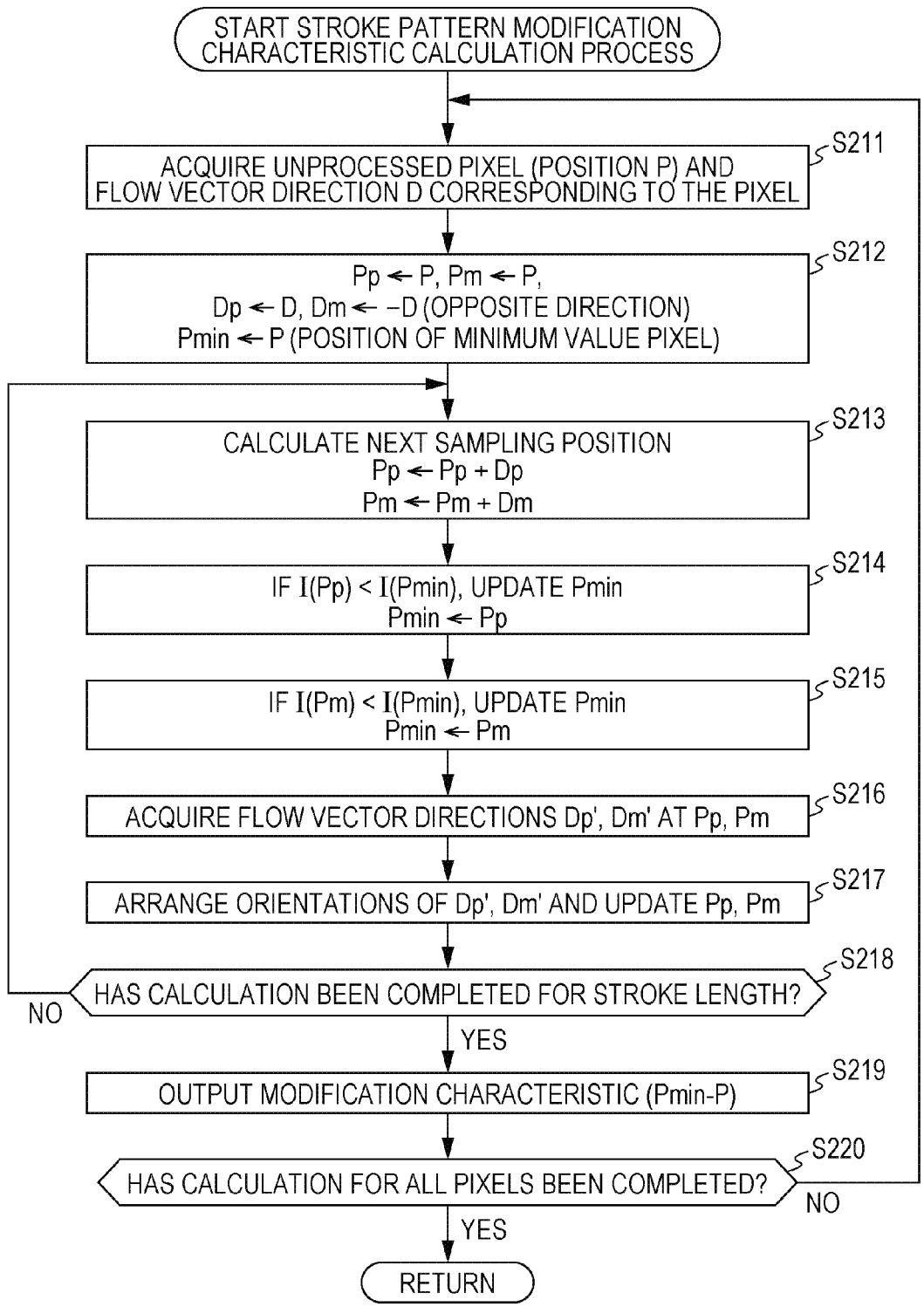
FIG. 27 is a flowchart illustrating an example of a stroke pattern modification characteristic calculation process.

Next, the stroke pattern modification characteristic process in step S203 in FIG. 25 will be described with reference to a flowchart illustrated in FIG. 27. This process will be described also with reference to FIG. 28, if necessary.

In step S211, the minimum value coordinate detection unit 222 acquires a unprocessed pixel (at the position P) (hereinafter referred to as the "unprocessed pixel P" or the "pixel P") and the direction D of a flow vector corresponding to the pixel P.

That is, the minimum value coordinate detection unit 222 acquires the unprocessed pixel P from an input image that is a pointillistic pattern supplied from the pointillistic modification characteristic calculation unit 201. The minimum value coordinate detection unit 222 further acquires the direction D of a flow vector corresponding to the pixel P from a search range determined by the path determination unit 221.

Figure 28:
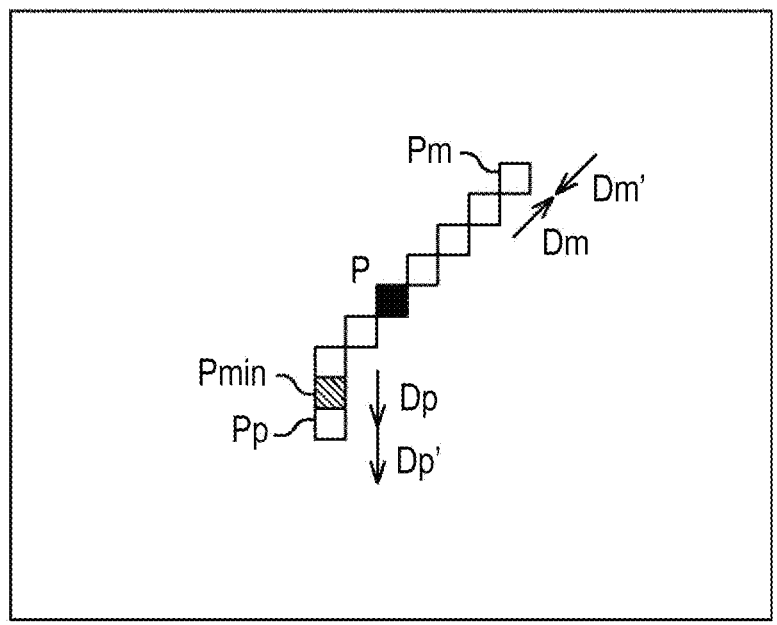
FIG. 28 is a diagram illustrating the stroke pattern modification characteristic calculation process.

The example illustrated in FIG. 28 is an example obtained immediately after the processing of step S216, described below, has been performed. In FIG. 28, P represents the pixel at the origin; Dp, Dp', Dm, and Dm' denote flow vectors, where the angle between the flow vectors Dp and Dp' and the angle between the flow vectors Dm and Dm' are 180°; Pp denotes a positive pixel position, and Pm denotes a negative pixel position; and Pmin denotes the position of the pixel having the minimum value.

In step S212, the minimum value coordinate detection unit 222 sets Pp to P, Pm to P, Dp to D, Dm to −D, and Pmin to P.

In step S213, the minimum value coordinate detection unit 222 calculates the next sampling position. Specifically, the minimum value coordinate detection unit 222 sets "Pp+Dp" to Pp and "Pm+Dm" to Pm.

In step S214, if I(Pp)<I(Pmin), that is, if the pixel value at Pmin is smaller than the pixel value at Pp, the minimum value coordinate detection unit 222 updates Pmin with Pp.

In step S215, if I(Pm)<I(Pmin), that is, if the pixel value at Pmin is smaller than the pixel value at Pp, the minimum value coordinate detection unit 222 updates Pmin with Pm.

In step S216, the minimum value coordinate detection unit 222 acquires the directions of the flow vectors Dp' and Dm' at Pp and Pm, respectively.

In step S217, the minimum value coordinate detection unit 222 arranges the orientations of the flow vectors Dp' and Dm', and updates the flow vectors Dp and Dm. Since flow vectors are not sufficient to define the next tracking direction, it is necessary to arrange the flow vectors.

For example, if the inner product of the flow vectors Dp and Dp' is less than 0 (i.e., Dp·Dp'<0), Dp←−Dp' is set. If the inner product of the flow vectors Dp and Dp' is greater than or equal to 0 (i.e., Dp·Dp'≥0), Dp←Dp' is set. Also, if the inner product of the flow vectors Dm and Dm' is less than 0 (i.e., Dm·Dm'<0), Dm←−Dm' is set. If the inner product of the flow vectors Dm and Dm' is greater than or equal to 0 (i.e., Dm·Dm'≥0), Dm←Dm' is set. Accordingly, the flow vectors are arranged.

In the foregoing description, flow vectors are arranged using inner products. However, any other method may be used.

In step S218, the minimum value coordinate detection unit 222 determines whether or not calculation for the length of the stroke has been completed. If it is determined in step S218 that calculation for the length of the stroke has not been completed yet, the process returns to step S213 and the subsequent processing is repeated.

If it is determined in step S218 that calculation for the length of the stroke has been completed, the process proceeds to step S219. In step S219, the modification characteristic calculation unit 223 outputs the modification characteristic (Pmin−P) to the modification processing unit 204 as a modification characteristic map.

In step S220, the minimum value coordinate detection unit 222 determines whether or not calculation for all the pixels in the input image has been completed. If it is determined in step S220 that calculation for all the pixels has not been completed yet, the process returns to step S211 and the subsequent processing is repeated.

If it is determined in step S220 that calculation for all the pixels has been completed, the stroke pattern modification characteristic process ends.

Explanation of Advantages

The above modification processes can reduce the processing time, compared to the methods that involve repeated rendering of brush strokes to obtain desired output images (hereinafter referred to as the "repetitive processing methods"), described above, as proposed in the patent literature given in the background section and by A. Hertzmann in the non-patent literature given in the background section.

In the techniques proposed in the patent literature given in the background section and by A. Hertzmann in the non-patent literature given in the background section, furthermore, the direction of brush strokes is perpendicular to the gradient (luminance gradient) of the signal level at the target pixel. For this reason, if a brush with an elliptical long stroke is used, noise contained in the image may fluctuate the direction of the brush strokes, and beautiful strokes may not be obtained. In addition, if a circular brush is used (i.e., for a pointillist style), such noise may not affect the direction of the brush strokes; however, each stroke of the brush may not be expressed, resulting in poor feeling of a painting.

In contrast to the above existing techniques, the present technology, because of using flow vectors, can provide directionally stable brush strokes, compared to the use of the luminance gradient of an image.

As algorithms other than the repetitive processing methods described above, a technique by which a shift characteristic, which allows a maximum value on a line segment path to be shifted with respect to the output target pixel, can be applied to an input image, is described by R. Lukac in "Computational Photography: Methods and Applications," CRC Press, 2011, pp. 386-387. This technique is called Cross Continuous Glass Patterns (CCGP). The CCGP technique can rapidly apply a brush stroke pattern to any input image.

Figure 29:
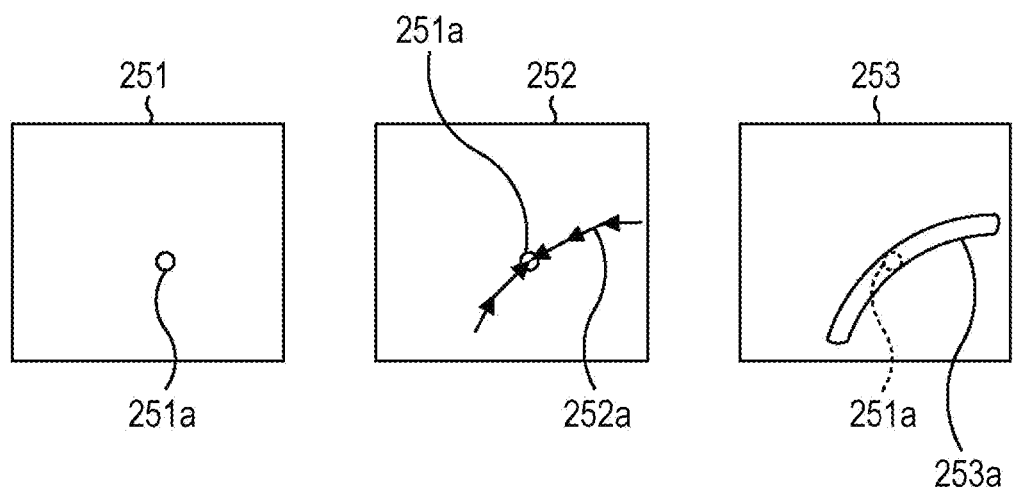
FIG. 29 is a diagram illustrating an existing technology to illustrate the advantages of the embodiments of the present technology.

FIG. 29 is a diagram illustrating an existing CCGP technique for comparison with an embodiment of the present technology. In the example illustrated in FIG. 29, an input image 251, an image 252 undergoing modification processing, and an output image 253 are illustrated.

In the existing CCGP technique, as indicated by an arrow 252a, a given pixel 251a in the input image 251 is subjected to length modification to obtain the output image 253 in which the pixel 251a has been modified to form a line 253a.

This CCGP technique enables curved modification but can only provide a thin brush stroke pattern. That is, while it is possible to adjust the length of brush strokes, it is difficult to adjust the width (or thickness) of brush strokes. For this reason, only a limited range of painting effects is feasible, such as incapability of expressing a pointillist style or difficulty in adjusting an effect.

Figure 30:
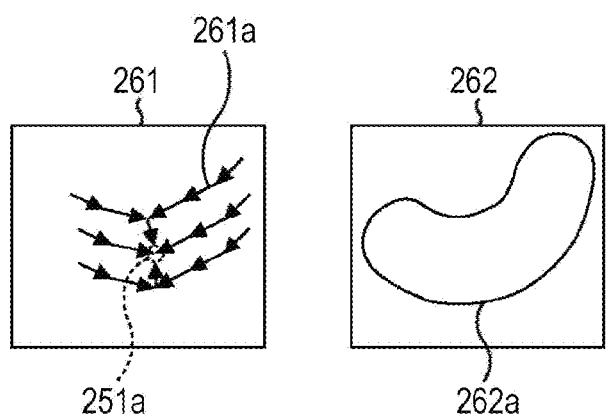
FIG. 30 is a diagram illustrating advantages of the embodiments of the present technology.

In an example illustrated in FIG. 30, an image 261 undergoing modification processing and an output image 262 according to an embodiment of the present technology are illustrated.

In contrast to the CCGP technique described above with reference to FIG. 29, an embodiment of the present technology makes it possible to generate modification characteristics 261a for spreading the pixel 251a in the input image 251 illustrated in FIG. 29 to a planar two-dimensional area 262a having a length and a width. Therefore, the output image 262 in which the pixel 251a has been modified to form the two-dimensional area 262a can be obtained.

That is, in an embodiment of the present technology, since a brush stroke pattern can have a width, it is possible to provide a more painting-like expression than with the CCGP technique. In addition, by adjusting the size of pointillist dots and the length of a brush stroke pattern, it is possible to easily and quickly achieve a wide variety of brush strokes such as pointillistic strokes resembling the brushwork of artists, for example, Georges Seurat, and impressionistic long brush strokes (such as brush stroke process).

Figure 31:
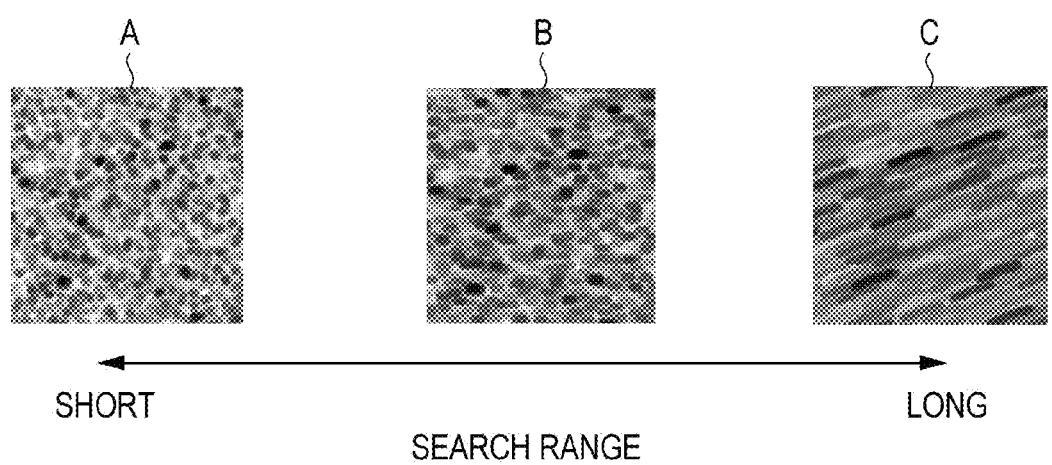
FIGS. 31A-C are diagrams illustrating an example of a search range.

FIG. 31 illustrates an example of a search range used in the path determination unit 221. The path determination unit 221 can set a short search range for a stroke pattern, thereby obtaining a pointillistic pattern with short brush strokes, as illustrated in the left part of FIG. 31. On the other hand, the path determination unit 221 can set a long search range for a stroke pattern, thereby obtaining a pattern with long brush strokes, as illustrated in the right part of FIG. 31.

In the example illustrated in FIG. 31, modified images A, B, and C with the search range sequentially reduced gradually from the left to the right are illustrated. That is, of the three images, the image A with the shortest search range is an image with the shortest brush strokes, and the image C with the longest search range is an image with the longest brush strokes. The brush strokes of the image B with the search range longer than that of the image A and shorter than that of the image C are longer than that of the image A and are shorter than that of the image C.

An adjustment unit capable of setting a search range that is determined by the path determination unit 221 in the manner described above may be included in the stroke modification characteristic calculation unit 202 or the painting-style conversion processing unit 136.

In the foregoing description, by way of example, the pointillistic modification process and the stroke modification process are performed. However, as described just below, a modification process may be performed once by combining modification characteristics.

Another Example Configuration of Painting-Style Conversion Processing Unit

Figure 32:
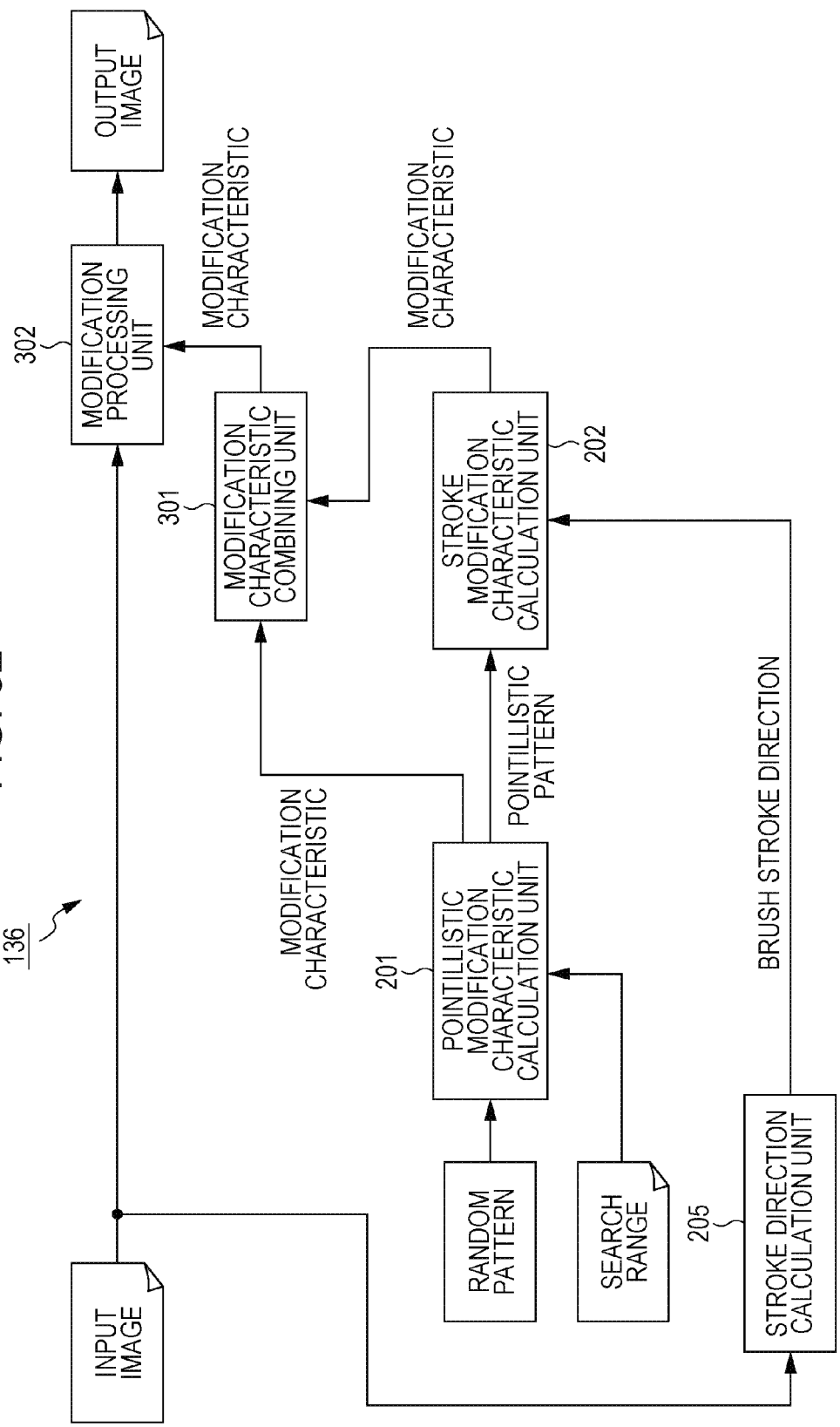
FIG. 32 is a block diagram illustrating another example configuration of the painting-style conversion processing unit.

FIG. 32 is a block diagram illustrating an example configuration of the painting-style conversion processing unit 136.

In the example illustrated in FIG. 32, the painting-style conversion processing unit 136 includes a pointillistic modification characteristic calculation unit 201, a stroke modification characteristic calculation unit 202, a stroke direction calculation unit 205, a modification characteristic combining unit 301, and a modification processing unit 302.

The painting-style conversion processing unit 136 illustrated in FIG. 32 is common to the painting-style conversion processing unit 136 illustrated in FIG. 21 in that the painting-style conversion processing unit 136 includes a pointillistic modification characteristic calculation unit 201, a stroke modification characteristic calculation unit 202, and a stroke direction calculation unit 205. The common feature will not be described because it is redundant.

The painting-style conversion processing unit 136 illustrated in FIG. 32 is different from the painting-style conversion processing unit 136 illustrated in FIG. 21 in that the painting-style conversion processing unit 136 illustrated in FIG. 32 further includes a modification characteristic combining unit 301 and includes a modification processing unit 302 in place of the modification processing units 203 and 204.

The modification characteristic combining unit 301 receives the pointillistic modification characteristic calculated by the pointillistic modification characteristic calculation unit 201 and the stroke modification characteristic calculated by the stroke modification characteristic calculation unit 202, and combines the two characteristics. The characteristics are combined by, for example, addition of modification characteristic vectors. The modification characteristic combining unit 301 supplies the combined modification characteristic to the modification processing unit 302 as a modification characteristic map.

Similarly to the modification processing unit 141 illustrated in FIG. 3, the modification processing unit 302 has the configuration illustrated in FIG. 6. The modification processing unit 302 modifies the input image supplied from the YC conversion processing unit 135 in accordance with the modification characteristic map supplied from the modification characteristic combining unit 301, and supplies the modified image to the downstream as an output image.

Flow of Painting-Style Conversion Process

Figure 33:
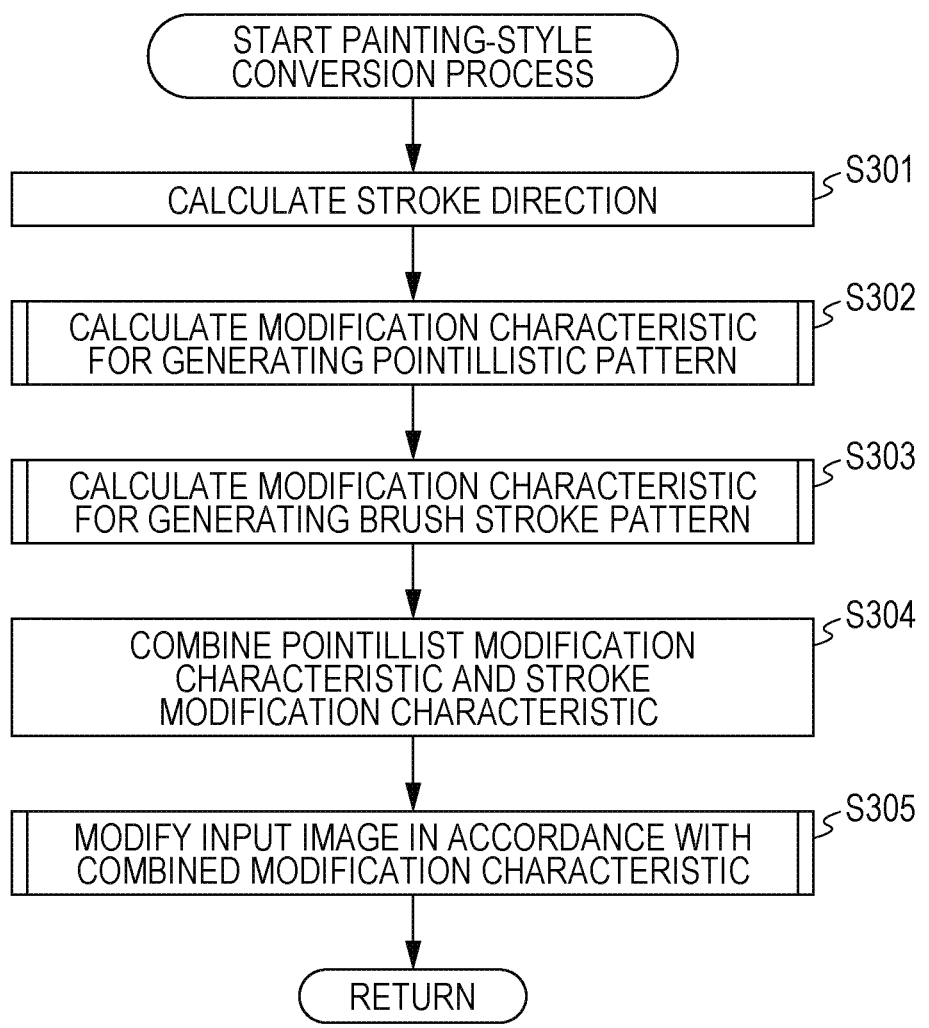
FIG. 33 is a flowchart illustrating an example of the painting-style conversion process.

Next, the painting-style conversion process performed by the painting-style conversion processing unit 136 illustrated in FIG. 32 will be described with reference to a flowchart illustrated in FIG. 33. The painting-style conversion process illustrated in FIG. 33 is an example of the painting-style conversion process in step S107 in FIG. 7, and is another example of the painting-style conversion processes in FIGS. 8, 16, and 25.

In step S301, the stroke direction calculation unit 205 calculates information concerning a stroke direction which is less susceptible to noise, using the input image supplied from the YC conversion processing unit 135. The stroke direction calculation unit 205 supplies the information (signal) concerning the stroke direction to the stroke modification characteristic calculation unit 202.

The pointillistic modification characteristic calculation unit 201 is supplied with a random pattern and a search range from, for example, the CPU 112 or the input device 113 illustrated in FIG. 1 or any other suitable device. In step S302, the pointillistic modification characteristic calculation unit 201 calculates a modification characteristic for generating a pointillistic pattern. The modification characteristic calculation process is basically substantially similar to the modification characteristic calculation process described above with reference to FIG. 9, and a detailed description thereof is thus omitted.

However, unlike the pointillistic modification characteristic calculation unit 142 illustrated in FIG. 3, the pointillistic modification characteristic calculation unit 201 not only supplies the calculated modification characteristic to the modification characteristic combining unit 301 as a modification characteristic map but also outputs a pointillistic pattern including an image of a local minimum value to the stroke modification characteristic calculation unit 202.

The stroke modification characteristic calculation unit 202 is supplied with the image of the pointillistic pattern from the pointillistic modification characteristic calculation unit 201 and information (flow vector) concerning the brush stroke direction from the stroke direction calculation unit 205.

In step S303, the stroke modification characteristic calculation unit 202 calculates a modification characteristic for generating a brush stroke pattern. The stroke pattern modification characteristic calculation process is basically similar to the stroke pattern modification characteristic calculation process described above with reference to FIG. 27, and a detailed description thereof is thus omitted because it is redundant.

The stroke modification characteristic calculation unit 202 calculates a modification characteristic (relative position) for the position of the pixel having the minimum value, and supplies the calculated modification characteristic to the modification characteristic combining unit 301 as a modification characteristic map.

In step S304, the modification characteristic combining unit 301 combines the pointillistic modification characteristic supplied from the pointillistic modification characteristic calculation unit 201 and the stroke modification characteristic supplied from the stroke modification characteristic calculation unit 202. The modification characteristic combining unit 301 supplies the combined modification characteristic to the modification processing unit 302 as a modification characteristic map.

In step S305, the modification processing unit 302 modifies the input image supplied from the YC conversion processing unit 135 in accordance with the combined modification characteristic map supplied from the modification characteristic combining unit 301. Then, the modification processing unit 302 supplies the modified image to the downstream as an output image.

Accordingly, the pointillistic modification characteristic and the stroke modification characteristic may be combined, and a modification process may be performed once. Consequently, the processing speed can be increased.

In the foregoing description, by way of example, a pointillistic modification characteristic is calculated to perform pointillistic modification. However, as described just below, for example, a plurality of stroke modifications with different directions may be used in combination, instead of the pointillist-style process being performed.

Another Example Configuration of Painting-Style Conversion Processing Unit

Figure 34:
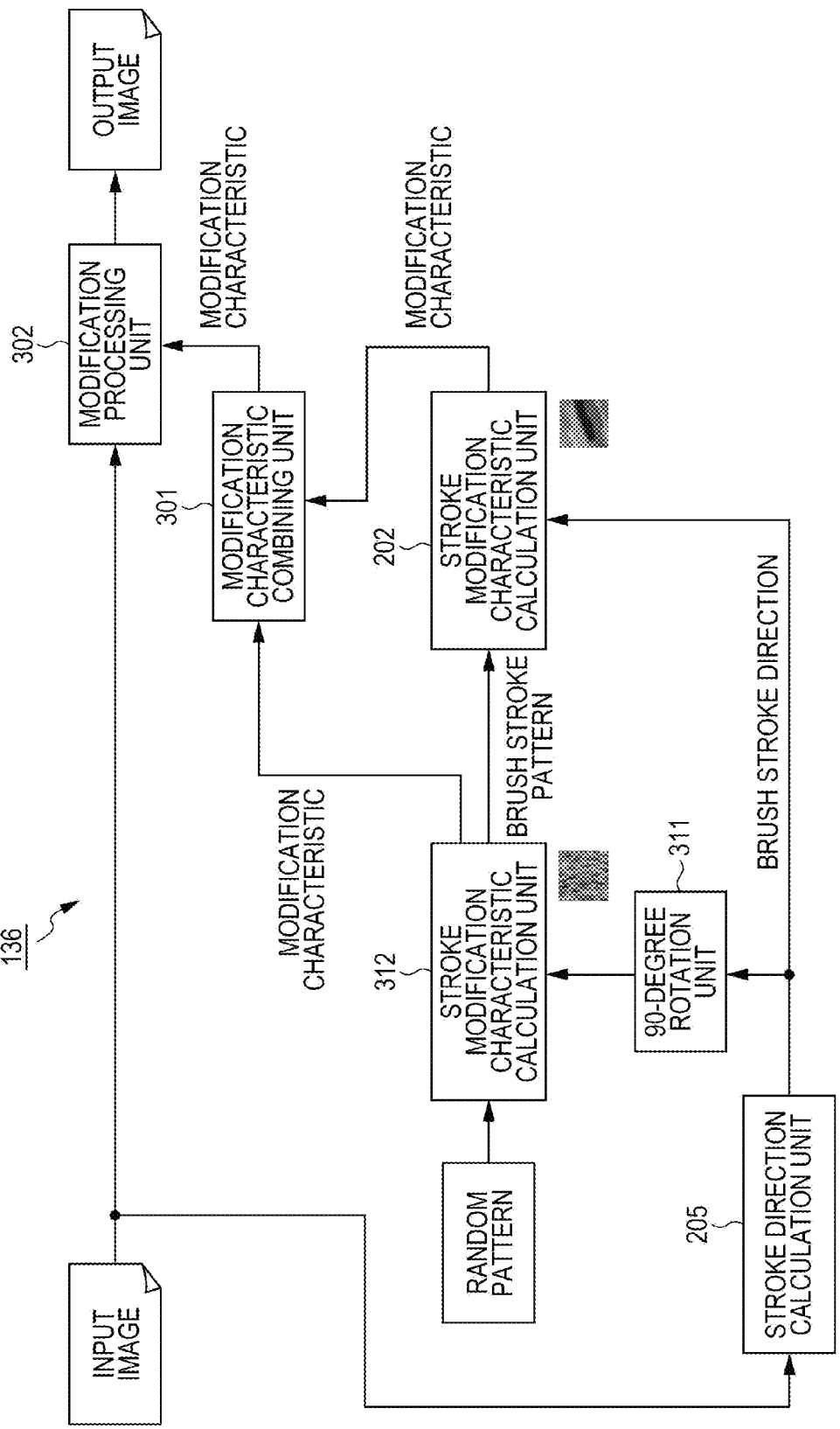
FIG. 34 is a block diagram illustrating another example configuration of the painting-style conversion processing unit.

FIG. 34 is a block diagram illustrating an example configuration of the painting-style conversion processing unit 136.

In the example illustrated in FIG. 34, the painting-style conversion processing unit 136 includes a stroke modification characteristic calculation unit 202, a stroke direction calculation unit 205, a modification characteristic combining unit 301, a modification processing unit 302, a 90-degree rotation unit 311, and a stroke modification characteristic calculation unit 312.

The painting-style conversion processing unit 136 illustrated in FIG. 34 is common to the painting-style conversion processing unit 136 illustrated in FIG. 32 in that the painting-style conversion processing unit 136 includes a stroke modification characteristic calculation unit 202, a stroke direction calculation unit 205, a modification characteristic combining unit 301, and a modification processing unit 302. The common feature will not be described because it is redundant.

The painting-style conversion processing unit 136 illustrated in FIG. 34 is different from the painting-style conversion processing unit 136 illustrated in FIG. 32 in that the pointillistic modification characteristic calculation unit 201 is removed and the painting-style conversion processing unit 136 illustrated in FIG. 34 further includes a 90-degree rotation unit 311 and a stroke modification characteristic calculation unit 312.

The information concerning the brush stroke direction is supplied from the stroke direction calculation unit 205 to the 90-degree rotation unit 311 as well as the stroke modification characteristic calculation unit 202.

The 90-degree rotation unit 311 rotates the information concerning the brush stroke direction supplied from the stroke direction calculation unit 205 by 90 degrees. The angle by which the 90-degree rotation unit 311 rotates the information may be an angle in a direction different from the brush stroke direction, and is not limited to 90 degrees if the angle makes the information thick with respect to the stroke direction. The 90-degree rotation unit 311 supplies the information concerning the brush stroke direction, which has been rotated by 90 degrees, to the stroke modification characteristic calculation unit 312.

The stroke modification characteristic calculation unit 312 is also supplied with a random pattern from, for example, the CPU 112 or the input device 113 illustrated in FIG. 1 or any other suitable device.

The stroke modification characteristic calculation unit 312 has a configuration similar to the stroke modification characteristic calculation unit 202. That is, the stroke modification characteristic calculation unit 312 basically has a configuration similar to the configuration of the stroke modification characteristic calculation unit 202 described above with reference to FIG. 21.

The stroke modification characteristic calculation unit 312 calculates a search range using 90-degree rotated flow vectors, and detects the position in the calculated search range where the image of the random pattern to be supplied exhibits a minimum value. After a search for the minimum value has been completed, the stroke modification characteristic calculation unit 312 calculates the modification characteristic (relative position) for the position of the pixel having the minimum value, and supplies the calculated modification characteristic to the modification characteristic combining unit 301 as a modification characteristic map.

In addition, the stroke modification characteristic calculation unit 312 outputs a brush stroke pattern including an image of a local minimum value (i.e., a brush stroke pattern that is an image of a local minimum value, whose local minimum value is spread over the search range area) to the stroke modification characteristic calculation unit 202.

In the example illustrated in FIG. 34, flow vectors to be input to the stroke modification characteristic calculation unit 312 are rotated. Alternatively, flow vectors to be input to the stroke modification characteristic calculation unit 202 may be rotated.

Flow of Painting-Style Conversion Process

Figure 35:
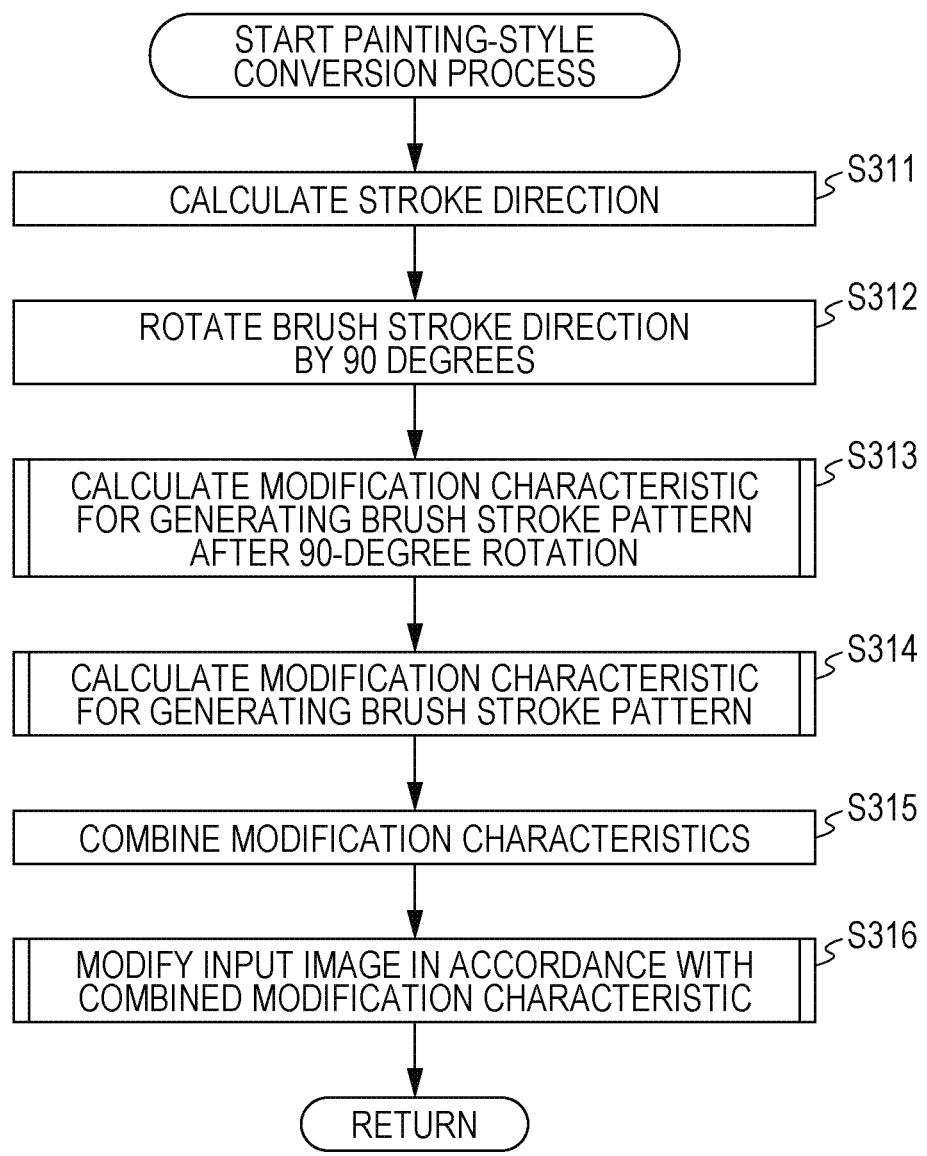
FIG. 35 is a flowchart illustrating an example of the painting-style conversion process.

Next, the painting-style conversion process performed by the painting-style conversion processing unit 136 illustrated in FIG. 34 will be described with reference to a flowchart illustrated in FIG. 35. The painting-style conversion process illustrated in FIG. 35 is also an example of the painting-style conversion process in step S107 in FIG. 7, and is another example of the painting-style conversion process in FIGS. 8, 16, 25, and 33.

In step S311, the stroke direction calculation unit 205 calculates information concerning a stroke direction which is less susceptible to noise, using the input image supplied from the YC conversion processing unit 135. The stroke direction calculation unit 205 supplies the information concerning the stroke direction to the 90-degree rotation unit 311 and the stroke modification characteristic calculation unit 202.

In step S312, the 90-degree rotation unit 311 rotates the information (flow vector) concerning the stroke direction supplied from the stroke direction calculation unit 205 by 90 degrees. The 90-degree rotation unit 311 supplies the information concerning the brush stroke direction, which has been rotated by 90 degrees, to the stroke modification characteristic calculation unit 312.

The stroke modification characteristic calculation unit 312 is supplied with a random pattern from, for example, the CPU 112 or the input device 113 illustrated in FIG. 1 or any other suitable device. In step S313, the stroke modification characteristic calculation unit 312 calculates a modification characteristic for generating a 90-degree rotated brush stroke pattern. The modification characteristic calculation process is basically substantially similar to the modification characteristic calculation process described above with reference to FIG. 27, and a detailed description thereof is thus omitted.

However, the stroke modification characteristic calculation unit 312 not only supplies the calculated modification characteristic to the modification characteristic combining unit 301 as a modification characteristic map but also outputs a brush stroke pattern including an image of a local minimum value to the stroke modification characteristic calculation unit 202.

The stroke modification characteristic calculation unit 202 is supplied with the image of the brush stroke pattern from the stroke modification characteristic calculation unit 312, and a signal indicating the brush stroke direction from the stroke direction calculation unit 205.

In step S314, the stroke modification characteristic calculation unit 202 calculates a modification characteristic for generating a brush stroke pattern. The stroke pattern modification characteristic calculation process is basically substantially similar to the stroke pattern modification characteristic calculation process described above with reference to FIG. 27, and a detailed description thereof is thus omitted because it is redundant.

The stroke modification characteristic calculation unit 202 calculates the modification characteristic (relative position) for the position of the pixel having the minimum value, and supplies the calculated modification characteristic to the modification characteristic combining unit 301 as a modification characteristic map.

In step S315, the modification characteristic combining unit 301 combines the 90-degree rotated stroke modification characteristic supplied from the stroke modification characteristic calculation unit 312 and the stroke modification characteristic supplied from the stroke modification characteristic calculation unit 202. The modification characteristic combining unit 301 supplies the combined modification characteristic to the modification processing unit 302 as a modification characteristic map.

In step S316, the modification processing unit 302 modifies the input image supplied from the YC conversion processing unit 135 in accordance with the combined modification characteristic map supplied from the modification characteristic combining unit 301. Then, the modification processing unit 302 supplies the modified image to the downstream as an output image.

Accordingly, a modification characteristic for a two-dimensional area may be created using, instead of a pointillist modification characteristic (two-dimensional) and a stroke modification characteristic (one-dimensional), a plurality of stroke modifications (one-dimensional) with different directions in combination.

Also when a modification characteristic for a rotated stroke, in place of a pointillistic modification characteristic, is generated, a modification process may be performed twice instead of modification characteristics being combined.

Another Example Configuration of Painting-Style Conversion Processing Unit

Figure 36:
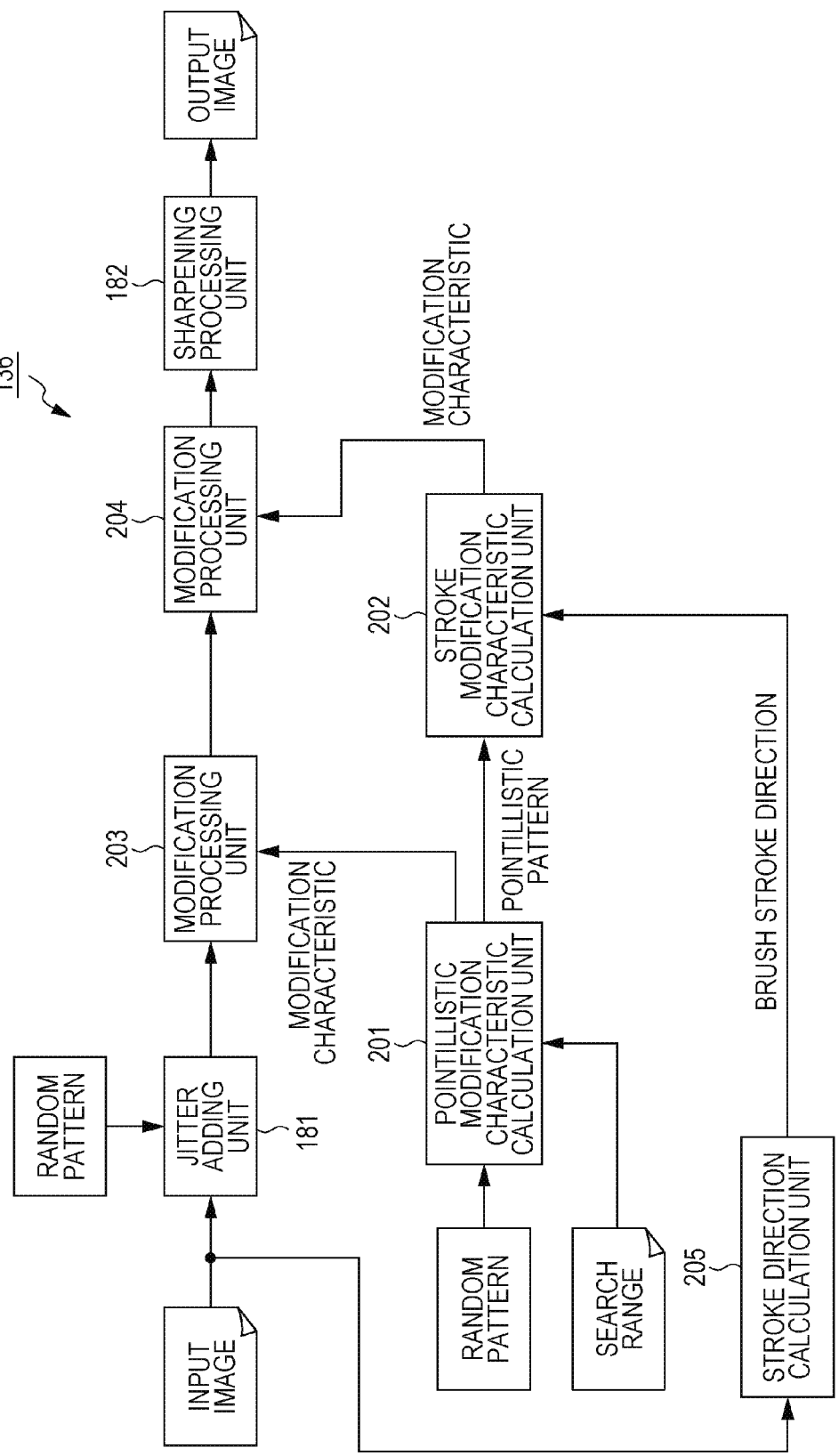
FIG. 36 is a block diagram illustrating another example configuration of the painting-style conversion processing unit.

FIG. 36 is a block diagram illustrating an example configuration of the painting-style conversion processing unit 136. The painting-style conversion processing unit 136 illustrated in FIG. 36 is an example of an extended version of the painting-style conversion processing unit 136 illustrated in FIG. 21, and has, similarly to the example illustrated in FIG. 12, a configuration capable of adjusting the strength of an output brush stroke.

Similarly to the painting-style conversion processing unit 136 illustrated in FIG. 21, the painting-style conversion processing unit 136 includes a pointillistic modification characteristic calculation unit 201, a stroke modification characteristic calculation unit 202, a modification processing unit 203, a modification processing unit 204, and a stroke direction calculation unit 205.

The painting-style conversion processing unit 136 illustrated in FIG. 36 further includes a jitter adding unit 181 and a sharpening processing unit 182, as in the painting-style conversion processing unit 136 illustrated in FIG. 12.

In the painting-style conversion processing unit 136 illustrated in FIG. 36, the jitter adding unit 181 is located upstream of the modification processing unit 203, and the sharpening processing unit 182 is located downstream of the modification processing unit 204.

The input image is supplied from the YC conversion processing unit 135 to the jitter adding unit 181. The jitter adding unit 181 is also supplied with a random pattern from, for example, the CPU 112 illustrated in FIG. 1 or any other suitable device. The jitter adding unit 181 adds jitter to the input image using the random pattern, and supplies the image with jitter added thereto to the modification processing unit 203.

The modification processing unit 203 modifies the image with jitter added thereto, which has been supplied from the jitter adding unit 181, in accordance with the modification characteristic map supplied from the pointillistic modification characteristic calculation unit 201, and supplies the modified image to the modification processing unit 204.

Similarly to the modification processing unit 141 illustrated in FIG. 3, the modification processing unit 204 has the configuration illustrated in FIG. 6. The modification processing unit 204 modifies the input image supplied from the modification processing unit 203 in accordance with the modification characteristic map supplied from the stroke modification characteristic calculation unit 202, and supplies the modified image to the sharpening processing unit 182.

The sharpening processing unit 182 sharpens the modified image, and supplies the sharpened image to the downstream as an output image.

With the above configuration, also in the case of the oil painting process having the pointillist-style process and the stroke process in combination, the variation in the colors of dots in a pointillist style can be increased by adjusting the strength of jitter. Thus, the contrast between dots can be increased, and a strong brush stroke can be obtained. That is, the strength of a brush stroke can be adjusted using two characteristics: the contrast between dots and the clarity of boundaries.

In the example illustrated in FIG. 36, by way of example, an extended version of the painting-style conversion processing unit 136 illustrated in FIG. 21 is provided, and a configuration capable of adjusting the strength of an output brush stroke is provided. However, an extended version of the painting-style conversion processing unit 136 illustrated in FIG. 32 or 34 may be provided, and a configuration capable of adjusting the strength of an output brush stroke may be provided.

Flow of Painting-Style Conversion Process

Figure 37:
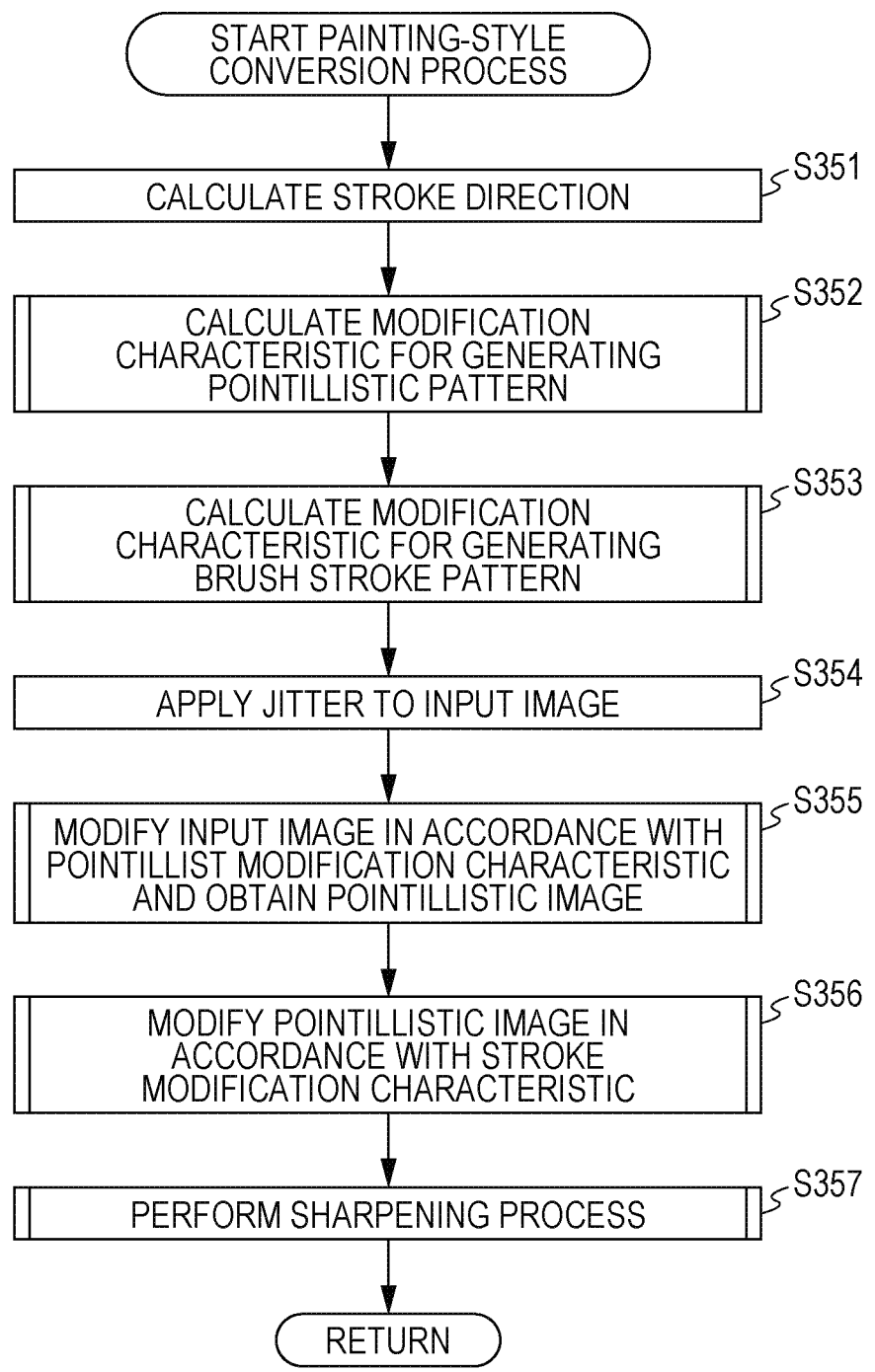
FIG. 37 is a flowchart illustrating an example of the painting-style conversion process.

Next, the painting-style conversion process executed by the painting-style conversion processing unit 136 illustrated in FIG. 36 will be described with reference to a flowchart illustrated in FIG. 37. The painting-style conversion process illustrated in FIG. 37 is also an example of the painting-style conversion process in step S107 in FIG. 7. In addition, the painting-style conversion process illustrated in FIG. 37 is also another example of the painting-style conversion processes in FIGS. 8, 16, 25, 33, and 35.

In step S351, the stroke direction calculation unit 205 calculates information concerning a stroke direction which is less susceptible to noise, using the input image supplied from the YC conversion processing unit 135. The stroke direction calculation unit 205 supplies the information concerning the stroke direction to the stroke modification characteristic calculation unit 202.

The pointillistic modification characteristic calculation unit 201 is supplied with a random pattern and a search range from, for example, the CPU 112 or the input device 113 illustrated in FIG. 1 or any other suitable device. In step S352, the pointillistic modification characteristic calculation unit 201 calculates a modification characteristic for generating a pointillistic pattern. The modification characteristic calculation process is basically substantially similar to the modification characteristic calculation process described above with reference to FIG. 9, and a detailed description thereof is thus omitted.

The pointillistic modification characteristic calculation unit 201 supplies the calculated modification characteristic to the modification processing unit 203 as a modification characteristic map, and outputs a pointillistic pattern including an image of a local minimum value to the stroke modification characteristic calculation unit 202.

The stroke modification characteristic calculation unit 202 is supplied with the image of the pointillistic pattern from the pointillistic modification characteristic calculation unit 201, and a signal indicating the brush stroke direction from the stroke direction calculation unit 205.

In step S353, the stroke modification characteristic calculation unit 202 calculates a modification characteristic for generating a brush stroke pattern. The stroke pattern modification characteristic calculation process is basically substantially similar to the stroke pattern modification characteristic calculation process described above with reference to FIG. 27, and a detailed description thereof is thus omitted.

The stroke modification characteristic calculation unit 202 calculates a modification characteristic (relative position) for the position of the pixel having the minimum value, and supplies the calculated modification characteristic to the modification processing unit 204 as a modification characteristic map.

In step S354, the jitter adding unit 181 adds jitter to the input image supplied from the YC conversion processing unit 135 using the random pattern supplied from the CPU 112 or the like. The jitter adding unit 181 supplies the image jitter added thereto to the modification processing unit 203.

In step S355, the modification processing unit 203 modifies the input image supplied from the jitter adding unit 181 in accordance with the pointillistic modification characteristic represented by the modification characteristic map supplied from the pointillistic modification characteristic calculation unit 201, and obtains a pointillistic image (modified image). The modification processing unit 203 supplies the obtained pointillistic image to the modification processing unit 204.

In step S356, the modification processing unit 204 modifies the input image (pointillistic image) supplied from the modification processing unit 203 in accordance with the stroke modification characteristic map supplied from the stroke modification characteristic calculation unit 202. Then, the modification processing unit 204 supplies the modified image to the sharpening processing unit 182.

In step S357, the sharpening processing unit 182 sharpens the modified image. The sharpening process is basically substantially similar to the sharpening process described above with reference to FIG. 17, and a detailed description thereof is thus omitted. The image sharpened through the processing of step S357 is supplied to the downstream as an output image.

FIG. 38 is a diagram illustrating another example of the relationships between adjustment buttons which are selectable by a user and parameters of search ranges (pointillist dot radii), amounts of jitter (strength), and sharpening (high-pass gain). The example illustrated in FIG. 38 is another example of the adjustment button described above with reference to FIGS. 18 and 19.

In the example illustrated in FIG. 38, the input of a "pointillistic" button, which has been selected by a user, is converted into parameters of: a search range (pointillist dot radius) of 3 pixels, a search range (stroke length) of 3 pixels, a jitter (strength) of ±32, and a sharpening (high-pass gain) of ×1.2. That is, an input of the "pointillistic" button is converted into parameters to obtain pointillistic effects.

The input of an "impressionistic" button, which has been selected by a user, is converted into parameters of: a search range (pointillist dot radius) of 3 pixels, a search range (stroke length) of 15 pixels, a jitter (strength) of ±16, and a sharpening (high-pass gain) of ×1.4. That is, an input of the "impressionistic" button is converted into parameters to obtain impressionistic effects.

The input of an "impressionistic (enhanced)" button, which has been selected by a user, is converted into parameters of: a search range (pointillist dot radius) of 5 pixels, a search range (stroke length) of 21 pixels, a jitter (strength) of ±32, and a sharpening (high-pass gain) of ×1.4. That is, an input of the "impressionistic" button is converted into parameters to obtain impressionistic effects.

Also when the pointillist-style process and the stroke process are used in combination, the use (display control) of the above adjustment buttons allows a user to intuitively adjust the appearance of a brush stroke.

Accordingly, in an embodiment of the present technology, an image is modified in accordance with a modification characteristic (relative position) in which the value of a certain pixel is spread over a two-dimensional area. That is, a local minimum value is locally distributed in accordance with a modification characteristic.

Therefore, artistic style effects can be quickly obtained, compared to the existing repetitive processing methods. In particular, painting effects with stable strokes can be quickly obtained.

In addition, a variety of effects ranging from pointillistic painting effects to painting effects with long brush strokes can also be consecutively selected. Furthermore, by adjusting parameters, it is possible to modify painting effects in various ways.

In addition, with the use of a memory, intermediate calculation results can be recycled. Therefore, results obtained when processing parameters are changed can be quickly obtained.

In the foregoing description with reference to FIGS. 18, 19, 38, etc., by way of example, a user input is converted into internal parameters, and painting effects are adjusted. However, there may be a demand to adjust painting effects for each part of an image in some cases, for example, when the image includes a plurality of objects (for example, persons and landscapes).

In such cases, internal parameters may be switched depending on each pixel in the image. By switching the internal parameters, it is possible to obtain a desired processing result for each object. Specifically, data defining parameters for each pixel may be stored in advance.

With the above method, for example, fine rendering may be provided near edges by reducing the width and/or length of a brush stroke, and a smooth output may be obtained in a face region by reducing the strength of a brush stroke (by reducing the amount of jitter and the strength of sharpening).

Features of an embodiment of the present technology reside on that an image is modified using a modification characteristic with which the value of a certain pixel is spread (or distributed) over a two-dimensional area having a width and a length and that a modification characteristic with which the value of a certain pixel is spread (or distributed) over a two-dimensional area is generated. The configurations described above are merely examples and any other configuration may also be used.

In the foregoing description, a modification process is performed in a digital video camera, by way of example; however, the device with which a modification process is performed is not limited to a digital video camera. The above processes may also be performed in, for example, a computer configured to perform image processing or a personal computer. The above processes may also be performed in a server. For example, image data may be transferred to a server via a network, and the server may perform a modification process.

The series of processes described above may be executed by hardware or software. When the series of processes is executed by software, a program forming the software is installed into a computer. Examples of the computer include a computer incorporated in dedicated hardware and a general-purpose personal computer capable of executing various functions by being installed with various programs.

Third Embodiment

Example Configuration of Computer

Figure 39:
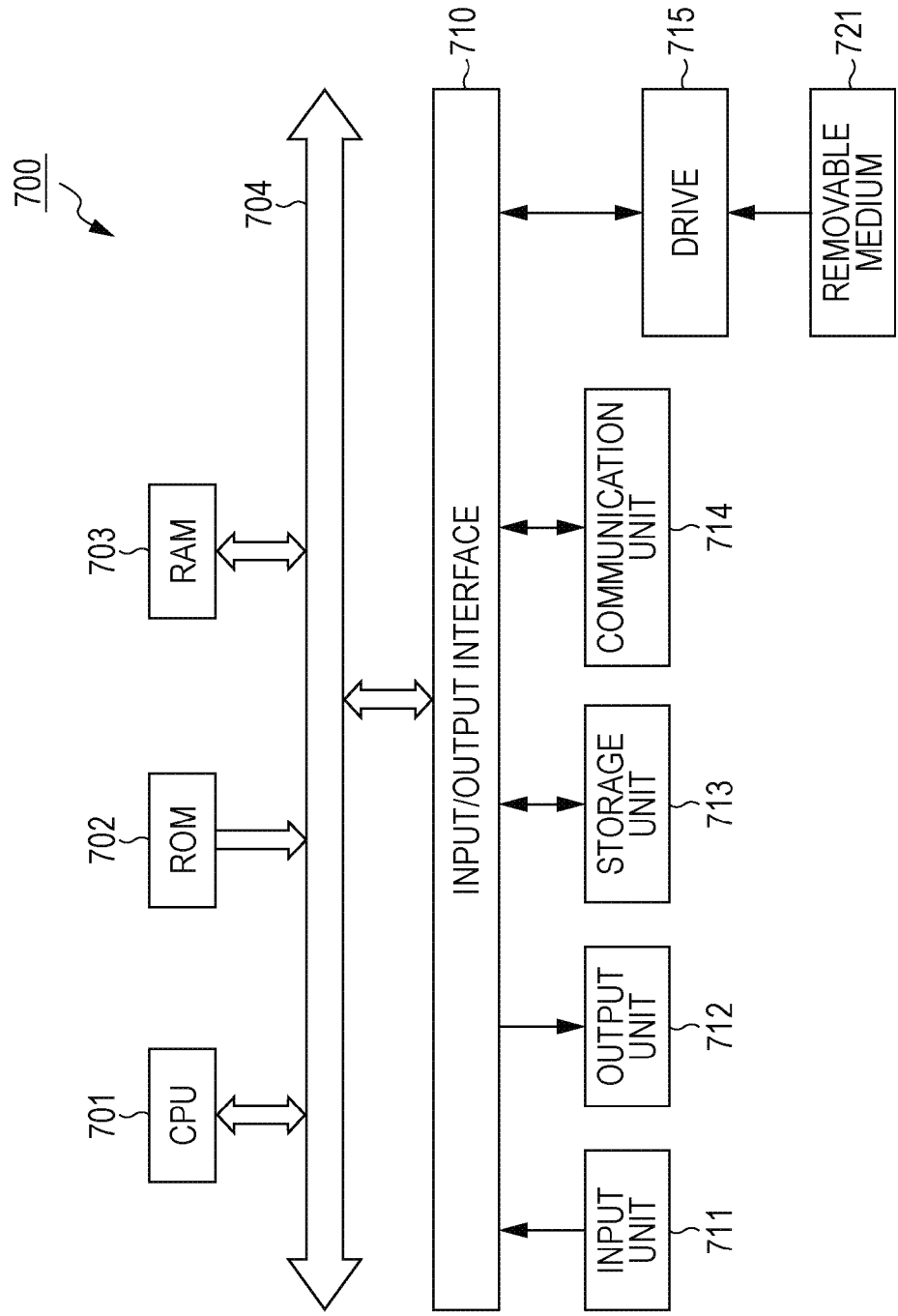
FIG. 39 is a block diagram illustrating an example configuration of a computer.

FIG. 39 is a block diagram illustrating an example configuration of hardware of a computer that executes the series of processes described in accordance with a program.

In the example illustrated in FIG. 39, an example configuration of a personal computer 700 is illustrated as an example of a computer. The personal computer 700 includes a CPU 701, a read only memory (ROM) 702, and a RAM 703 which are connected to one another via a bus 704.

An input/output interface 710 is further connected to the bus 704. An input unit 711, an output unit 712, a storage unit 713, a communication unit 714, and a drive 715 are connected to the input/output interface 710.

The input unit 711 includes a keyboard, a mouse, a microphone, and any other suitable device. The output unit 712 includes a display, a speaker, and any other suitable device. The storage unit 713 includes a hard disk, a non-volatile memory, and any other suitable device. The communication unit 714 includes a network interface and any other suitable device. The drive 715 drives a removable medium 721 such as a magnetic disc, an optical disc, a magneto-optical disc, or a semiconductor memory.

In the personal computer 700 having the above configuration, for example, the CPU 701 loads a program stored in the storage unit 713 into the RAM 703 via the input/output interface 710 and the bus 704 and executes the program, thus allowing the series of processes described above to be performed.

The program to be executed by the personal computer 700 (or the CPU 701) may be recorded and provided through the removable medium 721 serving as, for example, a packaged medium. The program may also be provided through a wired or wireless transmission medium such as a local area network, the Internet, or digital broadcasting.

In the personal computer 700, the removable medium 721 is placed in the drive 715, thereby enabling the program to be installed into the storage unit 713 through the input/output interface 710. The program may also be received at the communication unit 714 over a wired or wireless transmission medium, and installed into the storage unit 713. Alternatively, the program may be installed into the ROM 702 or the storage unit 713 in advance.

The program to be executed by a computer may be a program according to which processes are performed in a time-series manner in the order described herein, or may be a program according to which processes are performed in parallel or at a necessary timing such as when called.

The term "system", as used herein, refers to an overall apparatus including a plurality of devices, blocks, and elements.

Embodiments of the present technology are not limited to the foregoing embodiments, and a variety of modifications can be made without departing from the scope of the present technology.

For example, an embodiment of the present technology may provide a cloud computing configuration in which a single function is shared by a plurality of apparatuses via a network and is processed by the plurality of apparatuses in a cooperative manner.

The steps in the individual flowcharts described above may be executed by a single apparatus or may be executed by a plurality of apparatuses in a distributed manner.

If a single step includes a plurality of processes, the plurality of processes included in the single step may be executed by a single apparatus or may be executed by a plurality of apparatuses in a distributed manner.

While exemplary embodiments of the present disclosure have been described in detail with reference to the accompanying drawings, the present disclosure is not limited to the foregoing examples. Many variations and modifications could be readily made by a person having ordinary skill in the art of the present disclosure without departing from the technical teaching of the present disclosure as defined in the appended claims, and it is to be understood that such variations and modifications also fall within the technical scope of the present disclosure.

The present technology also encompasses the following embodiments:

(1) An image processing apparatus including:
a modification processing unit configured to modify an input image by distributing a value of each of pixels in the input image over a two-dimensional distribution area having a randomly different size and direction in accordance with modification characteristic information for distributing each pixel over the distribution area, the modification characteristic information being information for modifying the input image using a modification characteristic which is randomly different for each pixel position.

(2) The image processing apparatus according to (1) above, further including a modification characteristic generation unit configured to generate the modification characteristic information.

(3) The image processing apparatus according to (2) above, wherein the modification characteristic generation unit includes
a pointillistic modification characteristic generation unit configured to generate pointillistic modification characteristic information concerning a pointillist style using a random pattern image and a predetermined search range, and
a stroke modification characteristic generation unit configured to generate stroke modification characteristic information concerning a stroke using a search range determined from stroke direction information concerning a direction of the stroke.

(4) The image processing apparatus according to (3) above, wherein the pointillistic modification characteristic generation unit includes
a pointillistic coordinate detection unit configured to detect coordinates of a pixel having a minimum value or a maximum value in the predetermined search range for a pixel in the random pattern image, and
a pointillistic modification characteristic calculation unit configured to calculate a positional relationship between the pixel in the random pattern image and the pixel whose coordinates are detected by the pointillistic coordinate detection unit to generate the pointillistic modification characteristic information, and
wherein the stroke modification characteristic generation unit includes
a search range determination unit configured to determine the search range from the stroke direction information,
a stroke coordinate detection unit configured to detect coordinates of a pixel having a minimum value or a maximum value in the search range for a pixel in a pointillistic pattern image including the pixel whose coordinates are detected by the pointillistic coordinate detection unit, and
a stroke modification characteristic calculation unit configured to calculate a positional relationship between the pixel in the pointillistic pattern image and the pixel whose coordinates are detected by the stroke coordinate detection unit to generate the stroke modification characteristic information.

(5) The image processing apparatus according to (3) or (4) above, further including a modification characteristic combining unit configured to combine the pointillistic modification characteristic information and the stroke modification characteristic information to obtain composite modification characteristic information,
wherein the modification processing unit modifies the input image by distributing the value of each of the pixels in the input image over the distribution area in accordance with the composite modification characteristic information obtained by the modification characteristic combining unit.

(6) The image processing apparatus according to (3) or (4) above, wherein the modification processing unit includes
a pointillistic modification processing unit configured to modify the input image to obtain a modified image by distributing the value of each of the pixels in the input image over the distribution area in accordance with the pointillistic modification characteristic information generated by the pointillistic modification characteristic generation unit, and
a stroke modification processing unit configured to modify the modified image obtained by the pointillistic modification processing unit, by distributing a value of each of pixels in the modified image obtained by the pointillistic modification processing unit over the distribution area in accordance with the stroke modification characteristic information generated by the stroke modification characteristic generation unit.

(7) The image processing apparatus according to any of (3) to (6) above, further including:
a pointillistic modification characteristic adjustment unit configured to adjust a characteristic represented by the pointillistic modification characteristic information; and
a stroke modification characteristic adjustment unit configured to adjust a characteristic represented by the stroke modification characteristic information.

(8) The image processing apparatus according to (7) above, further including a selection unit configured to select a plurality of combinations of a degree to which the characteristic represented by the pointillistic modification characteristic information is adjusted and a degree to which the characteristic represented by the stroke modification characteristic information is adjusted,
wherein the pointillistic modification characteristic adjustment unit and the stroke modification characteristic adjustment unit adjust the characteristic represented by the pointillistic modification characteristic information and the characteristic represented by the stroke modification characteristic information, respectively, in accordance with the plurality of combinations selected by a user using the selection unit.

(9) The image processing apparatus according to (2) above, wherein the modification characteristic generation unit includes
a first stroke modification characteristic generation unit configured to generate first stroke modification characteristic information using a random pattern image and a first search range determined from first stroke direction information concerning a first stroke direction, and
a second stroke modification characteristic generation unit configured to generate second stroke modification characteristic information using a second search range determined from second stroke direction information concerning a second stroke direction, the second stroke direction information being information obtained by rotating the first stroke direction information.

(10) The image processing apparatus according to (9) above, wherein the first stroke modification characteristic generation unit includes
a first search range determination unit configured to determine the first search range from the first stroke direction information, a first coordinate detection unit configured to detect coordinates of a pixel having a minimum value or a maximum value in the first search range for a pixel in the random pattern image, and a first stroke modification characteristic calculation unit configured to calculate a positional relationship between the pixel in the random pattern image and the pixel whose coordinates are detected by the first coordinate detection unit to generate the first stroke modification characteristic information, and wherein the second stroke modification characteristic generation unit includes a second search range determination unit configured to determine the second search range from the second stroke direction information, a second coordinate detection unit configured to detect coordinates of a pixel having a minimum value or a maximum value in the second search range for a pixel in a stroke pattern image including the pixel whose coordinates are detected by the first coordinate detection unit, and a second stroke modification characteristic calculation unit configured to calculate a positional relationship between the pixel in the stroke pattern image and the pixel whose coordinates are detected by the second coordinate detection unit to generate the second stroke modification characteristic information.

(11) The image processing apparatus according to (9) or (10) above, further including a modification characteristic combining unit configured to combine the first stroke modification characteristic information and the second stroke modification characteristic information to obtain composite modification characteristic information, wherein the modification processing unit modifies the input image by distributing the value of each of the pixels in the input image over the distribution area in accordance with the composite modification characteristic information obtained by the modification characteristic combining unit.

(12) The image processing apparatus according to (9) or (10) above, wherein the modification processing unit includes a first modification processing unit configured to modify the input image to obtain a modified image by distributing the value of each of the pixels in the input image over the distribution area in accordance with the first stroke modification characteristic information generated by the first stroke modification characteristic generation unit, and a second modification processing unit configured to modify the modified image obtained by the first modification processing unit, by distributing a value of each of pixels in the modified image obtained by the first modification processing unit over the distribution area in accordance with the second stroke modification characteristic information generated by the second stroke modification characteristic generation unit.

(13) The image processing apparatus according to (2) above, wherein the modification characteristic generation unit generates pointillistic modification characteristic information concerning a pointillist style using a random pattern image and a predetermined search range.

(14) The image processing apparatus according to (13) above, wherein the modification characteristic generation unit includes a pointillistic coordinate detection unit configured to detect coordinates of a pixel having a minimum value or a maximum value in the predetermined search range for a pixel in the random pattern image, and a pointillistic modification characteristic calculation unit configured to calculate a positional relationship between the pixel in the random pattern image and the pixel whose coordinates are detected by the pointillistic coordinate detection unit to generate the pointillistic modification characteristic information.

(15) The image processing apparatus according to any of (1) to (14) above, further including:

a jitter adding unit configured to add jitter to the input image before the input image is input to the modification processing unit; and a sharpening processing unit configured to perform a high-frequency emphasis process on the image modified by the modification processing unit.

(16) The image processing apparatus according to (15) above, further including:

a modification characteristic adjustment unit configured to adjust a characteristic represented by the modification characteristic information; and a strength adjustment unit configured to adjust a strength of the jitter and the high-frequency emphasis process.

(17) The image processing apparatus according to (16) above, further including a selection unit configured to select a plurality of combinations of a degree to which the characteristic represented by the modification characteristic information is adjusted and a degree to which the jitter and the high-frequency emphasis process are adjusted, wherein the modification characteristic adjustment unit and the strength adjustment unit adjust the characteristic represented by the modification characteristic information and the strength of the jitter and the high-frequency emphasis process, respectively, in accordance with the plurality of combinations selected by a user using the selection unit.

(18) The image processing apparatus according to any of (2) to (17) above, further including a memory configured to hold the modification characteristic information generated by the modification characteristic generation unit.

(19) The image processing apparatus according to (1) above, further including a memory configured to hold the modification characteristic information.

(20) The image processing apparatus according to (19) above, wherein the modification characteristic information is generated through detection of coordinates of a pixel having a minimum value or a maximum value in a predetermined search range for a pixel in a random pattern image and through calculation of a positional relationship between the pixel whose coordinates are detected and the pixel in the random pattern image.

(21) An image processing method including:

modifying an input image by distributing a value of each of pixels in the input image over a two-dimensional distribution area having a randomly different size and direction in accordance with modification characteristic information for distributing each pixel over the distribution area, the modification characteristic information being information for modifying the input image using a modification characteristic which is randomly different for each pixel position.

(22) A program for causing a computer to execute an image processing method for executing an image processing method, including:

modifying an input image by distributing a value of each of pixels in the input image over a two-dimensional distribution area having a randomly different size and direction in accordance with modification characteristic information for distributing each pixel over the distribution area, the modification characteristic information being information for modifying the input image using a modification characteristic which is randomly different for each pixel position.

The present disclosure contains subject matter related to that disclosed in Japanese Priority Patent Application JP 2011-191760 filed in the Japan Patent Office on Sep. 2, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A painterly image processing apparatus comprising:
a digital signal processor programmed to:
receive an input image comprising a plurality of pixels;
generate modification characteristic information that specifies a modification characteristic for each of the plurality of pixels in the input image, wherein the modification characteristic is randomly different for each pixel position of the plurality of pixels in the input image; and
modify, based on the modification characteristic information, the input image to have a painting style, wherein modifying the input images comprises distributing, for each of the plurality of pixels in the input image, a value for the pixel over a two-dimensional distribution area having a randomly different size and direction in accordance with the modification characteristic for the pixel as specified in the modification characteristic information,
wherein generating the modification characteristic information comprises:
detecting coordinates of a pixel having a minimum value or a maximum value in a first search range for a pixel in a random pattern image;
calculating a positional relationship between the pixel in the random pattern image and the pixel whose coordinates are detected in the first search range to generate pointillistic modification characteristic information;
determining a second search range from stroke direction information;
detecting coordinates of a pixel having a minimum value or a maximum value in the second search range for a pixel in a pointillistic pattern image including the pixel whose coordinates are detected in the second search range; and
calculating a positional relationship between the pixel in the pointillistic pattern image and the pixel whose coordinates are detected in the second search range to generate stroke modification characteristic information.

2. The image processing apparatus according to claim 1, wherein the digital signal processor is further programmed to combine the pointillistic modification characteristic information and the stroke modification characteristic information to obtain the modification characteristic information.

3. The image processing apparatus according to claim 1, wherein the digital signal processor is further programmed to:
modify the input image to obtain a modified image by distributing the value of each of the pixels in the input image over the distribution area in accordance with the pointillistic modification characteristic information; and
modify the modified image by distributing a value of each of pixels in the modified image over the distribution area in accordance with the stroke modification characteristic information.

4. The image processing apparatus according to claim 1, wherein the digital signal processor is further programmed to:
adjust a characteristic represented by the pointillistic modification characteristic information; and
adjust a characteristic represented by the stroke modification characteristic information.

5. The image processing apparatus according to claim 4, wherein the digital signal processor is further programmed to:
select a plurality of combinations of a degree to which the characteristic represented by the pointillistic modification characteristic information is adjusted and a degree to which the characteristic represented by the stroke modification characteristic information is adjusted; and
adjust the characteristic represented by the pointillistic modification characteristic information and the characteristic represented by the stroke modification characteristic information, respectively, in accordance with the plurality of selected combinations.

6. The image processing apparatus according to claim 1, wherein the digital signal processor is further programmed to:
add jitter to the input image before modifying the input image based on the modification characteristic information; and
perform a high-frequency emphasis process on the image modified based on the modification characteristic information.

7. The image processing apparatus according to claim 6, wherein the digital signal processor is further programmed to:
adjust a characteristic represented by the modification characteristic information; and
adjust a strength of the jitter and the high-frequency emphasis process.

8. The image processing apparatus according to claim 7, wherein the digital signal processor is further programmed to select a plurality of combinations of a degree to which the characteristic represented by the modification characteristic information is adjusted and a degree to which the jitter and the high-frequency emphasis process are adjusted,
wherein the characteristic represented by the modification characteristic information and the strength of the jitter and the high-frequency emphasis process, respectively, are adjusted in accordance with the plurality of selected combinations.

9. The image processing apparatus according to claim 1, further comprising a memory configured to store the modification characteristic information.

10. An image processing apparatus comprising:
a digital signal processor programmed to:
receive an input image comprising a plurality of pixels;
receive modification characteristic information that specifies a modification characteristic for each of the plurality of pixels in the input image, wherein the modification characteristic is randomly different for each pixel position of the plurality of pixels in the input image;
modify, based on the modification characteristic information, the input image to have a painting style, wherein modifying the input images comprises distributing, for each of the plurality of pixels in the input image, a value for the pixel over a two-dimensional distribution area having a randomly different size and direction in accordance with the modification characteristic for the pixel as specified in the modification characteristic information;
generate first stroke modification characteristic information using a random pattern image and a first search range determined from first stroke direction information concerning a first stroke direction, and generate second stroke modification characteristic information using a second search range determined from second stroke direction information concerning a second stroke direction, the second stroke direction information being information obtained by rotating the first stroke direction information; and combine the first stroke modification characteristic information and the second stroke modification characteristic information to obtain the modification characteristic information.

11. The image processing apparatus according to claim 10, wherein the digital signal processor is further programmed to:

determine the first search range from the first stroke direction information;

detect coordinates of a pixel having a minimum value or a maximum value in the first search range for a pixel in the random pattern image;

calculate a positional relationship between the pixel in the random pattern image and the pixel whose coordinates are detected in the first search range to generate the first stroke modification characteristic information;

determine the second search range from the second stroke direction information;

detect coordinates of a pixel having a minimum value or a maximum value in the second search range for a pixel in a stroke pattern image including the pixel whose coordinates are detected in the second search range; and calculate a positional relationship between the pixel in the stroke pattern image and the pixel whose coordinates are detected in the second search range to generate the second stroke modification characteristic information.

12. The image processing apparatus according to claim 10, wherein the digital signal processor is further programmed to:

modify the input image to obtain a modified image by distributing the value of each of the pixels in the input image over the distribution area in accordance with the first stroke modification characteristic information; and modify the modified image by distributing a value of each of pixels in the modified image over the distribution area in accordance with the second stroke modification characteristic information.

13. An image processing method, comprising:

receiving an input image comprising a plurality of pixels;

generating modification characteristic information that specifies a modification characteristic for each of the plurality of pixels in the input image, wherein the modification characteristic is randomly different for each pixel position of the plurality of pixels in the input image; and modifying, by at least one computer processor, based on the modification characteristic information, the input image to have a painting style, wherein modifying the input images comprises distributing, for each of the plurality of pixels in the input image, a value for the pixel over a two-dimensional distribution area having a randomly different size and direction in accordance with the modification characteristic for the pixel as specified in the modification characteristic information, wherein generating the modification characteristic information comprises:

detecting coordinates of a pixel having a minimum value or a maximum value in a first search range for a pixel in a random pattern image;

calculating a positional relationship between the pixel in the random pattern image and the pixel whose coordinates are detected in the first search range to generate pointillistic modification characteristic information;

determining a second search range from stroke direction information;

detecting coordinates of a pixel having a minimum value or a maximum value in the second search range for a pixel in a pointillistic pattern image including the pixel whose coordinates are detected in the second search range; and calculating a positional relationship between the pixel in the pointillistic pattern image and the pixel whose coordinates are detected in the second search range to generate stroke modification characteristic information.

14. The image processing method according to claim 13, further comprising:

combining the pointillistic modification characteristic information and the stroke modification characteristic information to obtain the modification characteristic information.

15. The image processing method according to claim 13, further comprising:

modifying the input image to obtain a modified image by distributing the value of each of the pixels in the input image over the distribution area in accordance with the pointillistic modification characteristic information; and modifying the modified image by distributing a value of each of pixels in the modified image over the distribution area in accordance with the stroke modification characteristic information.

16. The image processing method according to claim 13, further comprising:

adjusting a characteristic represented by the pointillistic modification characteristic information; and adjusting a characteristic represented by the stroke modification characteristic information.

17. The image processing method according to claim 16, further comprising:

selecting a plurality of combinations of a degree to which the characteristic represented by the pointillistic modification characteristic information is adjusted and a degree to which the characteristic represented by the stroke modification characteristic information is adjusted; and adjusting the characteristic represented by the pointillistic modification characteristic information and the characteristic represented by the stroke modification characteristic information, respectively, in accordance with the plurality of selected combinations.

18. The image processing method according to claim 13, further comprising:

adding jitter to the input image before modifying the input image based on the modification characteristic information; and performing a high-frequency emphasis process on the image modified based on the modification characteristic information.

19. The image processing method according to claim 18, further comprising:

adjusting a characteristic represented by the modification characteristic information; and adjusting a strength of the jitter and the high-frequency emphasis process.

20. The image processing method according to claim 19, further comprising selecting a plurality of combinations of a degree to which the characteristic represented by the modification characteristic information is adjusted and a degree to which the jitter and the high-frequency emphasis process are adjusted,
  wherein the characteristic represented by the modification characteristic information and the strength of the jitter and the high-frequency emphasis process, respectively, are adjusted in accordance with the plurality of selected combinations.

* * * * *